(12) United States Patent
Park et al.

(10) Patent No.: US 11,611,859 B2
(45) Date of Patent: Mar. 21, 2023

(54) METHOD FOR TRANSCEIVING SIGNAL BY TERMINAL AND BASE STATION IN WIRELESS COMMUNICATION SYSTEM AND DEVICE SUPPORTING SAME

(71) Applicant: LG Electronics Inc., Seoul (KR)

(72) Inventors: Changhwan Park, Seoul (KR); Seokmin Shin, Seoul (KR); Joonkui Ahn, Seoul (KR); Seunggye Hwang, Seoul (KR); Oanyong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 16/332,484

(22) PCT Filed: Mar. 22, 2018

(86) PCT No.: PCT/KR2018/003387
§ 371 (c)(1),
(2) Date: Mar. 12, 2019

(87) PCT Pub. No.: WO2018/174614
PCT Pub. Date: Sep. 27, 2018

(65) Prior Publication Data
US 2022/0256570 A1 Aug. 11, 2022

Related U.S. Application Data

(60) Provisional application No. 62/591,135, filed on Nov. 27, 2017, provisional application No. 62/591,177, (Continued)

(51) Int. Cl.
*H04W 72/02* (2009.01)
*H04W 4/80* (2018.01)
(Continued)

(52) U.S. Cl.
CPC .............. *H04W 4/80* (2018.02); *H04L 1/08* (2013.01); *H04L 5/0051* (2013.01);
(Continued)

(58) Field of Classification Search
CPC ......... H04W 72/1273; H04W 72/0446; H04W 72/1278; H04L 1/08
See application file for complete search history.

(56) References Cited

U.S. PATENT DOCUMENTS 8,982,872 B2  3/2015  Gou et al.
9,066,339 B2  6/2015  Petermann et al.
(Continued)

FOREIGN PATENT DOCUMENTS

CN  101646247  2/2010
CN  104349333  2/2015
(Continued)

OTHER PUBLICATIONS

"Narrowband Internet of Things, Whitepaper", J. Schlienz et. al., published Aug. 8, 2016, retrieved from https://www.rohde-schwarz.com/us/applications/narrowband-internet-of-things-white-paper_230854-314242.html (Year: 2016).*
(Continued)

*Primary Examiner* — Khaled M Kassim
*Assistant Examiner* — Zhaohui Yang
(74) *Attorney, Agent, or Firm* — Fish & Richardson P.C.

(57) ABSTRACT

Various embodiments provide a method for transceiving a signal by a terminal and a base station in a wireless communication system and a device supporting same.

20 Claims, 34 Drawing Sheets

Related U.S. Application Data filed on Nov. 27, 2017, provisional application No. 62/590,366, filed on Nov. 24, 2017, provisional application No. 62/587,430, filed on Nov. 16, 2017, provisional application No. 62/586,187, filed on Nov. 15, 2017, provisional application No. 62/584,882, filed on Nov. 12, 2017, provisional application No. 62/564,319, filed on Sep. 28, 2017, provisional application No. 62/547,770, filed on Aug. 19, 2017, provisional application No. 62/543,934, filed on Aug. 10, 2017, provisional application No. 62/501,102, filed on May 4, 2017, provisional application No. 62/479,289, filed on Mar. 30, 2017, provisional application No. 62/475,150, filed on Mar. 22, 2017.

(51) Int. Cl.
| | | |
|---|---|---|
| H04L 5/00 | (2006.01) | |
| H04L 27/26 | (2006.01) | |
| H04W 72/0446 | (2023.01) | |
| H04W 72/0453 | (2023.01) | |
| H04L 1/08 | (2006.01) | |
| H04W 72/1273 | (2023.01) | |
| H04W 72/12 | (2023.01) | |

(52) U.S. Cl.
CPC ..... *H04L 27/2607* (2013.01); *H04W 72/0446* (2013.01); *H04W 72/0453* (2013.01); *H04W 72/1273* (2013.01); *H04W 72/1278* (2013.01); *H04L 5/0007* (2013.01)

(56) References Cited

U.S. PATENT DOCUMENTS

| | | | |
|---|---|---|---|
| 10,009,882 | B2 | 6/2018 | You et al. |
| 10,362,624 | B2 | 7/2019 | Mochizuki et al. |
| 2010/0035574 | A1 | 2/2010 | Punz |
| 2011/0255508 | A1 | 10/2011 | Iwamura et al. |
| 2012/0014286 | A1 | 1/2012 | Wang et al. |
| 2012/0300685 | A1 | 11/2012 | Kim et al. |
| 2014/0003301 | A1 | 1/2014 | Madan et al. |
| 2014/0086112 | A1 | 3/2014 | Stern-Berkowitz et al. |
| 2015/0365209 | A1 | 12/2015 | Yi et al. |
| 2015/0382284 | A1 | 12/2015 | Brismar et al. |
| 2016/0088595 | A1 | 3/2016 | You et al. |
| 2016/0286555 | A1 | 9/2016 | Papasakellariou |
| 2016/0302024 | A1 | 10/2016 | Bennett et al. |
| 2017/0215172 | A1 | 7/2017 | Yang et al. |
| 2018/0019888 | A1 | 1/2018 | Alvarino et al. |
| 2018/0020438 | A1 | 1/2018 | Martin |
| 2018/0048444 | A1 | 2/2018 | Park et al. |
| 2018/0062699 | A1 | 3/2018 | Horiuchi et al. |
| 2018/0092027 | A1 | 3/2018 | Sheng |
| 2018/0152950 | A1 | 5/2018 | Xiong et al. |
| 2018/0324700 | A1 | 11/2018 | Yu et al. |
| 2018/0324702 | A1 | 11/2018 | Takahashi et al. |
| 2018/0324757 | A1 | 11/2018 | Chai et al. |
| 2019/0141615 | A1 | 5/2019 | Breuer et al. |
| 2019/0230580 | A1 | 7/2019 | Kim et al. |
| 2019/0238290 | A1 | 8/2019 | Liu et al. |
| 2019/0260534 | A1 | 8/2019 | Park et al. |

FOREIGN PATENT DOCUMENTS

| | | |
|---|---|---|
| CN | 104811264 | 7/2015 |
| CN | 105745848 | 7/2016 |
| CN | 106454695 | 2/2017 |
| KR | 1020160113672 | 9/2016 |
| KR | 1020160138595 | 12/2016 |
| KR | 1020170007433 | 1/2017 |
| WO | WO2014185659 | 11/2014 |
| WO | WO2016048422 | 3/2016 |
| WO | WO2016169714 | 10/2016 |

OTHER PUBLICATIONS

IN Office Action in Indian Appln. No. 201927017430, dated Jan. 27, 2021, 7 pages (with English translation).

Chinese Office Action in Chinese Application No. 201880004083.8, dated Apr. 15, 2020, 19 pages (with English translation).

Extended European Search Report in European Application No. 18770228.7, dated May 18, 2020, 7 pages.

Intel Corporation, "On improving SI8/MIB acquisition time in eNB-IoT," R1-1702707, 3GPP TSG RAN WG1 Meeting #88, Athens, Greece, dated Feb. 13-17, 2017, 6 pages, XP051221547.

MCC TF160, "eMTC: Test Model and ASP updates," R5w160302rl, 3GPPRAN5-SS vendors/TF160 Workshop IoT #1, Sophia Antipolis, France, dated Sep. 27, 2016, 9 pages.

Nokia Networks, "MIB analysis for Low cost MTC," R2-151067, 3GPP TSG-RAN WG2 Meeting #89bis, Bratislava, Slovakia, dated Apr. 20-24, 2015, 3 pages.

Qualcomm Incorporated, "Enhancements to system information acquisition," R1-1720427, 3GPP TSG RAN WG1 Meeting 91, Reno, USA, dated Nov. 27-Dec. 1, 2017, 3 pages, XP051369990.

WI rapporteur (Ericsson), "RAN1 agreements for Rel-13 NB-IoT," R1-165977, 3GPP TSG-RAN WG1 Meeting #85, Nanjing, China, dated May 22-26, 2016, 33 pages, XP051141850.

ZTE, Sanechips, "System information acquisition improvement for NB-IoT," R1-1719716, 3G PP TSG RAN WG1 Meeting #91, dated Nov. 27-Dec. 1, 2017, 3 pages, XP051369482.

3rd Generation Partnership Project; Technical Specification Group Radio Access Network; Evolved Universal Terrestrial Radio Access (E-UTRA); Radio Resource Control (RRC); Protocol specification (Release 14),"3GPP TS 36.331 V14.1.0 (Dec. 2016)," dated Jan. 12, 2017, 656 pages.

Ericsson, "On the performance of MIB-NB and SIB1-NB acquisition," R1-1701895, 3GPP TSG-RAN1#88, Athens, Greece, Feb. 13-17, 2017, 6 pages.

Intel Corporation, "On resource allocation for SI81-NB in TS 3.213," R1-165228, 3GPP TSG RAN WG1 Meeting #85, Nanjing, China, May 23-27, 2016, 4 pages.

MediaTek Inc., "Broadcast channel design for system information acquisition," R1-1612122, 3GPP TSG RAN WG1 Meeting #70bis, Reno, Nevada, US, Nov. 14-18, 2016, 6 pages.

MediaTek Inc., "Consideration on narrowband anchor based access," R1-1609562, 3GPP TSG RAN WG1 Meeting #86bis, Lisbon, Portugal, Oct. 10-14, 2016, 4 pages.

Nokia Networks, "Using MIB Spare Bits for MTC," R1-151315, 3GPP TSG-RAN WG1 Meeting #80bis, Belgrade, Serbia, Apr. 20-24, 2015, 3 pages.

Samsung, "Dedicated Signalling of SI in Rel-13 eMTC," R2-163454, 3GPP TSG-RAN WG2 Meeting #94, Nanjing, China, May 23-27, 2016, 4 pages.

Ericsson, "NB-IoT—Collision handling," R1-164991, 3GPP TSG RAN WG1 #85, Nanjing, P.R. China, dated May 23-27, 2016, 3 pages.

Ericsson, "Remaining issues of SI reading requirements for eMTC," R4-160970, 3GPP TSG RAN WG4 Meeting #78, dated Feb. 15-19, 2016, 4 pages.

Huawei, HiSilicon, "Remaining details of OTDOA assistance data," R1-1701752, 3GPP TSG RAN WG1 Meeting #88, Athens, Greece, dated Feb. 13-17, 2017, 4 pages.

Intel Corporation, "Common control message transmission for NB-IoT," R1-160418, 3GPP TSG RAN WG1 Meeting #84, St Julian's, Malta, dated Feb. 15-19, 2016, 5 pages.

Japanese Office Action in Japanese Application No. 2019-537059, dated Aug. 4, 2020, 6 pages (with English translation).

Ad-Hoc chair (Huawei), "Chairman's Notes of AI 6.2.6 Further enhancements of NB-IoT," R1-1719127, 3GPP TSG RAN WG1 Meeting #90bis, Prague, Czech Republic, dated Oct. 9-13, 2017, 7 pages.

Huawei et al., "Reduction of NB-IoT System Information acquisition time," R1-1716987, 3GPP TSG RAN WG1 Meeting #90bis, Prague, Czech Republic, dated Oct. 9-13, 2017, 7 pages.

* cited by examiner

A. DCI format N2 in Type-1 common search space (not Type-1A CSS)
- If the format N2 CRC is scrambled by P-RNTI (15bits)
    1. Flag for paging/direct indication differentiation – 1 bit, with value 0 for direct indication and value 1 for paging
        A. If Flag=0
            (1) Direct Indication information – 8 bits provide direct indication of system information update and other fields

| Bit | Field in *Direct Indication Information* |
|---|---|
| 1 | *systemInfoModification* |
| 2 | *systemInfoModification-eDRX* |
| 3,4,5, 6,7,8 | Not used, and shall be ignored by UE if received |

- [systemInfoModification]
    If present: indication of a BCCH modification other than for SIB14-NB(for AB) and SIB16-NB(for GPS). This indication does not apply to UEs using eDRX cycle longer than the BCCH modification period.
- [systemInfoModification-eDRX]
    If present: indication of a BCCH modification other than for SIB14-NB(for AB) and SIB16-NB(for GPS). This indication applies only to UEs using eDRX cycle longer than the BCCH modification period.
- [next procedure]
    A. re-acquire the required system information using the system information acquisition procedure.
    B. if in RRC_IDLE
        the MIB-NB and SIB1-NB as well as SIB2-NB through SIB5-NB, SIB22-NB (depending on support of multi-carrier paging/NPRACH)
    C. if in RRC_CONNECTED and T311 is running
        the MIB-NB, SIB1-NB and SIB2-NB, and SIB22-NB (depending on support of multi-carrier paging/NPRACH)

(2) Reserved information 6 bits are added until the size is equal to that of format N2 with Flag=1
        B. If Flag=1
            (1) Resource assignment – 3 bits
            (2) Modulation and coding scheme – 4 bits
            (3) Repetition number – 4 bits
            (4) DCI subframe repetition number – 3 bits

METHOD FOR TRANSCEIVING SIGNAL BY TERMINAL AND BASE STATION IN WIRELESS COMMUNICATION SYSTEM AND DEVICE SUPPORTING SAME

CROSS-REFERENCE TO RELATED APPLICATIONS

This application is a National Stage application under 35 U.S.C. § 371 of International Application No. PCT/KR2018/003387, filed on Mar. 22, 2018, which claims the benefit of U.S. Provisional Application No. 62/475,150, filed on Mar. 22, 2017, U.S. Provisional Application No. 62/479,289, filed on Mar. 30, 2017, U.S. Provisional Application No. 62/501,102, filed on May 4, 2017, U.S. Provisional Application No. 62/543,934, filed on Aug. 10, 2017, U.S. Provisional Application No. 62/547,770, filed on Aug. 19, 2017, U.S. Provisional Application No. 62/564,319, filed on Sep. 28, 2017, U.S. Provisional Application No. 62/584,882, filed on Nov. 12, 2017, U.S. Provisional Application No. 62/586,187, filed on Nov. 15, 2017, U.S. Provisional Application No. 62/587,430, filed on Nov. 16, 2017, U.S. Provisional Application No. 62/590,366, filed on Nov. 24, 2017, U.S. Provisional Application No. 62/591,177, filed on Nov. 27, 2017, and U.S. Provisional Application No. 62/591,135, filed on Nov. 27, 2017. The disclosures of the prior applications are incorporated by reference in their entirety.

TECHNICAL FIELD

The present disclosure pertains to a wireless communication system, and more specifically pertains to a method for transmitting and receiving a signal between a user equipment and a base station and an apparatus therefor.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems may include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system, and so on.

Furthermore, IoT (Internet of Things) communication technology is being newly proposed. Here, IoT refers to a communication without involving human interactions. A scheme of deploying such IoT communication technology into a cellular based communication technology is being additionally discussed.

However, since the conventional LTE system was designed for the purpose of supporting a high-speed data communication, it has been considered as an expensive communication means. However, IoT communication can be widely used when a low cost is ensured.

DISCLOSURE

Technical Problem

The present disclosure is intended to provide a method of enabling a user equipment (UE) to rapidly obtain system information by transmitting additional narrowband system information block type 1 (SIB1-NB) as well as SIB1-NB.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method for transmitting and receiving a signal between a user equipment and a base station in a wireless communication system and an apparatus therefor.

In accordance with an embodiment of the present disclosure, a method of receiving a signal from a base station by a user equipment in a wireless communication system may comprise receiving a MIB-NB (Master Information Block-Narrow Band) and a SIB1-NB (System Information Block1-Narrow Band) from the base station, obtaining, from the MIB-NB or the SIB1-NB, information indicating whether an additional SIB1-NB is transmitted, and determining, based on the obtained information, a subframe indicated as an invalid downlink subframe by the base station to be a valid subframe or an invalid subframe.

In accordance with an embodiment of the present disclosure, the method may further comprise, when the subframe indicated as the invalid downlink subframe is determined to be the valid subframe, receiving at least one of a NRS, a NPDCCH, and a NPDSCH in the subframe indicated as the invalid downlink subframe.

In accordance with an embodiment of the present disclosure, the method may further comprise, when the subframe indicated as the invalid downlink subframe is determined to be the invalid subframe, receiving the additional SIB1-NB in the subframe indicated as the invalid downlink subframe.

In accordance with an embodiment of the present disclosure, the additional SIB1-NB may be transmitted in a subframe adjacent to a subframe transmitting the SIB1-NB within a radio frame transmitting the SIB1-NB, and the subframe transmitting the additional SIB1-NB may be a subframe corresponding to subframe index 3.

In accordance with an embodiment of the present disclosure, the additional SIB1-NB may be transmitted in a subframe different from the subframe transmitting the SIB1-NB on an anchor carrier.

In accordance with an embodiment of the present disclosure, the SIB1-NB may be transmitted on an anchor carrier or a non-anchor carrier, and whether the SIB1-NB is transmitted on the anchor carrier or the non-anchor carrier may be indicated by the MIB-NB.

In accordance with an embodiment of the present disclosure, the method may further comprise obtaining position information about the non-anchor carrier transmitting the SIB1-NB from the MIB-NB; and receiving the SIB-NB based on the obtained position information.

In accordance with an embodiment of the present disclosure, a repeated transmission number of the additional SIB1-NB may be determined based on a repeated transmission number of the SIB1-NB.

In accordance with an embodiment of the present disclosure, when a repeated transmission number of the SIB1-NB is 4 or 8, the additional SIB1-NB may not be transmitted, and when the repeated transmission number of the SIB1-NB is 16, the additional SIB1-NB may be transmitted for a same number of times as the SIB1-NB.

In accordance with an embodiment of the present disclosure, the information indicating whether the additional SIB1-NB is transmitted may be indicated by an unused bit of the MIB-NB.

In accordance with an embodiment of the present disclosure, whether the additional SIB1-NB is transmitted may be determined based on at least one of a code rate of the SIB1-NB, a transport block size (TBS) of the SIB1-NB, a repeated transmission number of the SIB1-NB, an operation mode of NB-IoT, a number of NRS antenna ports, or a number of CRS antenna ports.

In accordance with an embodiment of the present disclosure, when the SIB1-NB is changed, whether the additional SIB1-NB is transmitted may be indicated by a changed SIB1-NB.

In accordance with an embodiment of the present disclosure, a method of transmitting a signal to a user equipment by a base station in a wireless communication system may comprise configuring a MIB-NB (Master Information Block-Narrow Band) or a SIB1-NB (System Information Block1-Narrow Band) to indicate whether an additional SIB1-NB is transmitted, indicating a subframe available for transmission of the additional SIB1-NB as an invalid downlink subframe, transmitting the MIB-NB and the SIB1-NB to the user equipment, and transmitting at least one of the additional SIB1-NB, a NRS, a NPDCC, or a NPDSCH in the subframe indicated as the invalid downlink subframe.

In accordance with an embodiment of the present disclosure, a user equipment for receiving a signal from a base station in a wireless communication system may comprise a receiver; and a processor operatively connected to the receiver, wherein the processor may be configured to control the receiver to receive a MIB-NB (Master Information Block-Narrow Band) and a SIB1-NB (System Information Block1-Narrow Band) from the base station, to obtain, from the MIB-NB or the SIB1-NB, information indicating whether an additional SIB1-NB is transmitted, and to determine, based on the obtained information, a subframe indicated as an invalid downlink 5 subframe by the base station to be a valid subframe or an invalid subframe.

In accordance with an embodiment of the present disclosure, a base station for transmitting a signal to a user equipment in a wireless communication system may comprise a transmitter; and a processor operatively connected to the transmitter, wherein the processor may be configured to configure a MIB-NB (Master Information Block-Narrow Band) or a SIB1-NB (System Information Block1-Narrow Band) to indicate whether an additional SIB1-NB is transmitted, to indicate a subframe available for transmission of the additional SIB1-NB as an invalid downlink subframe, to control the transmitter to transmit the MIB-NB and the SIB1-NB to the user equipment, and to control the transmitter to transmit at least one of the additional SIB1-NB, a NRS, a NPDCC, or a NPDSCH in the subframe indicated as the invalid downlink subframe.

It will be appreciated that the above-described embodiments in accordance with the present disclosure are a part of the preferred embodiments of the present disclosure, and various embodiments including the technical features of the present disclosure can be derived by a person skilled in the art based on the following detailed description of the present disclosure.

Technical Effects

Various embodiments of the present disclosure enable a UE to more rapidly obtain system information by transmitting an additional SIB1-NB.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 14 is a diagram illustrating an output of circular buffer according to an embodiment of the present disclosure.

FIG. 23 is an example of a configuration of corresponding information, and a related NB-IoT UE procedure in a current NB-IoT FDD system.

BEST MODE FOR CARRYING OUT THE INVENTION

Figure 1:
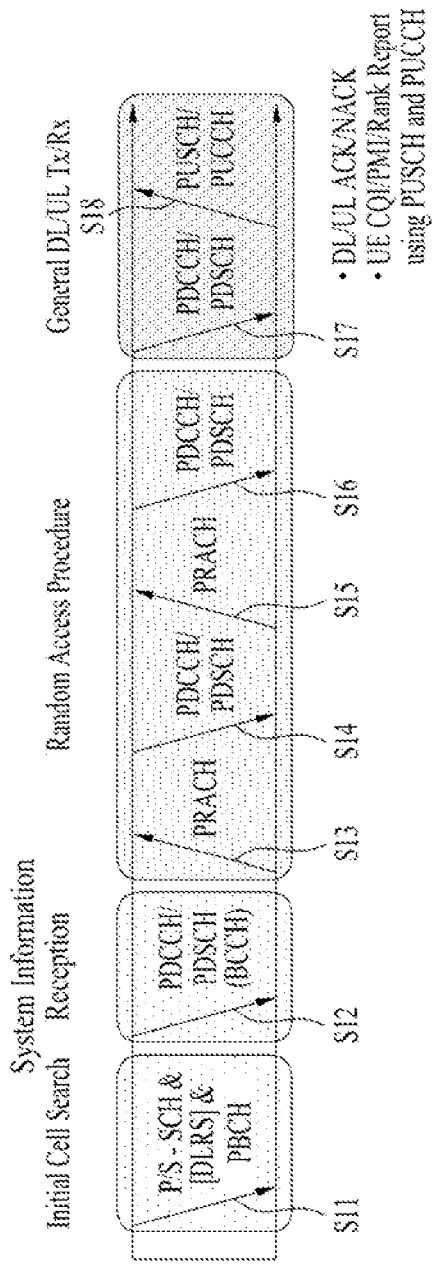
FIG. 1 illustrates physical channels and a general signal transmission method using the physical channels, which may be used in embodiments of the present disclosure.

The embodiments of the present disclosure described below are combinations of elements and features of the present disclosure in specific forms. The elements or features may be considered selective unless otherwise mentioned. Each element or feature may be implemented without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a User Equipment (UE), a Mobile Station (MS), a Subscriber Station (SS), a Mobile Subscriber Station (MSS), a mobile terminal, an Advanced Mobile Station (AMS), etc.

A transmission end may be a fixed and/or mobile node that provides a data service or a voice service, and a reception end may be a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G New Radio (NR) system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be 5 explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-U IRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from a base station in downlink and transmits information to the base station in uplink. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to a base station. Specifically, the UE synchronizes its timing to the base station and obtains information such as a cell Identifier (ID) by receiving a Primary Synchronization Channel (P-SCH) and a Secondary Synchronization Channel (S-SCH) from the base station.

Then the UE may obtain information broadcast in the cell by receiving a Physical Broadcast Channel (PBCH) from the base station.

During the initial cell search, the UE may monitor a DL channel state by receiving a Downlink Reference Signal (DL RS).

After the initial cell search, the UE may obtain more detailed system information by receiving a Physical Downlink Control Channel (PDCCH) and receiving a Physical Downlink Shared Channel (PDSCH) based on information of the PDCCH (S12).

After obtaining more detailed system information, to complete connection to the base station, the UE may perform a random access procedure with the base station (S13 to S16). For example, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the base station (S17) and transmit a Physical Uplink Shared Channel (PUSCH) and/or a Physical Uplink Control Channel (PUCCH) to the base station (S18), in a general UL/DL signal transmission procedure.

Control information that the UE transmits to the base station is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
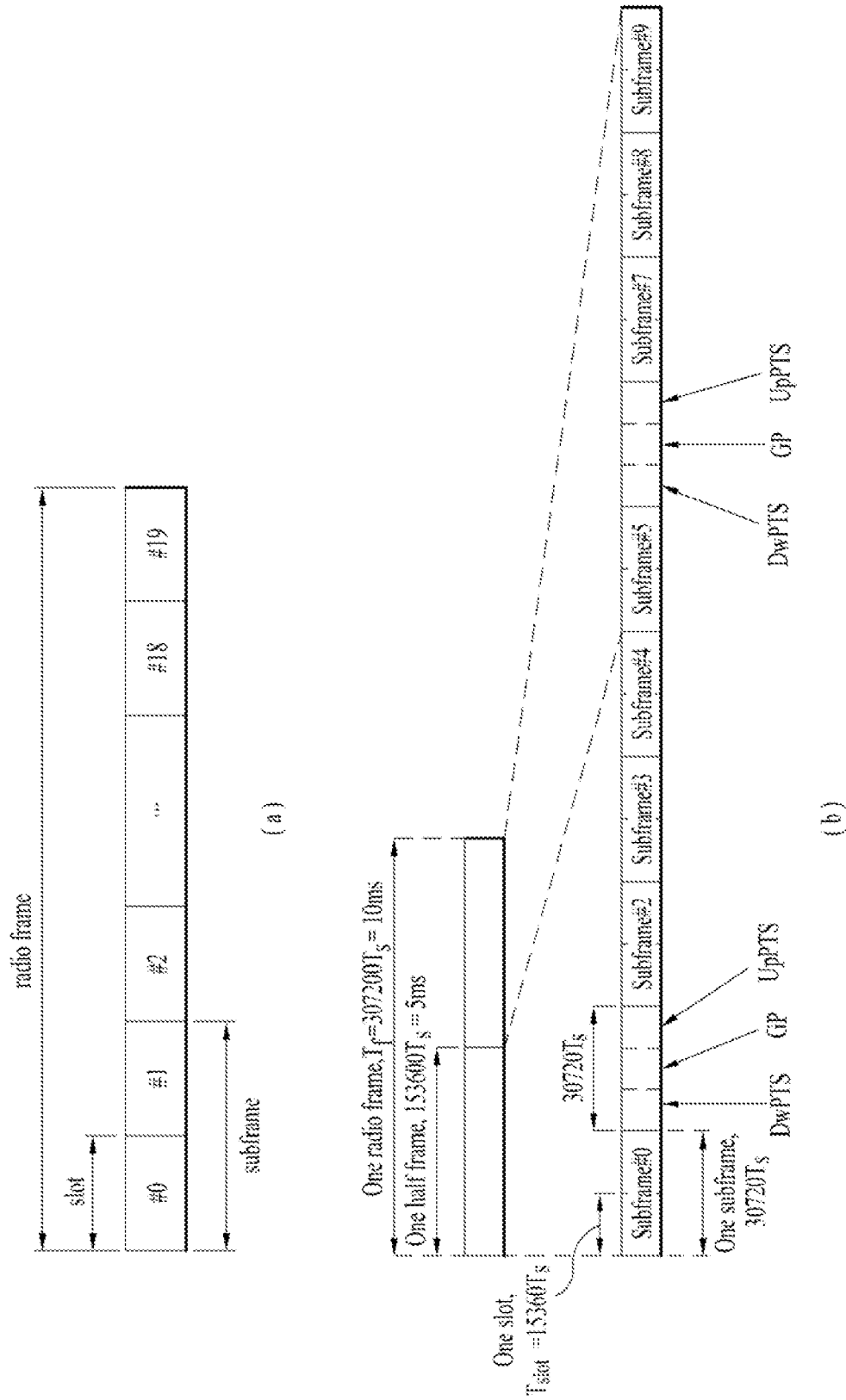
FIG. 2 illustrates exemplary radio frame structures in accordance with an embodiment of the present disclosure.

FIG. 2 illustrates exemplary radio frame structures in accordance with an embodiment of the present disclosure.

FIG. 2(a) illustrates frame structure type 1. Frame structure type 1 is applicable to both a full duplex Frequency Division Duplex (FDD) system and a half duplex FDD system.

One radio frame may be $T_f=307200*T_s=10$ ms long, including equal-sized 20 slots indexed from 0 to 19. Each slot is $T_{slot}=15360*T_s=0.5$ ms long. One subframe includes two successive slots. An $i^{th}$ subframe may include $2i^{th}$ and $(2i+1)^{th}$ slots. That is, a radio frame may include 10 subframes. A time required for transmitting one subframe is defined as a Transmission Time Interval (TTI). $T_s$ is a sampling time given as $T_s=1/(15 \text{ kHz}*2048)=3.2552*10^{-8}$ (about 33 ns). One slot may include a plurality of Orthogonal Frequency Division Multiplexing (OFDM) symbols or SC-FDMA symbols in the time domain and may include a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full duplex FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half duplex FDD system.

The above-described radio frame structure is purely exemplary. Thus, the number of subframes in a radio frame, the number of slots in a subframe, and the number of OFDM symbols in a slot may be changed in various manners.

FIG. 2(b) illustrates frame structure type 2. Frame structure type 2 is applied to a Time Division Duplex (TDD) system. One radio frame is $T_f=307200*T_s=10$ ms long, including two half-frames each having a length of $153600*T_s=5$ ms long. Each half-frame includes five subframes each being $30720*T_s=1$ ms long. An $i^{th}$ subframe includes $2i^{th}$ and $(2i+1)^{th}$ slots each having a length of $T_{slot}=15360*T_s=0.5$ ms. $T_s$ is a sampling time given as $T_s=1/(15 \text{ kHz}*2048)=3.2552*10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at a base station. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In addition, in the LTE Release 13 system, configurations configured in consideration of X as illustrated in the following Table 2 was introduced to the special subframe configurations. In the LTE Release14 system, specific subframe configuration #10 was newly added. Here, X represents the number of additional SC-FDMA symbols, and may be provided by the higher layer parameter named "srs-UpPtsAdd". If this parameter is not configured, X is set equal to 0. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.

Figure 4:
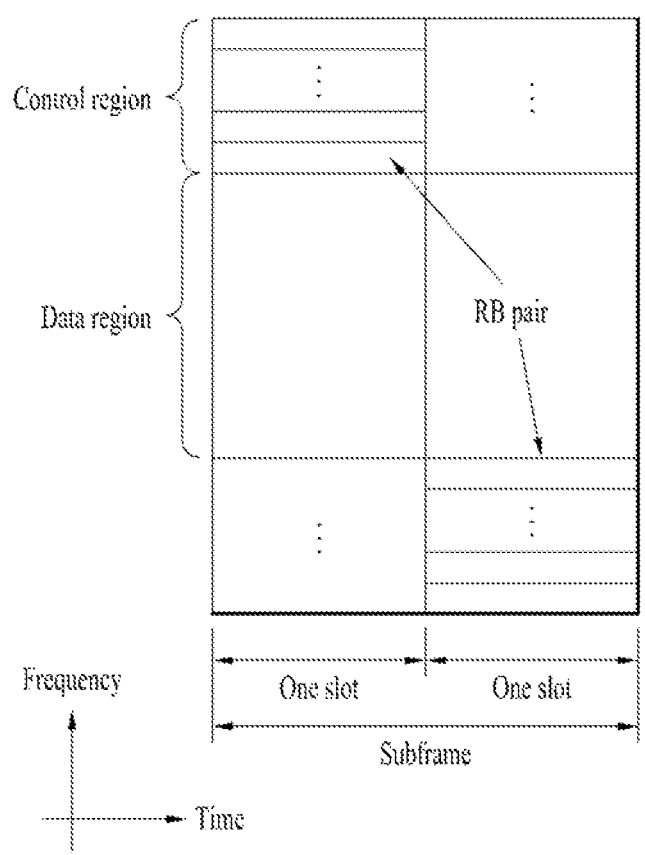
FIG. 4 illustrates a structure of an uplink subframe in accordance with an embodiment of the present disclosure.

FIG. 4 illustrates a structure of an uplink subframe in accordance with an embodiment of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
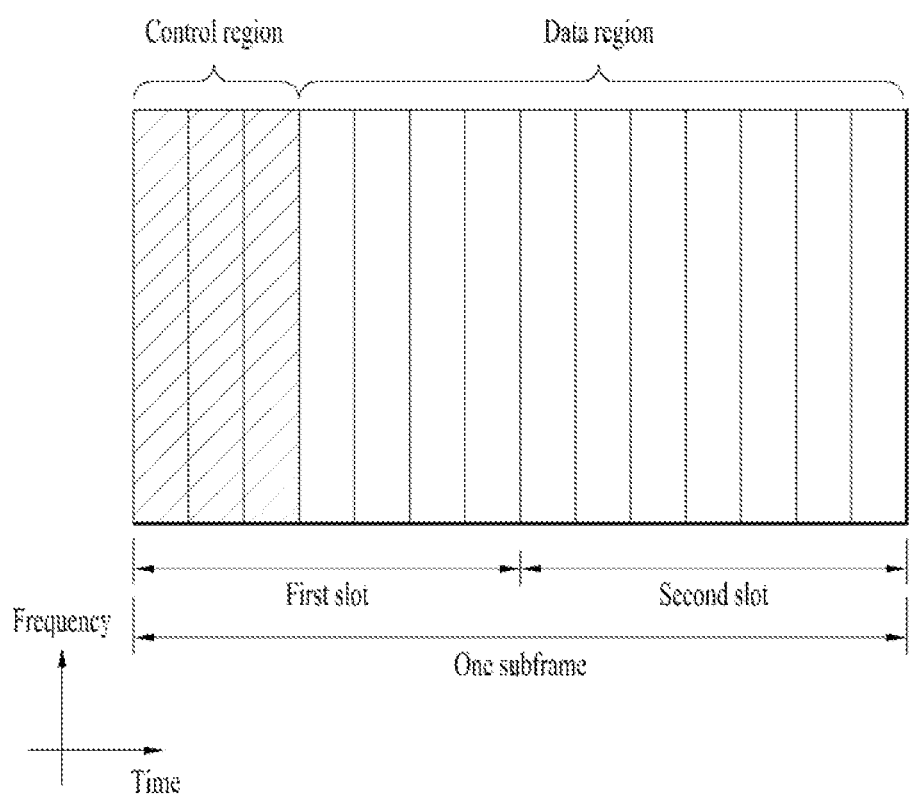
FIG. 5 illustrates a structure of a downlink subframe in accordance with an embodiment of the present disclosure.

FIG. 5 illustrates a structure of a downlink subframe in accordance with an embodiment of the present disclosure.

Referring to FIG. 5, up to three OFDM symbols from OFDM symbol index 0 to in the first slot within a subframe, are used as a control region to which control channels are

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix tn uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
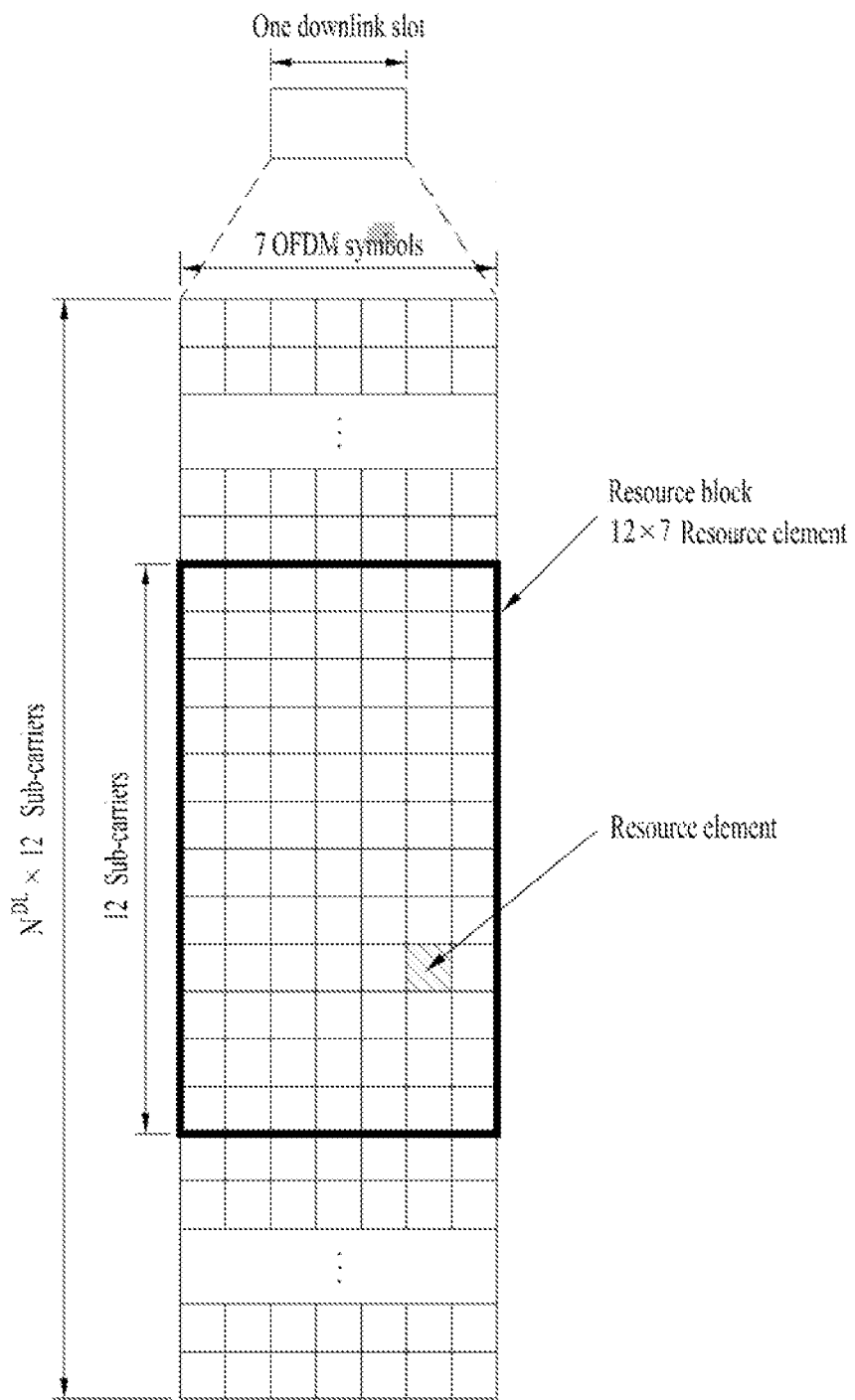
FIG. 3 illustrates a resource grid for a downlink slot in accordance with an embodiment of the present disclosure.

FIG. 3 illustrates a resource grid for a downlink slot in accordance with an embodiment of the present disclosure.

Referring to FIG. 3, one downlink slot may include a plurality of OFDM symbols in the time domain. For example, one downlink slot may include 7 OFDM symbols in the time domain and one resource block may include 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

allocated and the other OFDM symbols of the subframe are used as a data region to which a PDSCH is allocated. Downlink control channels defined for the 3GPP LTE system may include a Physical Control Format Indicator Channel (PCFICH), a PDCCH, and a Physical Hybrid ARQ Indicator Channel (PHICH), and so on, to which the present disclosure is not limited.

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As a number of communication devices have required higher communication capacity, the necessity for the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

The new radio access technology system has been proposed by considering the enhanced mobile broadband communication, massive MTC, Ultra-reliable and low latency communication (URLLC), etc. In the present invention, the corresponding technology is referred to as the new RAT or new radio (NR) for convenience of description.

2.1. Numerologies

The NR system to which the present invention is applicable supports various OFDM numerologies as shown in the following table. In this case, the value of μ and cyclic prefix information per carrier bandwidth part may be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

For DL and UL transmission, a frame may be configured to have a length of 10 ms. Each frame may be composed of ten subframes, each having a length of 1 ms. In this case, the number of consecutive OFDM symbols in each subframe is defined as $N_{symb}^{subframe,\mu} = N_{symb}^{slot} N_{slot}^{subframe,\mu}$.

Each subframe may be composed of two half-frames with the same size. In this case, the two half-frames are composed of subframes 0 to 4 and subframes 5 to 9, respectively.

Regarding the subcarrier spacing slots may be numbered within one subframe in ascending order like $n_s^\mu \in \{0, \ldots, N_{slot}^{subframe,\mu}-1\}$ and may also be numbered within a frame in ascending order like $n_{s,f}^\mu \in \{0, \ldots, N_{slot}^{frame,\mu}-1\}$. In this case, the number of consecutive OFDM symbols in one slot ($N_{symb}^{slot}$) may be determined based on the cyclic prefix as shown in the following table. The start slot ($n_s^\mu$) of one subframe is aligned with the start OFDM symbol ($n_s^\mu N_{symb}^{slot}$) of the same subframe in the time dimension.

Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $N_{slot}^{subframe,\mu}$ |
|---|---|---|---|
| 2 | 12 | 40 | 4 |

3. NB-IoT (Narrow Band-Internet of Things)

The technical features of an NB-IoT system will be described below in detail. While the following description is given in the context of NB-IoT based on the 3GPP LTE standards, for the convenience of description, the corresponding features are applicable in the same manner to the 3GPP NR standards. For this purpose, some technical features may be interpreted with changed (for example, the term subframe may be changed to the term slot).

Therefore, while NB-IoT is described based on the LTE standard technology, the LTE standard technology may be interpreted with changed to the NR standard technology, as far as those skilled in the art could easily derive.

3.1. Operation Modes and Frequencies

NB-IoT supports three operation modes: in-band mode, guard-band mode, and stand-alone mode, and the same requirements are applied to the operation modes.

(1) In the in-band mode, a part of in-band resources of the LIE system is allocated to the NB-IoT system for NB-IoT deployment.

(2) In the guard-band mode, a guard frequency band of the LTE system is used, and an NB-IoT carrier is positioned as close as possible to an edge subcarrier of the LTE system.

(3) In the stand-alone mode, some carriers of a Global System for Mobile Communications (GSM) band are allocated to the NB-IoT system for NB-IoT deployment.

An NB-IoT UE searches for an anchor carrier in units of 100 kHz, for initial synchronization, and a center frequency of the anchor carrier should be positioned within ±7.5 kHz from the 100 kHz channel raster in in-band and guard-band deployments. An NB-IoT UE may refer to a UE operating in the NB-IoT system or a UE supporting NB-IoT. Among the LTE physical resource blocks (PRBs), six center PRBs are not allocated to the NB-IoT system. Therefore, an anchor carrier may be positioned only in a certain PRB.

Figure 6:
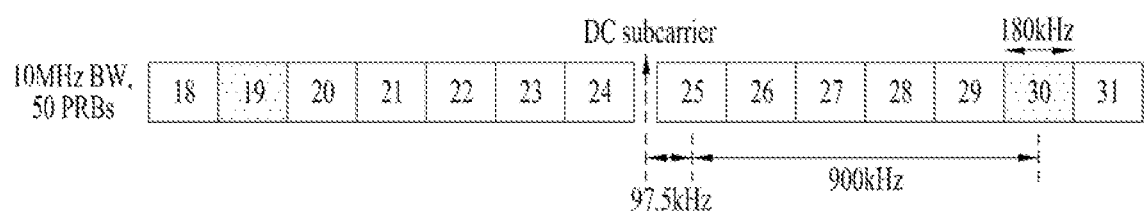
FIG. 6 is a diagram illustrating arrangement of an in-band anchor carrier in an LTE system according to an embodiment of the present disclosure.

FIG. 6 is a diagram illustrating arrangement of an in-band anchor carrier in an LTE system according to an embodiment of the present disclosure.

As illustrated in FIG. 6, a direct current (DC) subcarrier is on a channel raster. Since the center frequency spacing between neighboring PRBs is 180 kHz, the center frequencies of PRB indexes 4, 9, 14, 19, 30, 35, 40, and 45 are positioned at ±2.5 kH from the channel raster.

Given a bandwidth of 20 MHz, the center frequency of a PRB suitable for transmissions on an anchor carrier is positioned at ±2.5 kHz from the channel raster. Given bandwidths of 3 MHz, 5 MHz, and 15 MHz, the center frequency of a PRB suitable for transmissions on an anchor carrier is positioned at ±7.5 kHz from the channel raster.

In the guard-band mode, given bandwidths of 10 MHz and 20 MHz, the center frequency of a PRB adjacent to an edge PRB of the LTE system is positioned at ±2.5 kHz from the channel raster. Further, given bandwidths of 3 MHz, 5 MHz, and 15 MHz, as a guard frequency band corresponding to three subcarriers from an edge PRB is used, the center frequency of an anchor carrier may be positioned at ±7.5 kHz from the channel raster.

An anchor carrier in the standalone-mode is aligned with the 100-kHz channel raster, and all GSM carriers including the DC carrier are available as an NB-IoT anchor carrier.

Further, NB-IoT supports the use of multiple carriers, and a combination of in-band and in-band, in-band and guard-band, guard-band and guard-band, or stand-alone and stand-alone may be used.

3.2. Physical Channels 3.2.1. Downlink (DL)

In the NB-IoT system, DL adopts orthogonal frequency division multiple access (OFDMA) with a subcarrier spacing of 15 kHz. OFDMA provides orthogonality between subcarriers, thus enabling reliable co-existence between the NB-IoT system and the LTE system.

Physical channels such as narrowband physical broadcast channel (NPBCH), narrowband physical downlink shared channel (NPDSCH), and narrowband physical downlink control channel (NPDCCH) may be provided in downlink, and physical signals such as narrowband primary synchronization signal (NPSS), narrowband primary synchronization signal (NSSS), and narrowband reference signal (NRS) may be provided in downlink.

Figure 7:
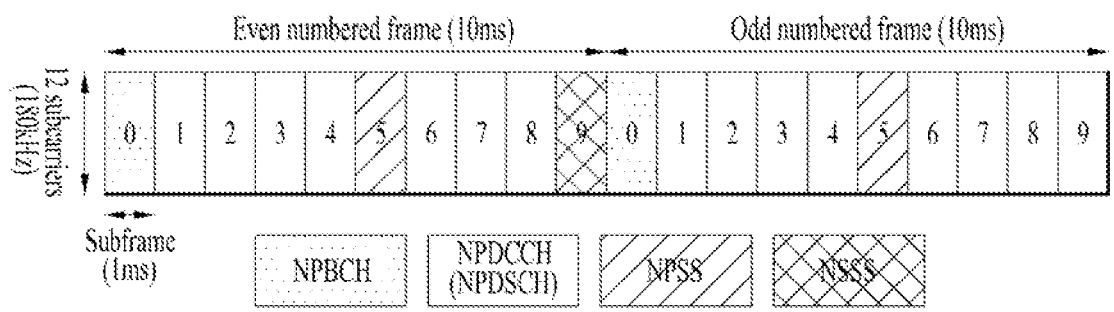
FIG. 7 is a diagram illustrating the positions where downlink physical channels and downlink signals are transmitted in the LTE system operating in FDD according to an embodiment of the present disclosure.

FIG. 7 is a diagram illustrating the transmission positions of a DL physical channel and DL signals in a LTE system operating in FDD according to an embodiment of the present disclosure.

An NB-IoT UE should obtain system information of a cell to access a network, and obtain synchronization with the cell in a cell search procedure to obtain the system information of the cell. To enable the NB-IoT UE to obtain synchronization with the cell, synchronization signals may be transmitted in downlink.

The NB-IoT UE obtains frequency synchronization, symbol synchronization, and frame synchronization by using the synchronization signals, and searches 504 physical cell IDs (PCIDs). Because LTE synchronization signals are transmitted in resources of six PRBs, it is impossible to reuse the synchronization signals of the LTE system in the NB-IoT system using one PRB.

Accordingly, new synchronization signals (e.g., NPSS and NSSS) of the NB-IoT system have been designed, and may be applied to the three NB-IoT operation modes in the same manner.

As illustrated in FIG. 7, the NPBCH is transmitted in the first subframe of each radio frame, the NPSS is transmitted in the sixth subframe of each radio frame, and the NSSS is transmitted in the last subframe of each even-numbered frame.

More specifically, the NPSS is constructed with a Zadoff-Chu (ZC) sequence of length 11 with root index 5. The NPSS may be generated according to Equation 1 below.

$$d_l(n) = S(l) \cdot e^{-j\frac{\pi i n(n+1)}{11}}, n = 0, 1, \ldots, 10 \quad \text{[Equation 1]}$$

S(l) for symbol index l may be defined as shown in Table 6 below.

TABLE 6

| Cyclic prefix length | S(3), . . . , S(13) |
|---|---|
| Normal | 1  1  1  1  −1  −1  1  1  1  −1  1 |

Further, the NSSS is constructed with a combination of a ZC sequence of length 131 and a binary scrambling sequence such as a Hadamard sequence. Particularly, the NSSS indicates a PCID to NB-IoT UEs within a cell by the combination of sequences.

The NSSS may be generated according to [Equation 2].

$$d(n) = b_q(m)e^{-j2\pi\theta_f n}e^{-j\frac{\pi n'(n'+1)}{131}} \quad \text{[Equation 2]}$$

The variables used in Equation 2 may be defined as shown in Table 7 below.

TABLE 7

| variable | definition |
|---|---|
| n | 0, 1, . . . , 131 |
| n' | n mod 131 |
| m | n mod 128 |
| u | $N_{ID}^{NCell}$ mod 126 + 3 |
| q | $\dfrac{N_{ID}^{NCell}}{126}$ |

Further, the binary sequence bq(m) may be defined as shown in Table 8 below, and a cyclic shift $\theta_f$ for a frame number of may be defined as shown in [Equation 3].

TABLE 8

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1 −1 1 −1 −1 1 1<br>1 −1 −1 1 −1 1 1 −1 −1 1 −1 −1 1 −1 1 1 −1 −1 1 1 −1 1 −1 −1 1 −1<br>1 1 −1 1 −1 −1 1 1 1 −1 −1 1 1 −1 1 −1 −1 1 1 −1 1 −1 −1 1 1<br>1 −1 1 −1 −1 1 1 −1 −1 1 −1 1 1 −1 −1 1 −1 1 1 −1 −1 1 1 −1<br>1 −1 1 1 −1 −1 1 1 −1 1 −1 −1 1 1 −1 1 −1 −1 1 −1 1 1 −1 −1 1<br>1 −1 1 1 −1] |
| 2 | [1 −1 −1 1 −1 1 1 −1 −1 1 1 −1 1 −1 −1 1 −1 1 1 −1 −1 1 −1 −1 1 1<br>1 −1 −1 1 −1 1 1 −1 −1 1 −1 −1 1 −1 1 1 −1 −1 1 1 −1 1 −1 −1 1<br>1 −1 −1 1 −1 1 1 −1 −1 1 1 −1 1 −1 −1 1 −1 1 1 −1 −1 1 1 −1<br>1 1 −1 1 −1 −1 1 1 −1 −1 1 1 −1 1 −1 −1 1 1 −1 1 −1 −1 1 1<br>1 −1 1 −1 −1 1 1 −1 −1 1 1 −1 1 −1 −1 1 −1 1 1 −1 −1 1 −1 1<br>1 −1 1 −1 1 1] |
| 3 | [1 −1 −1 1 −1 1 1 −1 −1 1 1 −1 1 −1 −1 1 −1 1 1 −1 −1 1 −1 −1 1 1<br>1 −1 −1 1 −1 1 1 −1 −1 1 −1 −1 1 −1 1 1 −1 −1 1 1 −1 1 −1 −1 1<br>1 −1 −1 1 −1 1 1 −1 −1 1 1 −1 1 −1 −1 1 −1 1 1 −1 −1 1 1 −1<br>1 −1 −1 1 1 −1 1 −1 −1 1 −1 1 1 −1 −1 1 1 −1 1 −1 −1 1 −1 1<br>1 −1 −1 1 −1 1 1 −1 −1 1 1 −1 1 −1 −1 1 −1 1 1 −1 −1 1 1 −1<br>1 −1 −1 1 −1 1 1 −1] |

$$\theta_f = \frac{33}{132}(n_f/2)\bmod 4 \quad \text{[Equation 3]}$$

The NRS is a reference signal for channel estimation required to demodulate a DL physical channel. The NRS may be generated in the same manner as in the LTE system. However, the NRS uses a narrowband-physical cell ID (NB-PCID) as an initial value for initialization.

The NRS is transmitted through one or two antenna ports, and up to two transmission antennas are supported at a base station in the NB-IoT system.

The NPBCH delivers a narrowband master information block (MIB-NB) to an NB-IoT UE, and the MIB-NB is minimum system information that an NB-IoT UE should obtain to access the system.

The MIB-NB has a transport block size (TBS) of 34 bits, and is updated in every 640-ms transmission time interval (TTI). The MIB-NB may include information about an operation mode, a system frame number (SFN), a hyper-SFN, the number of cell-specific reference signal (CSR) ports, a channel raster offset, and so on.

An NPBCH signal may be transmitted repeatedly a total of 8 times, for coverage enhancement.

The NPDCCH has the same transmit antenna configuration as that of the NPBCH, and supports three types of downlink control information (DCI) formats (e.g., DCI N0, N1, N2). DCI N0 is used to transmit narrowband physical uplink shared channel (NPUSCH) scheduling information to a UE. DCI N1 and DCI N2 are used to deliver information required for demodulation of the NPDSCH to the UE. For coverage enhancement, the NPDCCH may be transmitted repeatedly up to 2048 times.

The NPDSCH is a physical channel carrying transport channels (TrCHs) such as downlink-shared channel (DL-SCH) and paging channel (PCH). The NPDSCH has a maximum TBS of 680 bits, and may be transmitted repeatedly up to 2048 times, for coverage enhancement.

3.2.2. Uplink (UL)

UL physical channels include narrowband physical random access channel (NPRACH) and NPUSCH, and support single-tone transmission and multi-tone transmission.

Only for a subcarrier spacing of 15 kHz, multi-tone transmission is supported, whereas for subcarrier spacings of 3.5 kHz and 15 kHz, single-tone transmission is supported.

With the subcarrier spacing of 15 kHz for UL, orthogonality with the LTE system may be maintained, thereby providing optimum performance. In contrast, a subcarrier spacing of 3.75 kHz may lead to interference-caused performance degradation due to impaired orthogonality.

An NPRACH preamble includes four symbol groups, each including a cyclic prefix (CP) and 5 symbols. The NPRACH supports only single-tone transmission with the 3.75-kHz subcarrier spacing, and provides CPs with lengths of 66.7 μs and 266.67 μs in order to support different cell radii.

Each symbol group performs frequency hopping. A subcarrier carrying a first symbol group is determined in a pseudo-random manner. A second symbol group is subjected to 1-subcarrier hopping, a third symbol group is subjected to 6-subcarrier hopping, and a fourth symbol group is subjected to 1-subcarrier hopping. For repeated transmissions, the above frequency hopping procedure may be applied repeatedly, and the NPRACH preamble may be transmitted repeatedly up to 128 times, for coverage enhancement.

The NPUSCH may support two formats. Format 1 is used for UL-SCH transmission, has a maximum TBS of 1,000 bits. Format 2 is used for transmitting UL control information such as HARQ ACK signaling. Format 1 supports single-tone transmission and multi-tone transmission, whereas Format 2 supports only single-tone transmission. To reduce a peak-to-average power ratio (PAPR), p/2-binary phase shift keying (p/2-BPSK) or p/4-quadrature phase shift keying (p/4-QPSK) may be used for single-tone transmission.

3.2.3. Resource Mapping

In the stand-alone mode and the guard-band mode, all resources of one PRB may be allocated to the NB-IoT system. On the other hand, in the in-band mode, there is a limit on resource mapping to maintain orthogonality with a signal of the legacy LTE system.

An NB-IoT UE should detect the NPSS and the NSSS for initial synchronization, in the situation that it does not have system information. Therefore, resources classified as a region allocated for control channels of the LTE system (OFDM symbol 0 to OFDM symbol 2 in each subframe) are not available for the NPSS and the NSSS, and NPSS and NSSS symbols mapped to resource elements (REs) overlapped with the CRS of the LTE system should be punctured.

Figure 8:
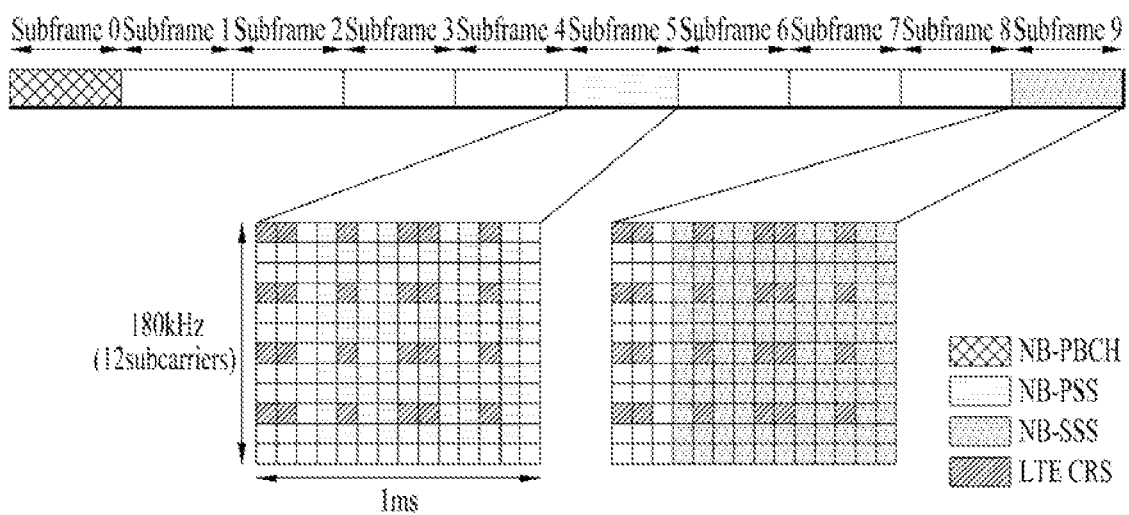
FIG. 8 is a diagram illustrating resource allocation for signals of an NB-IoT system and signals of an LTE system in the in-band mode according to an embodiment of the present disclosure.

FIG. 8 is a diagram illustrating resource allocation for signals of an NB-IoT system and signals of an LTE system in the in-band mode according to an embodiment of the present disclosure.

To facilitate implementation, the NPSS and the NSSS are not transmitted in the first three OFDM symbols of a subframe, corresponding to the resource region carrying a control channel in the legacy LTE system, irrespective of the operation modes of the NB-IoT system. REs for the NPSS/NSSS colliding with CRS REs and physical resources of the legacy LTE system are punctured not to affect the legacy LTE system.

Since the NB-IoT UE demodulates the NPBCH in the situation of not having system information other than a PCID after cell search, NPBCH symbols may not be mapped to the control channel allocation region of the LTE system. Moreover, four LTE antenna ports and two NB-IoT antenna ports should be assumed, and thus REs for the CRS and the NRS may not be allocated to the NPBCH. Accordingly, the NPBCH should be rate-matched according to available resources.

Although the NB-IoT UE obtains information about the number of CRS antenna ports after demodulating the NPBCH, the NB-IoT UE still has no knowledge of the region to which a control channel of the LTE system is allocated. Therefore, an NPDSCH carrying system information block type 1 (SIB1) data is not mapped to resources classified as the region to which a control channel is allocated in the LTE system.

Compared to the NPBCH, however, REs that are not allocated to the CRS of the LTE system may be allocated to the NPDSCH. After receiving SIB1, the NB-IoT UE obtains all of resource mapping-related information. Therefore, an NPDSCH (except for an NPDSCH carrying SIB1) and an NPDCCH may be mapped to available resources based on control channel information and the number of CRS antenna ports of the LTE system.

4. Proposed Embodiments

A detailed description will be given of proposed features of the present disclosure based on the above-described technical idea.

An NB-IoT UE may support both of normal coverage corresponding to the coverage of a legacy LTE UE, and extended coverage wider than the normal coverage. For example, normal coverage and extended coverage correspond to −6 dB and −12 dB, respectively, in terms of signal-to-noise ratio (SNR), and the requirements for normal coverage and extended coverage are separately defined in TS 36.133 "Requirements for support of radio resource management".

In extended coverage, it may take relatively much time for the NB-IoT UE to obtain system information. Therefore, it is expected that a method of improving the performance of system information acquisition at an NB-IoT UE will be proposed in LTE Release 15. The system information may include an MIB-NB and an SIB1-NB. In some embodiments, the system information may include additional information such as SIB2-NB.

After completing cell search, the performance of system information acquisition at the NB-IoT UE may be improved by using an advanced receiver or by repeatedly transmitting an MIB-NB and an SIB1-NB. In this context, the present patent application proposes a method of additionally transmitting at least one of an MIB-NB or an SIB1-NB in order to improve the performance of system information acquisition at an NB-IoT UE. For example, to improve the SIB1-NB decoding performance of an NB-IoT UE, a base station may additionally transmit an aSIB-NB besides the conventional SIB1-NB. The additionally transmitted MIB-NB and SIB1-NB may be referred to as, but not limited to, an additional MIB-NB (or aMIB-NB) and additional SIB1-NB (or aSIB1-NB), respectively.

Further, the present patent application proposes message configurations and the positions of transmission subframes for the new additionally transmitted MIB-NB and SIB1-NB. For the convenience of description, the additionally transmitted MIB-NB and SIB1-NB will be referred to as an aMIB-NB and an aSIB1-NB, respectively.

After cell search by the NPSS and the NSSS, the NB-IoT UE may obtain system information. For example, the NB-IoT UE may obtain time synchronization on a 20 msec basis during cell search, and detect an MIB-NB based on the obtained system synchronization.

Information of the MIB-NB may be modified every 640 msec, and a period in which the information of the MIB-NB is modified may be referred to as an MIB-NB-TTI. For example, the MIB-NB is transmitted in subframe #0 on the NPBCH every 10 msec within an MIB-NB-TTI, and an MIB-NB transmitted on each NPBCH may be self-decodable. Subsequently, the NB-IoT UE may detect an SIB1-NB based on information about the number of NRS antennas obtained from the NPBCH, and information included in the MIB-NB. SIB1-NB scheduling information is included in the MIB-NB, and a scheduling unit for SIB1-NB indicated by the MIB-NB may be 2560 msec (SIB1-NB-TTI). Therefore, if the NB-IoT UE fails to detect the SIB1-NB within the SIB1-NB-TTI, the NB-IoT UE should obtain SIB1-NB scheduling information, i.e. schedulingInfoSIB1-r13, by detecting the MIB1-NB again. However, a period during which information of the SIB1-NB may be modified is 40960 msec.

Table 9 below compares times taken for a Cat. 0 UE and an NB-IoT UE (Cat. NB1) to detect system information based on the above-described cell search operation. In Table 9, the times taken for detecting system information are separately listed in the cases of normal coverage and extended coverage, which correspond to the SINRs of −6 dB and −12 dB, respectively.

TABLE 9

| Parameter | Cat 0 | Cat NB1 NC | Cat NB1 EC |
|---|---|---|---|
| T_MIB-NB | 50 msec | 640 msec | 2560 msec |
| T_SIB1-NB | | 5120 msec | 29440 msec |
| T_SIB2-NB | | 2560 msec | 9560 msec |
| T_SI for cell re-selection | 1280 msec | 8320 msec | 41560 msec |
| T_SI for RRC re-establishment | 1280 msec | 8320 msec | 41560 msec |

NOTE 1:
The parameters T_MIB-NB and T_SI are defined in TS 36.133

NOTE 2:
The terms NC and EC are abbreviations for normal coverage and enhanced coverage, respectively NOTE 3:
The values for SI acquisition delays for Category NB1 UEs have been derived using baseband only simulations and do not include RF impairment margin NOTE 4:
The SIB2-NB acquisition delay depends on network configuration Referring to Table 9, a time taken to detect an SIB2-NB may be different according to a base station configuration. Particularly, in extended coverage, since a time taken for detecting the MIB-NB is equal to the SIB1-NB-TTI, the NB-IoT UE is highly likely to have to detect the MIB-NB in each SIB1-NB-TTI. Further, a time taken for detecting the SIB1-NB corresponds to about 12 SIB1-NB-TTIs, occupying 70% of an SIB1-NB modification period, 40960 msec. Accordingly, the present patent application proposes a method of reducing a time taken for detecting an MIB-NB and an SIB1-NB.

4.1. Proposal 1: "Radio Frame Structure for Anchor Carrier Including aMIB-NB and aSIB1-NB"

Table 10 to Table 12 respectively illustrate radio frame structures Alt. 1, Alt. 2, and Alt. 3 for an anchor carrier including an aMIB-NB and an aSIB1-NB proposed by the present patent application.

TABLE 10

| $n_f$ mod 4 | subframe number | | | | | | | | | |
|---|---|---|---|---|---|---|---|---|---|---|
| | 0 | 1 | 2 | 3 | 4 | 5 | 6 | 7 | 8 | 9 |
| 0 | MIB | aMIB | | (aSIB1) | SIB1 | NPSS | | | | NSSS |
| 1 | MIB | (aMIB) | | (aSIB1) | (SIB1) | NPSS | | | | |
| 2 | MIB | aMIB | | (aSIB1) | SIB1 | NPSS | | | | NSSS |
| 3 | MIB | (aMIB) | | (aSIB1) | (SIB1) | NPSS | | | | |

TABLE 11

| $n_f$ mod 4 | subframe number | | | | | | | | | |
|---|---|---|---|---|---|---|---|---|---|---|
| | 0 | 1 | 2 | 3 | 4 | 5 | 6 | 7 | 8 | 9 |
| 0 | MIB | aMIB | | | SIB1 | NPSS | | | | NSSS |
| 1 | MIB | (aMIB) | | | (SIB1) | NPSS | | | | (aSIB1) |
| 2 | MIB | aMIB | | | SIB1 | NPSS | | | | NSSS |
| 3 | MIB | (aMIB) | | | (SIB1) | NPSS | | | | (aSIB1) |

TABLE 12

| $n_f$ mod 4 | subframe number | | | | | | | | | |
|---|---|---|---|---|---|---|---|---|---|---|
|  | 0 | 1 | 2 | 3 | 4 | 5 | 6 | 7 | 8 | 9 |
| 0 | MIB |  |  |  | SIB1 | NPSS |  |  |  | NSSS |
| 1 | MIB |  |  |  | (aMIB) | NPSS |  |  |  | (aSIB1) |
| 2 | MIB |  |  |  | SIB1 | NPSS |  |  |  | NSSS |
| 3 | MIB |  |  |  | (aMIB) | NPSS |  |  |  | (aSIB1) |

In the structures Alt. 1 and Alt. 2, the aMIB-NB is located in subframe #1. A legacy NB-IoT UE does not attempt to detect the MIB-NB at the position of subframe #1. Therefore, even though the aMIB-NB is located in subframe #1, this does not affect the MIB-NB detection performance of the legacy NB-IoT UE. Subframe #1 may refer to a subframe corresponding to subframe index 1.

In the guard-band mode and the stand-alone mode, since the NRS may always be transmitted in any subframe which is indicated as 1 in DL-Bitmap-NB and is one of subframes #0, #1, #3, and #4, and subframe #9 carrying no NSSS, subframe #1 may be suitable for transmitting the aMIB-NB. Further, if the aMIB-NB is transmitted in subframe #1, the MIB-NB and the aMIB-NB are in two consecutive subframes. Therefore, the NB-IoT UE may attempt to simultaneously detect the MIB-NB and the aMIB-NB by turning on/off an RF module only once, thereby reducing power consumption for detecting the MIB-NB and the aMIB-NB.

If the MIB-NB and the aMIB-NB are located in subframes which are not adjacent with each other, the NB-IoT UE may turn on/off the RF module at the start and end of each of the subframes, and power may additionally be consumed at the start and end of the RF module on/off period.

However, the aMIB-NB may not be transmitted in every radio frame. For example, referring to Table 10 and Table 11, an aMIB-NB transmission may be skipped in a radio frame including "(aMIB)". The position of a radio frame including "aMIB" and the position of a radio frame including "(aMIB)" may be changed, and the number of (aMIB) included within 40 msec may be changed. However, considering blind detection during aMIB-NB detection process of the NB-IoT UE in each 20-msec unit, an aMIB-NB transmission pattern needs to be determined on a 20-msec basis. Therefore, the transmission period of the aMIB-NB may be 20 ms.

Referring to Table 10 and Table 11, the transmission positions of the aSIB1-NB may be subframe #3, and subframe #9 of a radio frame that does not carry the NSSS. The aSIB1-NB may transmitted or skipped according to the repetition number and TBS of the SIB1-NB as defined in Table 16.4.1.3-3 and Table 16.4.1.5.2-1 of TS 36.213. For example, if the repetition number of the SIB1-NB is 4 or 8, the aSIB-NB may be transmitted the same number of times as the SIB1-NB, or half the number of times of the SIB1-NB. In some embodiments, a transmission of the aSIB1-NB may be skipped. Or if the repetition number of the SIB1-NB is 4 or 8, the aSIB1-NB may be skipped, and if the repetition number of SIB1-NB is 16, the aSIB-NB may be transmitted the same number of times as the SIB1-NB.

As described before, in the guard-band mode and the stand-alone mode, the NRS may always be transmitted in any subframe which is indicated as 1 in DL-Bitmap-NB and is one of subframes #0, #1, #3, and #4, and subframe #9 carrying no NSSS. Therefore, subframes carrying the aSIB1-NB in Alt. 1 and Alt. 2 may be suitable for transmission of the aSIB1-NB. In Alt. 3, the aSIB1-NB is transmitted at the same positions as in Alt. 2, but Alt. 3 is different from Alt. 2 in that the aMIB-NB is additionally transmitted in subframe #4 of a radio frame that does not carry the SIB1-NB. The transmission positions of the aMIB-NB and radio frames carrying the SIB1-NB may be exchanged in Table 12 according to an NB-IoT cell ID and the repetition number of the SIB1-NB.

Table 13 illustrates a structure (Alt. 4) in which the aMIB-NB may be transmitted in subframe #9 of a radio frame that does not carry the NSSS.

TABLE 13

| $n_f$ mod 4 | subframe number | | | | | | | | | |
|---|---|---|---|---|---|---|---|---|---|---|
|  | 0 | 1 | 2 | 3 | 4 | 5 | 6 | 7 | 8 | 9 |
| 0 | MIB |  |  |  | SIB1 | NPSS |  |  |  | NSSS |
| 1 | MIB |  |  |  | (SIB1) | NPSS |  |  |  | aMIB |
| 2 | MIB |  |  |  | SIB1 | NPSS |  |  |  | NSSS |
| 3 | MIB |  |  |  | (SIB1) | NPSS |  |  |  | aMIB |

In Alt. 4, subframe #9 carrying the aMIB-NB offers the benefit as described before. Further, since subframe #9 is adjacent to subframe #0 carrying the MIB-NB in time, the NB-IoT UE may attempt to simultaneously detect the MIB-NB and the aMIB-NB by one-time on/off of the RF module, and reduce power consumption for detecting the MIB-NB and the aMIB-NB. However, Alt. 4 is effectively used when only an increase of 50% of the MIB-NB is needed as compared to the conventional scheme, and Alt. 4 can provide the additional advantage that no constraint is imposed on the multimedia broadcast single frequency network (MBSFN) subframe configuration of a legacy base station.

Further, in some embodiments, the position of a subframe available for transmission of the aSIB and the aMIB may be generalized as the position of an NSSS subframe in a radio frame that does not carry the NSSS, not specified as subframe #9. The position of an NSSS subframe may refer to the position of a subframe in which the NSSS is transmittable in a radio frame. For example, when the NSSS is transmitted in subframe #X of a radio frame, the position of an NSSS subframe in a radio frame that does not carry the NSSS may be subframe #X of the radio frame that does not carry the NSSS.

In a time division duplex (TDD) system, a subframe carrying the NSSS is always a DL subframe. Thus, if the position of a subframe available for transmission of the aSIB and the aMIB is defined as the position of an NSSS subframe in a radio frame that does not carry the NSSS, a relative position of an aMIB-NB or aSIB1-NB subframe may be specified based on the position of the NSSS subframe in the TDD system. For example, the aMIB or the aSIB1 may be transmitted in subframe #9 that does not carry the NSSS.

From the perspective of a legacy NB-IoT UE, the aMIB-NB and aSIB1-NB positions are periods unavailable for downlink of the NPDCCH and the NPDSCH. The aMIB-NB and aSIB1-NB positions may refer to the positions of a subframe carrying an aMIB-NB and a subframe carrying an aSIB-NB, respectively. Therefore, the base station needs to indicate the positions of subframes carrying the aMIB-NB and the aSIB1-NB to the NB-IoT UE by setting values corresponding to the positions of the subframes to 0 in DL-Bitmap-NB-r13. Information about the positions of valid DL subframes in DL-Bitmap-NB-r13 may be indicated by subframe pattern10-r13 and subframe pattern40-r13 which may be interpreted with periodicities of 10 msec and 40 msec, respectively. If bits corresponding to the positions of the aMIB-NB and the aSIB1-NB are indicated as 0 by subframe Pattern40-r13, it is advantageous in that additionally retransmitted aMIB and/or aSIB1 may be decreased by up to 25%.

However, The base station appropriately schedules the NPDCCH and the NPDSCH such as not to overlap with the position of a subframe in which transmission of the aMIB-NB or the aSIB1-NB is scheduled, or the base station may allow interference (interference with the NPDSCH/NPDCCH caused by aMIB-NB/aSIB-NB or vice versa) when collision occurs. Then, the base station may set the bit corresponding to the position of a subframe carrying the aMIB and/or the aSIB1 to 1 in the information of DL-Bitmap-NB-r13. This provides advantages in that the NB-IoT UE can use the NRS for measurement at the position of the subframe indicated as 1.

The afore-described positions of the aMIB-NB and the aSIB-NB may be interchanged/exchanged with each other. For example, the aSIB1-NB may be transmitted at the position of aMIB-NB, or the aMIB-NB may be transmitted at the position of the aSIB1-NB. The positions of the aMIB-NB and the aSIB1-NB may be determined according to the trade-off between power on/off of an RF module and time diversity.

4.2. Proposal 2: "Radio Frame Structure for Non-Anchor Carrier Including aMIB-NB and aSIB1-NB"

Table 14 illustrates an example (Alt. 1) of a radio frame structure in which the aMIB-NB and the aSIB1-NB proposed by the present patent application are additionally transmitted on a non-anchor carrier.

TABLE 14

| $n_f$ mod 4 | subframe number | | | | | | | | |
|---|---|---|---|---|---|---|---|---|---|
| | 0 | 1 | 2 | 3 | 4 | 5 | 6 | 7 | 8 | 9 |
| 0 | MIB | | | | SIB1 | aMIB | | | | (aSIB1) |
| 1 | MIB | | | | (SIB1) | (aMIB) | | | | (aSIB1) |
| 2 | MIB | | | | SIB1 | aMIB | | | | (aSIB1) |
| 3 | MIB | | | | (SIB1) | (aMIB) | | | | (aSIB1) |

In Table 14, the MIB-NB and the SIB1-NB are presented to show the positions of subframes transmitted on an anchor carrier. The MIB-NB and the SIB1-NB are not transmitted on a non-anchor carrier.

Although it is assumed that the subframe structures of an anchor carrier and a non-anchor carrier are generated in the same base station, it is not assumed that the anchor carrier and the non-anchor carrier operate in the same operation mode. However, it may be assumed that the anchor carrier is synchronized with the non-anchor carrier in terms of subframe numbers.

The positions of subframes carrying the MIB-NB and the SIB1-NB on the anchor carrier are subframes #0 and #4, respectively. Subframes #0 and #4 are not configurable as MBSFN subframes in the legacy LTE system. When the NPSS, the NSSS, the NPBCH, and the SIB1-NB are additionally transmitted to improve the cell search performance and system information (e.g., MIB-NB and SIB1-NB) detection performance of the NB-IoT UE, subframes #0, #4, #5, and #9 which are non-MBSFN subframes may not be sufficient.

The NB-IoT UE first detects the NPSS and then the NSSS during cell search. Subsequently, the NB-IoT UE may decode the MIB-NB, and receive the SIB1-NB according to the decoding result of the MIB-NB. If the received power of the MIB-NB received on the anchor carrier is low, the NB-IoT UE may additionally receive the aMIB-NB on the non-anchor carrier, thereby improving performance. If the MIB-NB on the anchor carrier and the aMIB-NB on the non-anchor carrier are transmitted in consecutive subframes, the NB-IoT UE needs to tune to the frequencies of the anchor carrier and the non-anchor carrier for a relatively short time. This may cause increase the price of the NB-IoT UE. Therefore, the requirement for a frequency tuning time may be mitigated by ensuring a sufficient time gap between the MIB-NB and the aMIB.

In order to ensure a sufficient time gap between the SIB-NB and the aSIB1-MIB, the aMIB-NB may be allocated to subframe #5 and the aSIB1-NB may be allocated to subframe #9, from among subframes #0, #4, #5, and #9. Or, as illustrated in Table 15, the aSIB1-NB may be transmitted in subframe #4 of a radio frame that does not carry the SIB1-NB on the anchor carrier in a corresponding cell.

TABLE 15

| $n_f$ mod 4 | Subframe number | | | | | | | | |
|---|---|---|---|---|---|---|---|---|---|
| | 0 | 1 | 2 | 3 | 4 | 5 | 6 | 7 | 8 | 9 |
| 0 | MIB | | | | | SIB1 | aMIB | | | |
| 1 | MIB | | | | | (aSIB1) | (aMIB) | | | |
| 2 | MIB | | | | | SIB1 | aMIB | | | |
| 3 | MIB | | | | | (aSIB1) | (aMIB) | | | |

As such, a frequency retuning time may be sufficiently ensured for the NB-IoT UE by generating a 10 msec offset from the SIB1 transmitted every 20 msec within 160 msec. Further, the aSIB1-NB may be transmitted in a 160-msec period during which the SIB1 is not transmitted on the anchor carrier, according to NcellID and the repetition number of the SIB1-NB.

In the afore-described Alt. 1 and Alt. 2, the aMIB-NB and the aSIB1-NB transmitted on the non-anchor carrier may be identical respectively to the MIB-NB and the SIB1-NB which are transmitted on the conventional anchor carrier, or may conform to the aMIB-NB and aSIB1-NB configurations proposed below.

4.3. Proposal 3: "Method of Configuring and Transmitting aMIB-NB"

The MIB-NB, which comprises 50 bits including a cyclic redundancy check (CRC), may be extended to 150 bits after trail-biting convolutional code (TBCC) channel coding, be rate-matched to 1600 bits during a 640 msec MIB-NB-TTI, and be transmitted. For example, 200 bits transmitted every 10 msec are repeatedly transmitted with the same values during 8 radio frames, and 200 bits following the firstly transmitted 200 bits are repeatedly transmitted during the next 80 msec. In this manner, the MIB-NB is transmitted for 640 msec. 150 bits representing TBCC encoding output having a ⅓ mother code rate may be divided into three parts each having 50 bits, and the respective 50-bit parts may be represented sequentially as redundancy version 0 (RV0), RV1, and RV2, for convenience. Accordingly, 200 bits transmitted repeatedly for the first 80 msec within an MIB-NB-TTI may include RV0, RV1, RV2, and RV0.

Further, the 640-msec MIB-NB-TTI may be divided into 8 periods, each being 80 msec in duration. The 200-bit groups for the periods may be represented sequentially as m0, m1, m2, m3, m4, m5, m6, m7. Accordingly, a transmission relationship between m0 to m7 and RV0 to RV2 in an MIB-NB TTI may be given by Table 16 below.

TABLE 16

| | $n_f$ mod 64 | | | | | | | |
|---|---|---|---|---|---|---|---|---|
| | 0 | 1 | 2 | 3 | 4 | 5 | 6 | 7 |
| m | 0 | 0 | 0 | 0 | 0 | 0 | 0 | 0 |
| RV | 0120 | 0120 | 0120 | 0120 | 0120 | 0120 | 0120 | 0120 |

| | $n_f$ mod 64 | | | | | | | |
|---|---|---|---|---|---|---|---|---|
| | 8 | 9 | 10 | 11 | 12 | 13 | 14 | 15 |
| m | 1 | 1 | 1 | 1 | 1 | 1 | 1 | 1 |
| RV | 1201 | 1201 | 1201 | 1201 | 1201 | 1201 | 1201 | 1201 |

| | $n_f$ mod 64 | | | | | | | |
|---|---|---|---|---|---|---|---|---|
| | 16 | 17 | 18 | 19 | 20 | 21 | 22 | 23 |
| m | 2 | 2 | 2 | 2 | 2 | 2 | 2 | 2 |
| RV | 2012 | 2012 | 2012 | 2012 | 2012 | 2012 | 2012 | 2012 |

| | $n_f$ mod 64 | | | | | | | |
|---|---|---|---|---|---|---|---|---|
| | 24 | 25 | 26 | 27 | 28 | 29 | 30 | 31 |
| m | 3 | 3 | 3 | 3 | 3 | 3 | 3 | 3 |
| RV | 0120 | 0120 | 0120 | 0120 | 0120 | 0120 | 0120 | 0120 |

TABLE 16-continued

| | $n_f$ mod 64 | | | | | | | |
|---|---|---|---|---|---|---|---|---|
| | 32 | 33 | 34 | 35 | 36 | 37 | 38 | 39 |
| m | 4 | 4 | 4 | 4 | 4 | 4 | 4 | 4 |
| RV | 1201 | 1201 | 1201 | 1201 | 1201 | 1201 | 1201 | 1201 |

| | $n_f$ mod 64 | | | | | | | |
|---|---|---|---|---|---|---|---|---|
| | 40 | 41 | 42 | 43 | 44 | 45 | 46 | 47 |
| m | 5 | 5 | 5 | 5 | 5 | 5 | 5 | 5 |
| RV | 2012 | 2012 | 2012 | 2012 | 2012 | 2012 | 2012 | 2012 |

| | $n_f$ mod 64 | | | | | | | |
|---|---|---|---|---|---|---|---|---|
| | 48 | 49 | 50 | 51 | 52 | 53 | 54 | 55 |
| m | 6 | 6 | 6 | 6 | 6 | 6 | 6 | 6 |
| RV | 0120 | 0120 | 0120 | 0120 | 0120 | 0120 | 0120 | 0120 |

| | $n_f$ mod 64 | | | | | | | |
|---|---|---|---|---|---|---|---|---|
| | 56 | 57 | 58 | 59 | 60 | 61 | 62 | 63 |
| m | 7 | 7 | 7 | 7 | 7 | 7 | 7 | 7 |
| RV | 1201 | 1201 | 1201 | 1201 | 1201 | 1201 | 1201 | 1201 |

Referring to Table 16, $n_f$ represents a radio frame number. Referring to Table 16, it may be noted that the RVs are not distributed uniformly within an 80 msec period. For example, a specific RV may be transmitted twice more times than the other RVs, and RV2 may be transmitted fewer times than RV0 and RV1 in an MIB-NB-TTI.

Table 17 to Table 21 illustrate proposals for aMIB-NB configuration per radio frame, when an aMIB-NB is additionally transmitted in every radio frame within an MIB-NB-TTI. The aMIB-NB is represented in bold.

TABLE 17

| | $n_f$ mod 64 | | | | | | | | | | | | | | | |
|---|---|---|---|---|---|---|---|---|---|---|---|---|---|---|---|---|
| | 0 | 0 | 1 | 1 | 2 | 2 | 3 | 3 | 4 | 4 | 5 | 5 | 6 | 6 | 7 | 7 |
| m | 0 | 0 | 0 | 0 | 0 | 0 | 0 | 0 | 0 | 0 | 0 | 0 | 0 | 0 | 0 | 0 |
| RV | 0120 | 0120 | 0120 | 0120 | 0120 | 0120 | 0120 | 0120 | 0120 | 0120 | 0120 | 0120 | 0120 | 0120 | 0120 | 0120 |

| | $n_f$ mod 64 | | | | | | | | | | | | | | | |
|---|---|---|---|---|---|---|---|---|---|---|---|---|---|---|---|---|
| | 8 | 8 | 9 | 9 | 10 | 10 | 11 | 11 | 12 | 12 | 13 | 13 | 14 | 14 | 15 | 15 |
| m | 1 | 1 | 1 | 1 | 1 | 1 | 1 | 1 | 1 | 1 | 1 | 1 | 1 | 1 | 1 | 1 |
| RV | 1201 | 1201 | 1201 | 1201 | 1201 | 1201 | 1201 | 1201 | 1201 | 1201 | 1201 | 1201 | 1201 | 1201 | 1201 | 1201 |

| | $n_f$ mod 64 | | | | | | | | | | | | | | | |
|---|---|---|---|---|---|---|---|---|---|---|---|---|---|---|---|---|
| | 16 | 16 | 17 | 17 | 18 | 18 | 19 | 19 | 20 | 20 | 21 | 21 | 22 | 22 | 23 | 23 |
| m | 2 | 2 | 2 | 2 | 2 | 2 | 2 | 2 | 2 | 2 | 2 | 2 | 2 | 2 | 2 | 2 |
| RV | 2012 | 2012 | 2012 | 2012 | 2012 | 2012 | 2012 | 2012 | 2012 | 2012 | 2012 | 2012 | 2012 | 2012 | 2012 | 2012 |

| | $n_f$ mod 64 | | | | | | | | | | | | | | | |
|---|---|---|---|---|---|---|---|---|---|---|---|---|---|---|---|---|
| | 24 | 24 | 25 | 25 | 26 | 26 | 27 | 27 | 28 | 28 | 29 | 29 | 30 | 30 | 31 | 31 |
| m | 3 | 3 | 3 | 3 | 3 | 3 | 3 | 3 | 3 | 3 | 3 | 3 | 3 | 3 | 3 | 3 |
| RV | 0120 | 0120 | 0120 | 0120 | 0120 | 0120 | 0120 | 0120 | 0120 | 0120 | 0120 | 0120 | 0120 | 0120 | 0120 | 0120 |

| | $n_f$ mod 64 | | | | | | | | | | | | | | | |
|---|---|---|---|---|---|---|---|---|---|---|---|---|---|---|---|---|
| | 32 | 32 | 33 | 33 | 34 | 34 | 35 | 35 | 36 | 36 | 37 | 37 | 38 | 38 | 39 | 39 |
| m | 4 | 4 | 4 | 4 | 4 | 4 | 4 | 4 | 4 | 4 | 4 | 4 | 4 | 4 | 4 | 4 |
| RV | 1201 | 1201 | 1201 | 1201 | 1201 | 1201 | 1201 | 1201 | 1201 | 1201 | 1201 | 1201 | 1201 | 1201 | 1201 | 1201 |

TABLE 17-continued

| $n_f$ mod 64 | | | | | | | | | | | | | | | |
|---|---|---|---|---|---|---|---|---|---|---|---|---|---|---|---|
| 40 | 40 | 41 | 41 | 42 | 42 | 43 | 43 | 44 | 44 | 45 | 45 | 46 | 46 | 47 | 47 |

| | | | | | | | | | | | | | | | | |
|---|---|---|---|---|---|---|---|---|---|---|---|---|---|---|---|---|
| m | 5 | 5 | 5 | 5 | 5 | 5 | 5 | 5 | 5 | 5 | 5 | 5 | 5 | 5 | 5 | 5 |
| RV | 2012 | 2012 | 2012 | 2012 | 2012 | 2012 | 2012 | 2012 | 2012 | 2012 | 2012 | 2012 | 2012 | 2012 | 2012 | 2012 |

| $n_f$ mod 64 | | | | | | | | | | | | | | | |
|---|---|---|---|---|---|---|---|---|---|---|---|---|---|---|---|
| 48 | 48 | 49 | 49 | 50 | 50 | 51 | 51 | 52 | 52 | 53 | 53 | 54 | 54 | 55 | 55 |

| | | | | | | | | | | | | | | | | |
|---|---|---|---|---|---|---|---|---|---|---|---|---|---|---|---|---|
| m | 6 | 6 | 6 | 6 | 6 | 6 | 6 | 6 | 6 | 6 | 6 | 6 | 6 | 6 | 6 | 6 |
| RV | 0120 | 0120 | 0120 | 0120 | 0120 | 0120 | 0120 | 0120 | 0120 | 0120 | 0120 | 0120 | 0120 | 0120 | 0120 | 0120 |

| $n_f$ mod 64 | | | | | | | | | | | | | | | |
|---|---|---|---|---|---|---|---|---|---|---|---|---|---|---|---|
| 56 | 56 | 57 | 57 | 58 | 58 | 59 | 59 | 60 | 60 | 61 | 61 | 62 | 62 | 63 | 63 |

| | | | | | | | | | | | | | | | | |
|---|---|---|---|---|---|---|---|---|---|---|---|---|---|---|---|---|
| m | 7 | 7 | 7 | 7 | 7 | 7 | 7 | 7 | 7 | 7 | 7 | 7 | 7 | 7 | 7 | 7 |
| RV | 1201 | 1201 | 1201 | 1201 | 1201 | 1201 | 1201 | 1201 | 1201 | 1201 | 1201 | 1201 | 1201 | 1201 | 1201 | 1201 |

According to Alt. 1-1 proposed in Table 17, the aMIB-NB may be configured in the same manner as the MIB-NB in every subframe, which is advantageous in terms of symbol-level combining. For example, the NB-IoT UE may symbol-level combine MIB-NB and aMIB-NB which are transmitted twice repeatedly within 10 msec, and perform decoding only once, thereby reducing power consumption.

TABLE 18

| $n_f$ mod 64 | | | | | | | | | | | | | | | |
|---|---|---|---|---|---|---|---|---|---|---|---|---|---|---|---|
| 0 | 0 | 1 | 1 | 2 | 2 | 3 | 3 | 4 | 4 | 5 | 5 | 6 | 6 | 7 | 7 |

| | | | | | | | | | | | | | | | | |
|---|---|---|---|---|---|---|---|---|---|---|---|---|---|---|---|---|
| m | 0 | 0 | 0 | 1 | 0 | 2 | 0 | 3 | 0 | 4 | 0 | 5 | 0 | 6 | 0 | 7 |
| RV | 0120 | 0120 | 0120 | 1201 | 0120 | 2012 | 0120 | 0120 | 0120 | 1201 | 0120 | 2012 | 0120 | 0120 | 0120 | 1201 |

| $n_f$ mod 64 | | | | | | | | | | | | | | | |
|---|---|---|---|---|---|---|---|---|---|---|---|---|---|---|---|
| 8 | 8 | 9 | 9 | 10 | 10 | 11 | 11 | 12 | 12 | 13 | 13 | 14 | 14 | 15 | 15 |

| | | | | | | | | | | | | | | | | |
|---|---|---|---|---|---|---|---|---|---|---|---|---|---|---|---|---|
| m | 1 | 0 | 1 | 1 | 1 | 2 | 1 | 3 | 1 | 4 | 1 | 5 | 1 | 6 | 1 | 7 |
| RV | 1201 | 0120 | 1201 | 1201 | 1201 | 2012 | 1201 | 0120 | 1201 | 1201 | 1201 | 2012 | 1201 | 0120 | 1201 | 1201 |

| $n_f$ mod 64 | | | | | | | | | | | | | | | |
|---|---|---|---|---|---|---|---|---|---|---|---|---|---|---|---|
| 16 | 16 | 17 | 17 | 18 | 18 | 19 | 19 | 20 | 20 | 21 | 21 | 22 | 22 | 23 | 23 |

| | | | | | | | | | | | | | | | | |
|---|---|---|---|---|---|---|---|---|---|---|---|---|---|---|---|---|
| m | 2 | 0 | 2 | 1 | 2 | 2 | 2 | 3 | 2 | 4 | 2 | 5 | 2 | 6 | 2 | 7 |
| RV | 2012 | 0120 | 2012 | 1201 | 2012 | 2012 | 2012 | 0120 | 2012 | 1201 | 2012 | 2012 | 2012 | 0120 | 2012 | 1201 |

| $n_f$ mod 64 | | | | | | | | | | | | | | | |
|---|---|---|---|---|---|---|---|---|---|---|---|---|---|---|---|
| 24 | 24 | 25 | 25 | 26 | 26 | 27 | 27 | 28 | 28 | 29 | 29 | 30 | 30 | 31 | 31 |

| | | | | | | | | | | | | | | | | |
|---|---|---|---|---|---|---|---|---|---|---|---|---|---|---|---|---|
| m | 3 | 0 | 3 | 1 | 3 | 2 | 3 | 3 | 3 | 4 | 3 | 5 | 3 | 6 | 3 | 7 |
| RV | 0120 | 0120 | 0120 | 1201 | 0120 | 2012 | 0120 | 0120 | 0120 | 1201 | 0120 | 2012 | 0120 | 0120 | 0120 | 1201 |

| $n_f$ mod 64 | | | | | | | | | | | | | | | |
|---|---|---|---|---|---|---|---|---|---|---|---|---|---|---|---|
| 32 | 32 | 33 | 33 | 34 | 34 | 35 | 35 | 36 | 36 | 37 | 37 | 38 | 38 | 39 | 39 |

| | | | | | | | | | | | | | | | | |
|---|---|---|---|---|---|---|---|---|---|---|---|---|---|---|---|---|
| m | 4 | 0 | 4 | 1 | 4 | 2 | 4 | 3 | 4 | 4 | 4 | 5 | 4 | 6 | 4 | 7 |
| RV | 1201 | 0120 | 1201 | 1201 | 1201 | 2012 | 1201 | 0120 | 1201 | 1201 | 1201 | 2012 | 1201 | 0120 | 1201 | 1201 |

| $n_f$ mod 64 | | | | | | | | | | | | | | | |
|---|---|---|---|---|---|---|---|---|---|---|---|---|---|---|---|
| 40 | 40 | 41 | 41 | 42 | 42 | 43 | 43 | 44 | 44 | 45 | 45 | 46 | 46 | 47 | 47 |

| | | | | | | | | | | | | | | | | |
|---|---|---|---|---|---|---|---|---|---|---|---|---|---|---|---|---|
| m | 5 | 0 | 5 | 1 | 5 | 2 | 5 | 3 | 5 | 4 | 5 | 5 | 5 | 6 | 5 | 7 |
| RV | 2012 | 0120 | 2012 | 1201 | 2012 | 2012 | 2012 | 0120 | 2012 | 1201 | 2012 | 2012 | 2012 | 0120 | 2012 | 1201 |

| $n_f$ mod 64 | | | | | | | | | | | | | | | |
|---|---|---|---|---|---|---|---|---|---|---|---|---|---|---|---|
| 48 | 48 | 49 | 49 | 50 | 50 | 51 | 51 | 52 | 52 | 53 | 53 | 54 | 54 | 55 | 55 |

| | | | | | | | | | | | | | | | | |
|---|---|---|---|---|---|---|---|---|---|---|---|---|---|---|---|---|
| m | 6 | 0 | 6 | 1 | 6 | 2 | 6 | 3 | 6 | 4 | 6 | 5 | 6 | 6 | 6 | 7 |
| RV | 0120 | 0120 | 0120 | 1201 | 0120 | 2012 | 0120 | 0120 | 0120 | 1201 | 0120 | 2012 | 0120 | 0120 | 0120 | 1201 |

TABLE 18-continued

| | | | | | | | | $n_f$ mod 64 | | | | | | | | |
|---|---|---|---|---|---|---|---|---|---|---|---|---|---|---|---|---|
| | 56 | 56 | 57 | 57 | 58 | 58 | 59 | 59 | 60 | 60 | 61 | 61 | 62 | 62 | 63 | 63 |
| m | 7 | 0 | 7 | 1 | 7 | 2 | 7 | 3 | 7 | 4 | 7 | 5 | 7 | 6 | 7 | 7 |
| RV | 1201 | 0120 | 1201 | 1201 | 1201 | 2012 | 1201 | 0120 | 1201 | 1201 | 1201 | 2012 | 1201 | 0120 | 1201 | 1201 |

Alt. 1-2 proposed in Table 18 is a method of circulating the RVs of the aMIB-NB within an 80-msec period, in which m circulated according to $n_f$ mod 8 is repeated. As compared to Alt. 1-1, Alt. 1-2 may be advantageous in that the performance gain of channel coding can be increased by distributing each RV relatively uniformly within 80 msec. However, a shortcoming with Alt. 1-2 lies in that RV2 occurs less than RV0 and RV1 within the MIB-NB-TTI.

TABLE 19

| | | | | | | | | $n_f$ mod 64 | | | | | | | | |
|---|---|---|---|---|---|---|---|---|---|---|---|---|---|---|---|---|
| | 0 | 0 | 1 | 1 | 2 | 2 | 3 | 3 | 4 | 4 | 5 | 5 | 6 | 6 | 7 | 7 |
| m | 0 | 1 | 0 | 2 | 0 | 3 | 0 | 4 | 0 | 5 | 0 | 6 | 0 | 7 | 0 | 2 |
| RV | 0120 | 1201 | 0120 | 2012 | 0120 | 0120 | 0120 | 1201 | 0120 | 2012 | 0120 | 0120 | 0120 | 1201 | 0120 | 2012 |

| | | | | | | | | $n_f$ mod 64 | | | | | | | | |
|---|---|---|---|---|---|---|---|---|---|---|---|---|---|---|---|---|
| | 8 | 8 | 9 | 9 | 10 | 10 | 11 | 11 | 12 | 12 | 13 | 13 | 14 | 14 | 15 | 15 |
| m | 1 | 1 | 1 | 2 | 1 | 3 | 1 | 4 | 1 | 5 | 1 | 6 | 1 | 7 | 1 | 2 |
| RV | 1201 | 1201 | 1201 | 2012 | 1201 | 0120 | 1201 | 1201 | 1201 | 2012 | 1201 | 0120 | 1201 | 1201 | 1201 | 2012 |

| | | | | | | | | $n_f$ mod 64 | | | | | | | | |
|---|---|---|---|---|---|---|---|---|---|---|---|---|---|---|---|---|
| | 16 | 16 | 17 | 17 | 18 | 18 | 19 | 19 | 20 | 20 | 21 | 21 | 22 | 22 | 23 | 23 |
| m | 2 | 1 | 2 | 2 | 2 | 3 | 2 | 4 | 2 | 5 | 2 | 6 | 2 | 7 | 2 | 2 |
| RV | 2012 | 1201 | 2012 | 2012 | 2012 | 0120 | 2012 | 1201 | 2012 | 2012 | 2012 | 0120 | 2012 | 1201 | 2012 | 2012 |

| | | | | | | | | $n_f$ mod 64 | | | | | | | | |
|---|---|---|---|---|---|---|---|---|---|---|---|---|---|---|---|---|
| | 24 | 24 | 25 | 25 | 26 | 26 | 27 | 27 | 28 | 28 | 29 | 29 | 30 | 30 | 31 | 31 |
| m | 3 | 1 | 3 | 2 | 3 | 3 | 3 | 4 | 3 | 5 | 3 | 6 | 3 | 7 | 3 | 2 |
| RV | 0120 | 1201 | 0120 | 2012 | 0120 | 0120 | 0120 | 1201 | 0120 | 2012 | 0120 | 0120 | 0120 | 1201 | 0120 | 2012 |

| | | | | | | | | $n_f$ mod 64 | | | | | | | | |
|---|---|---|---|---|---|---|---|---|---|---|---|---|---|---|---|---|
| | 32 | 32 | 33 | 33 | 34 | 34 | 35 | 35 | 36 | 36 | 37 | 37 | 38 | 38 | 39 | 39 |
| m | 4 | 1 | 4 | 2 | 4 | 3 | 4 | 4 | 4 | 5 | 4 | 6 | 4 | 7 | 4 | 2 |
| RV | 1201 | 1201 | 1201 | 2012 | 1201 | 0120 | 1201 | 1201 | 1201 | 2012 | 1201 | 0120 | 1201 | 1201 | 1201 | 2012 |

| | | | | | | | | $n_f$ mod 64 | | | | | | | | |
|---|---|---|---|---|---|---|---|---|---|---|---|---|---|---|---|---|
| | 40 | 40 | 41 | 41 | 42 | 42 | 43 | 43 | 44 | 44 | 45 | 45 | 46 | 46 | 47 | 47 |
| m | 5 | 1 | 5 | 2 | 5 | 3 | 5 | 4 | 5 | 5 | 5 | 6 | 5 | 7 | 5 | 2 |
| RV | 2012 | 1201 | 2012 | 2012 | 2012 | 0120 | 2012 | 1201 | 2012 | 2012 | 2012 | 0120 | 2012 | 1201 | 2012 | 2012 |

| | | | | | | | | $n_f$ mod 64 | | | | | | | | |
|---|---|---|---|---|---|---|---|---|---|---|---|---|---|---|---|---|
| | 48 | 48 | 49 | 49 | 50 | 50 | 51 | 51 | 52 | 52 | 53 | 53 | 54 | 54 | 55 | 55 |
| m | 6 | 1 | 6 | 2 | 6 | 3 | 6 | 4 | 6 | 5 | 6 | 6 | 6 | 7 | 6 | 2 |
| RV | 0120 | 1201 | 0120 | 2012 | 0120 | 0120 | 0120 | 1201 | 0120 | 2012 | 0120 | 0120 | 0120 | 1201 | 0120 | 2012 |

| | | | | | | | | $n_f$ mod 64 | | | | | | | | |
|---|---|---|---|---|---|---|---|---|---|---|---|---|---|---|---|---|
| | 56 | 56 | 57 | 57 | 58 | 58 | 59 | 59 | 60 | 60 | 61 | 61 | 62 | 62 | 63 | 63 |
| m | 7 | 1 | 7 | 2 | 7 | 3 | 7 | 4 | 7 | 5 | 7 | 6 | 7 | 7 | 7 | 2 |
| RV | 1201 | 1201 | 1201 | 2012 | 1201 | 0120 | 1201 | 1201 | 1201 | 2012 | 1201 | 0120 | 1201 | 1201 | 1201 | 2012 |

Alt. 1-3 illustrated in Table 19 is intended to make up for the shortcoming of Alt. 1-2. In Alt. 1-3, m circulated according to $n_f$ mod 8 is incremented by 1 each time. However, to complete RV circulation at the position of the last value of m circulated according to $n_f$ mod 8, m2 may be allocated instead of m0.

TABLE 20

| | $n_f$ mod 64 | | | | | | | | | | | | | | | |
|---|---|---|---|---|---|---|---|---|---|---|---|---|---|---|---|---|
| | 0 | 0 | 1 | 1 | 2 | 2 | 3 | 3 | 4 | 4 | 5 | 5 | 6 | 6 | 7 | 7 |
| m | 0 | 1 | 0 | 1 | 0 | 1 | 0 | 1 | 0 | 1 | 0 | 1 | 0 | 1 | 0 | 0 |
| RV | 0120 | 1201 | 0120 | 1201 | 0120 | 1201 | 0120 | 1201 | 0120 | 1201 | 0120 | 1201 | 0120 | 1201 | 0120 | 0120 |

| | $n_f$ mod 64 | | | | | | | | | | | | | | | |
|---|---|---|---|---|---|---|---|---|---|---|---|---|---|---|---|---|
| | 8 | 8 | 9 | 9 | 10 | 10 | 11 | 11 | 12 | 12 | 13 | 13 | 14 | 14 | 15 | 15 |
| m | 1 | 2 | 1 | 2 | 1 | 2 | 1 | 2 | 1 | 2 | 1 | 2 | 1 | 2 | 1 | 2 |
| RV | 1201 | 2012 | 1201 | 2012 | 1201 | 2012 | 1201 | 2012 | 1201 | 2012 | 1201 | 2012 | 1201 | 2012 | 1201 | 2012 |

| | $n_f$ mod 64 | | | | | | | | | | | | | | | |
|---|---|---|---|---|---|---|---|---|---|---|---|---|---|---|---|---|
| | 16 | 16 | 17 | 17 | 18 | 18 | 19 | 19 | 20 | 20 | 21 | 21 | 22 | 22 | 23 | 23 |
| m | 2 | 3 | 2 | 3 | 2 | 3 | 2 | 3 | 2 | 3 | 2 | 3 | 2 | 3 | 2 | 3 |
| RV | 2012 | 0120 | 2012 | 0120 | 2012 | 0120 | 2012 | 0120 | 2012 | 0120 | 2012 | 0120 | 2012 | 0120 | 2012 | 0120 |

| | $n_f$ mod 64 | | | | | | | | | | | | | | | |
|---|---|---|---|---|---|---|---|---|---|---|---|---|---|---|---|---|
| | 24 | 24 | 25 | 25 | 26 | 26 | 27 | 27 | 28 | 28 | 29 | 29 | 30 | 30 | 31 | 31 |
| m | 3 | 4 | 3 | 4 | 3 | 4 | 3 | 4 | 3 | 4 | 3 | 4 | 3 | 4 | 3 | 4 |
| RV | 0120 | 1201 | 0120 | 1201 | 0120 | 1201 | 0120 | 1201 | 0120 | 1201 | 0120 | 1201 | 0120 | 1201 | 0120 | 1201 |

| | $n_f$ mod 64 | | | | | | | | | | | | | | | |
|---|---|---|---|---|---|---|---|---|---|---|---|---|---|---|---|---|
| | 32 | 32 | 33 | 33 | 34 | 34 | 35 | 35 | 36 | 36 | 37 | 37 | 38 | 38 | 39 | 39 |
| m | 4 | 5 | 4 | 5 | 4 | 5 | 4 | 5 | 4 | 5 | 4 | 5 | 4 | 5 | 4 | 5 |
| RV | 1201 | 2012 | 1201 | 2012 | 1201 | 2012 | 1201 | 2012 | 1201 | 2012 | 1201 | 2012 | 1201 | 2012 | 1201 | 2012 |

| | $n_f$ mod 64 | | | | | | | | | | | | | | | |
|---|---|---|---|---|---|---|---|---|---|---|---|---|---|---|---|---|
| | 40 | 40 | 41 | 41 | 42 | 42 | 43 | 43 | 44 | 44 | 45 | 45 | 46 | 46 | 47 | 47 |
| m | 5 | 6 | 5 | 6 | 5 | 6 | 5 | 6 | 5 | 6 | 5 | 6 | 5 | 6 | 5 | 6 |
| RV | 2012 | 0120 | 2012 | 0120 | 2012 | 0120 | 2012 | 0120 | 2012 | 0120 | 2012 | 0120 | 2012 | 0120 | 2012 | 0120 |

| | $n_f$ mod 64 | | | | | | | | | | | | | | | |
|---|---|---|---|---|---|---|---|---|---|---|---|---|---|---|---|---|
| | 48 | 48 | 49 | 49 | 50 | 50 | 51 | 51 | 52 | 52 | 53 | 53 | 54 | 54 | 55 | 55 |
| m | 6 | 7 | 6 | 7 | 6 | 7 | 6 | 7 | 6 | 7 | 6 | 7 | 6 | 7 | 6 | 7 |
| RV | 0120 | 1201 | 0120 | 1201 | 0120 | 1201 | 0120 | 1201 | 0120 | 1201 | 0120 | 1201 | 0120 | 1201 | 0120 | 1201 |

| | $n_f$ mod 64 | | | | | | | | | | | | | | | |
|---|---|---|---|---|---|---|---|---|---|---|---|---|---|---|---|---|
| | 56 | 56 | 57 | 57 | 58 | 58 | 59 | 59 | 60 | 60 | 61 | 61 | 62 | 62 | 63 | 63 |
| m | 7 | 2 | 7 | 2 | 7 | 2 | 7 | 2 | 7 | 2 | 7 | 2 | 7 | 2 | 7 | 2 |
| RV | 1201 | 2012 | 1201 | 2012 | 1201 | 2012 | 1201 | 2012 | 1201 | 2012 | 1201 | 2012 | 1201 | 2012 | 1201 | 2012 |

Alt. 2-1 proposed in Table 20 is a method of transmitting an aMIB-NB constructed with m whose value is larger than the m value of the MIB-NB by 1, for RV circulation of the MIB-NB within a 80 msec period. However, if m of the MIB-NB is 7, an aMIB-NB of m2 is constructed for RV circulation in Alt. 2-1. Nonetheless, Alt. 2-1 may still transmit a specific RV fewer times than the other RVs within the 80-msec period.

having the same RV configuration may be exchanged with each other, m1, m4, and m7 may be exchanged with each other, and m2 and m5 may be exchanged with each other. Therefore, m values in Table 17 to Table 21 may be interchangeably used with their exchangeable values.

Further, the methods proposed in Table 17 to Table 21 have different characteristics regarding the transmission order of aMIB-NBs from the perspective of RVs, and

TABLE 21

| $n_f$ mod 64 | | | | | | | | | | | | | | | |
|---|---|---|---|---|---|---|---|---|---|---|---|---|---|---|---|
| 0 | 0 | 1 | 1 | 2 | 2 | 3 | 3 | 4 | 4 | 5 | 5 | 6 | 6 | 7 | 7 |
| m 0 | 1 | 0 | 2 | 0 | 1 | 0 | 2 | 0 | 1 | 0 | 2 | 0 | 1 | 0 | 2 |
| RV 0120 | 1201 | 0120 | 2012 | 0120 | 1201 | 0120 | 2012 | 0120 | 1201 | 0120 | 2012 | 0120 | 1201 | 0120 | 2012 |
| $n_f$ mod 64 | | | | | | | | | | | | | | | |
| 8 | 8 | 9 | 9 | 10 | 10 | 11 | 11 | 12 | 12 | 13 | 13 | 14 | 14 | 15 | 15 |
| m 1 | 2 | 1 | 3 | 1 | 2 | 1 | 3 | 1 | 2 | 1 | 3 | 1 | 2 | 1 | 3 |
| RV 1201 | 2012 | 1201 | 0120 | 1201 | 2012 | 1201 | 0120 | 1201 | 2012 | 1201 | 0120 | 1201 | 2012 | 1201 | 0120 |
| $n_f$ mod 64 | | | | | | | | | | | | | | | |
| 16 | 16 | 17 | 17 | 18 | 18 | 19 | 19 | 20 | 20 | 21 | 21 | 22 | 22 | 23 | 23 |
| m 2 | 3 | 2 | 4 | 2 | 3 | 2 | 4 | 2 | 3 | 2 | 4 | 2 | 3 | 2 | 4 |
| RV 2012 | 0120 | 2012 | 1201 | 2012 | 0120 | 2012 | 1201 | 2012 | 0120 | 2012 | 1201 | 2012 | 0120 | 2012 | 1201 |
| $n_f$ mod 64 | | | | | | | | | | | | | | | |
| 24 | 24 | 25 | 25 | 26 | 26 | 27 | 27 | 28 | 28 | 29 | 29 | 30 | 30 | 31 | 31 |
| m 3 | 4 | 3 | 5 | 3 | 4 | 3 | 5 | 3 | 4 | 3 | 5 | 3 | 4 | 3 | 5 |
| RV 0120 | 1201 | 0120 | 2012 | 0120 | 1201 | 0120 | 2012 | 0120 | 1201 | 0120 | 2012 | 0120 | 1201 | 0120 | 2012 |
| $n_f$ mod 64 | | | | | | | | | | | | | | | |
| 32 | 32 | 33 | 33 | 34 | 34 | 35 | 35 | 36 | 36 | 37 | 37 | 38 | 38 | 39 | 39 |
| m 4 | 5 | 4 | 6 | 4 | 5 | 4 | 6 | 4 | 5 | 4 | 6 | 4 | 5 | 4 | 6 |
| RV 1201 | 2012 | 1201 | 0120 | 1201 | 2012 | 1201 | 0120 | 1201 | 2012 | 1201 | 0120 | 1201 | 2012 | 1201 | 0120 |
| $n_f$ mod 64 | | | | | | | | | | | | | | | |
| 40 | 40 | 41 | 41 | 42 | 42 | 43 | 43 | 44 | 44 | 45 | 45 | 46 | 46 | 47 | 47 |
| m 5 | 6 | 5 | 7 | 5 | 6 | 5 | 7 | 5 | 6 | 5 | 7 | 5 | 6 | 5 | 7 |
| RV 2012 | 0120 | 2012 | 1201 | 2012 | 0120 | 2012 | 1201 | 2012 | 0120 | 2012 | 1201 | 2012 | 0120 | 2012 | 1201 |
| $n_f$ mod 64 | | | | | | | | | | | | | | | |
| 48 | 48 | 49 | 49 | 50 | 50 | 51 | 51 | 52 | 52 | 53 | 53 | 54 | 54 | 55 | 55 |
| m 6 | 7 | 6 | 2 | 6 | 7 | 6 | 2 | 6 | 7 | 6 | 2 | 6 | 7 | 6 | 2 |
| RV 0120 | 1201 | 0120 | 2012 | 0120 | 1201 | 0120 | 2012 | 0120 | 1201 | 0120 | 2012 | 0120 | 1201 | 0120 | 2012 |
| $n_f$ mod 64 | | | | | | | | | | | | | | | |
| 56 | 56 | 57 | 57 | 58 | 58 | 59 | 59 | 60 | 60 | 61 | 61 | 62 | 62 | 63 | 63 |
| m 7 | 2 | 7 | 3 | 7 | 2 | 7 | 3 | 7 | 2 | 7 | 3 | 7 | 2 | 7 | 3 |
| RV 1201 | 2012 | 1201 | 0120 | 1201 | 2012 | 1201 | 0120 | 1201 | 2012 | 1201 | 0120 | 1201 | 2012 | 1201 | 0120 |

To make up for the shortcoming that a specific RV is transmitted a relatively fewer times in Alt. 2-1, Alt. 2-2 may be considered as proposed in Table 21. Alt. 2-2 is characterized in that RVs at the beginning of aMIB-NBs are circulated to maximize uniform distribution of RVs within an 80-msec period.

The methods proposed in Table 17 to Table 21 define different schemes of repeating or circulating RV values within 80 msec, and an m value may be replaced with another value in each method. For example, m0, m3 and m6 resource element (RE) mapping of aMIB-NBs may be defined separately from the transmission orders of the aMIB-NBs.

When the legacy MIB-NB is transmitted repeatedly 8 times for 80 msec, the same RE mapping method as used for the legacy MIB-NB may be applied to the aMIB-NB in order to help the NB-IoT UE to estimate a frequency offset. However, to maximize time diversity and frequency diversity with the MIB-NB, a different RE mapping method from that for the legacy MIB-NB may be applied to the aMIB- NB. For example, in Alt. 1-1 illustrated in Table 17, a part of resource mapping defined in 10.2.4.4 of TS 36.211 may be modified as follows by using a time-first mapping scheme in contrast to the RE mapping method used for the legacy MIB-NB.

"The mapping to resource elements (k,l) not reserved for transmission of reference signals shall be in increasing order of first the index l, then the index k."

In Alt. 1-1, therefore, a frequency offset may be estimated by estimating a phase difference between adjacent aMIB-MBs in the same manner as MIB-NBs within an 80 msec period. However, the RE mapping method for an aMIB-NB is not limited to the above-described methods, but may be defined in various manners that increase time diversity and frequency diversity with an MIB-NB. Further, if an MIB-NB and an aMIB-NB are periodically transmitted, alternating with each other within 80 msec, a different RE mapping schemes may be applied to an adjacent MIB-NB and an adjacent aMIB-NB, characteristically repeated alternately with each other within 80 msec.

4.4. Proposal 4: "Allocation of Information Indicating Persistent MIB-NB and SIB1-NB Scheduling"

As illustrated in Table 9, the detection time of the SIB1-NB is about 12 SIB1-NB-TTIs, occupying 70% of the SIB1-NB modification period, 40960 msec in an extended coverage environment. Therefore, the NB-IoT UE may have to detect the MIB-NB again in each SIB1-NB-TTI before SIB1-NB combining. Moreover, even though the NB-IoT UE succeeds in detecting the SIB1-NB during 70% of the SIB1-NB modification period, the NB-IoT UE may have to detect an SIB1-NB again according to systemInfoValueTag-r13 information of the MIB1-NB after the remaining 30% of the SIB1-NB modification period. Accordingly, the present patent application proposes a method of effectively reducing power consumption and unnecessary MIB-NB detection attempts of an NB-IoT UE.

First, when MIB-NB contents are not changed, a method of indicating skipping of MIB-NB decoding to an NB-IoT UE may be considered. Since counter information included in an MIB-NB, that is, systemFrameNumber-MSB-r13 and hyperSFN-LSB-r13 are changed every 640 msec, it is obvious that the change of the counter information is not regarded as a change in MIB-NB contents.

(4-1) To indicate skipping of MIB-NB decoding, the first 3 OFDM symbols of at least one of the NPSS, the NSSS, or the NPBCH may be used, which may be applied to the guard-band mode or the stand-alone mode. In the in-band mode, an SIB1-NB may use fewer than three OFDM symbols according to the value of eutraControlRegionSize-r13. Herein, a sequence or modulated symbol in the first 3 OFDM symbols of the at least one of the NPSS, the NSSS, or the NPBCH needs to be designed in a manner that minimizes the probability of a legacy NB-IoT UE wrongly detecting the sequence or the modulated symbol as the NPSS and/or the NSSS.

(4-2) As another method of indicating skipping of MIB-NB decoding, it may be considered that a part of reserved bits of the MIB-NB or some bits of an SIBx-NB are used, or an RRC message is used.

In the afore-described (4-1) and (4-2), a period during which MIB-NB decoding is skipped may be set to a 640 msec, 2560 msec, or N×2560 msec period. The MIB-NB decoding skip period may be set to a specific value according to the specification, or set to a semi-static value. For example, N(≥0) may be adjusted by using a specific sequence or modulated symbol information in the first three OFDM symbols of at least one of the NPSS, NSSS, or NPBCH, or a time unit of N may be adjusted to a value other than 640 msec or 2560 msec by means of a higher-layer message. Further, if reserved bits of the MIB-NB are used, N may be set to, but not limited to, an explicit value. Further, when skipping of MIB-NB decoding is indicated, the remaining information of MIB-NB contents except for counter information may all be interpreted as constant during an indicated time period. The NB-IoT UE may accumulate or combine specific bits and symbols of MIB-NBs during the indicated time period based on the interpretation, thereby improving decoding performance.

Information about the persistency of the SIB1-NB may be divided roughly into SIB1-NB scheduling information (repetition number and TBS for the IB1-NB as defined in Table 16.4.1.3-3 and Table 16.4.1.5.2-1 of TS 36.213) and information indicating whether SIB1-NB contents are changed in an adjacent SIB1-NB modification period (40.96 sec). Since hyperSFN-LSB-r13 of the SIB1-NB contents is obviously changed each time, the change of hyperSFN-LSB-r13 is not considered in determining whether the SIIB1-NB contents have been changed.

(4-3) Scheduling information for the SIB1-NB may be modified by the MIB-NB every 2560 msec within an SIB1-NB modification period. Therefore, the MIB-NB should be decoded additionally every 2560 msec during SIB1-NB decoding. If the NB-IoT can assume that scheduling information for an SIB1-NB is not changed at least within an SIB1-NB modification period, a time required to additionally decode an MIB-NB may be reduced. Herein, persistent SIB1-NB scheduling information may be indicated by using the first 3 OFDM symbols of at least one of the NPSS, the NSSS, or the NPBCH, or a part of reserved bits of the SIB1-NB. However, a persistent SIB1-NB scheduling unit may be set to 2560 msec, N×2560 msec, or the next SIB-NB modification period, after the indicated period. Further, a corresponding message in the SIB1-NB may indicate no change in the SIB1-NB scheduling information during the next N SIB-NB modification periods.

(4-4) SIB1-NB contents may be modified on an SIB1-NB modification periodicity basis. Therefore, if the NB-IoT UE fails to complete SIB1-NB decoding within an SIB1-NB modification period, the NB-IoT UE may have to perform SIB1-NB decoding again, while discarding SIB1-NB information accumulated during the previous SIB1-NB modification period, irrespective of whether the SIB1-NB scheduling information has been changed. To overcome the drawback, if SIB1-NB contents are not changed within an SIB1-NB modification period, the NB-IoT UE may decode the SIB1-NB by accumulating an SIB1-NB in an adjacent SIB1-NB modification period. For this purpose, there is a need for a method of indicating whether SIB1-NB contents have been changed to an NB-IoT UE. As in the foregoing methods described in (4-1) and (4-2), it may be indicated whether SIB1-NB contents have been changed by the first 3 OFDM symbols of at least one of the NPSS, NSSS, or NPBCH, or a part of reserved bits of an MIB-NB. However, a unit of persistent SIB1-NB contents information may be set to 2560 msec, N×2560 msec, or the next SIB1-NB modification period, after the indicated period.

Further, the persistent SIB1-NB content information may be indicated or interpreted as skipping of an SIB1-NB decoding attempt. For example, if skipping of SIB-NB decoding in the next SIB-NB modification period is indicated by a part of reserved bits of the MIB-NB, the NB-IoT UE may determine skipping of SIB1-NB decoding in the corresponding SIB1-NB modification period and the next SIB1-NB modification period, with one-time MIB-NB decoding, using systemInfoValueTag information and the information indicating skipping of SIB1-NB decoding. Further, a corresponding message in the SIB1-NB may indicate no change in the next N SIB1-NB modification periods.

The proposed persistent SIB1-NB scheduling information and persistent SIB1-NB content information may be indicated with independent periodicities in independent methods, or may be indicated jointly unless conflicting with each other. Or, each information may be configured such that only one of the two pieces of information is indicated. Further, the proposed persistency information and decoding skip-indicating information for the MIB-NB and the SIB-NB may be applied in the same manner to a system (for example, an eMTC system) in which SIB1(-BR) scheduling is indicated by an MIB, and may have a different periodicity from in the NB-IoT system.

Figure 9:
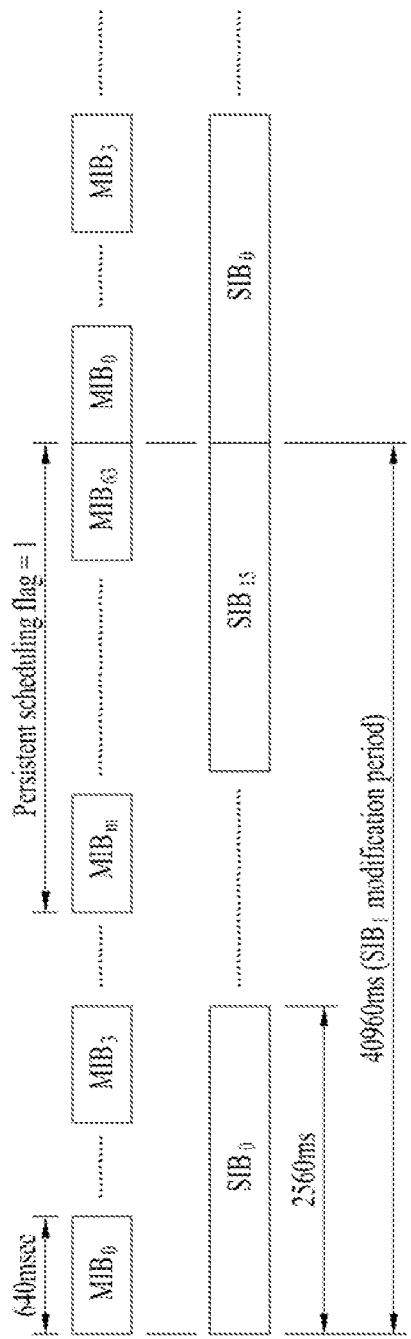
FIG. 9 is a diagram illustrating a method of delivering persistent SIB1-MB scheduling information in MIB-NB according to an embodiment of the present disclosure.

FIG. 9 is a diagram illustrating a method of delivering persistent SIB1-MB scheduling information in an MIB-NB.

Referring to FIG. 9, it may be preliminarily indicated by an MIB-NB in MIB-NB-TTI #m that current SIB1-NB scheduling is also applied to a next SIB1-NB modification period. The SIB1-NB scheduling information may refer to the repetition number and TBS of an SIB1-NB as defined in Table 16.4.1.3-3 and Table 16.4.1.5.2-1 of TS 36.213. Therefore, upon receipt of persistent SIB1-NB scheduling information set to true in MIB-NB-TTI #m, the NB-IoT UE may skip an attempt to detect an MIB-NB for detecting SIB1-NB scheduling information within the next SIB1-NB modification period. However, if the NB-IoT UE fails in detecting an SIB1-NB for a predetermined time or longer in the next SIB1-NB modification period, the NB-IoT UE may detect an MIB-NB again. A time at which the NB-IoT UE attempts to detect the MIB-NB again may be different according to embodiments Further, a relative time value from a corresponding MIB-NB-TTI to an SIB1-NB-TTI in which SIB1-NB scheduling is maintained may be indicated by a part of 11 spare bits of an MIB-NB. The relative time value may be represented in units of an MIB-NB-TTI (640 msec), an SIB1-NB-TTI (2560 msec), or an SIB1-NB modification period (40.96 sec). Further, the relative time value may be decremented or incremented by 1 or maintained in the next MIB-NB.

Bits including information indicating persistent scheduling in an MIB-NB or an SIB1-NB are not involved in determining persistent or non-persistent scheduling and determining whether contents are the same.

As in the proposed method, SIB1-NB persistency information may include at least one of information indicating whether the contents of an SIB1-NB are the same in the next SIB1-NB modification period, or information indicating whether scheduling information for the SIB1-NB (for example, information about the repetition number and TBS of the SIB1-NB) has been changed.

Figure 10:
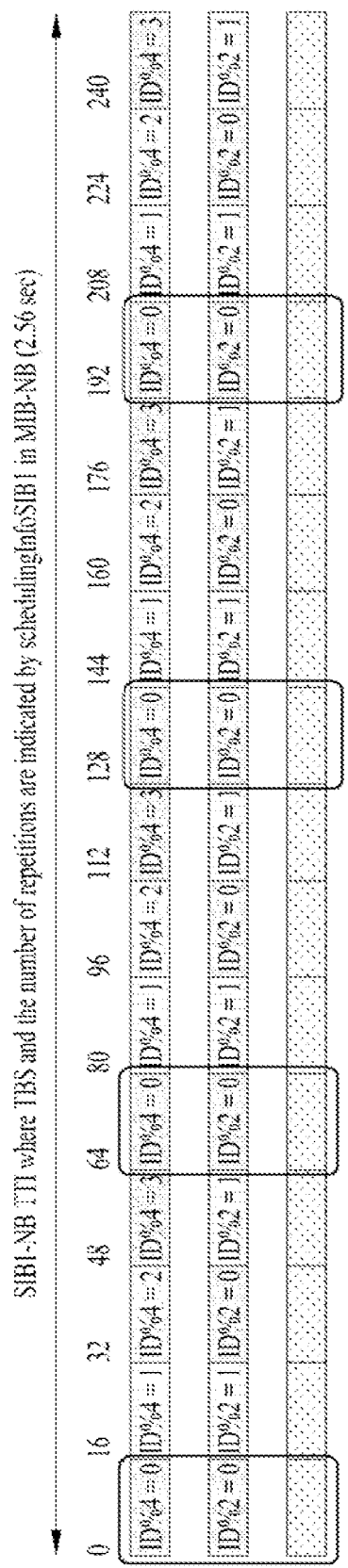
FIG. 10 is a diagram illustrating a method of combining SIB1-NBs between SIB1-NB TTIs (Transmission Time Intervals) within SIB1-NB modification period according to an embodiment of the present disclosure.

Further, if the NB-IoT UE has obtained SIB1-NB scheduling information from an MIB-NB at least once in an MI-NB modification period, the NB-IoT UE may assume that the contents and TBS of the SIB1-NB are not changed. However, without knowledge of the repetition number of the SIB1-MB, the NB-IoT UE may assume that the repetition number of the SIB1-MB is 4, as illustrated in FIG. 10. The NB-IoT UE may attempt SIB1-NB decoding by combining the SIB1-NB with an SIB1-NB delivered in the previous SIB1-NB TTI (an SIB1-NB TTI during which the SIB1-NB scheduling information was obtained from the MIB-NB).

4.5. Proposal 5: "Information Allocation for Improving SIB1-NB Detection Performance"

The present patent application proposes a method of improving the detection performance of an SIB1-NB in a particular limited environment. For example, in in-band same PCI mode, when an SIB1-NB is detected by using a CRS, or when the size of a control region is less than 3, the SIB1-NB may be transmitted in a relatively large number of REs to improve the detection performance of the SIB1-NB at an NB-IoT UE. However, this method is not applicable to the guard-band mode and the stand-alone mode.

According to requirements for operation modes, a part of the spare 11 bits of an MIB-NB may include the following information to improve the detection performance of an SIB1-NB.

1) NRS-CRS Power Offset

NRS-CRS power offset information is available in the in-band same PCI mode. The NRS-CRS power offset information may be validly applied only to an NPDSCH carrying an SIB1-NB and an NPDSCH carrying a BCCH, and may have a different value from that of nrs-CRS-PowerOffset in an SIB1-NB.

2) Control Region Size

The control region size is available in the in-band mode. The control region size may be validly applied only to an NPDSCH carrying an SIB1-NB and an NPDSCH carrying a BCCH, and may have a different value from that of eutra-ControlRegionSize in an SIB1-NB. The control region size may be the same throughout an SIB1-NB-TTI in which an SIB1-NB is transmitted repeatedly. Or, a control region size for an SIB1-NB, received in an MIB-NB, may be partially restricted and applied according to the repetition number of the SIB1-NB. Further, if the control region size is less than 3, an additional RE may be used. For example, a specific OFDM symbol of an SIB1-NB with an NRS may be transmitted repeatedly, or a specific OFDM symbol of an SIB1-NB without the NRS may be transmitted repeatedly. Further, according to the control region size, a specific OFDM symbol with an NRS may be transmitted repeatedly, or a specific OFDM symbol without the NRS may be transmitted repeatedly. Besides, without repeated transmissions of a specific symbol, REs scattered in the frequency domain and the time domain may be transmitted additionally, or a part of coded bits may be mapped additionally to QAM symbols and transmitted.

4.6. Proposal 6: "Information Allocation for Additional Transmission of aSIB1-NB"

In the case where an aSIB1-NB is additionally transmitted in a subframe other than a subframe carrying a legacy SIB1-NB, an MIB-NB may provide information about the additional transmission of the aSIB1-NB. For example, because the aSIB1-NB and the SIB1-NB have an equal TBS, the MIB-NB may indicate the presence of the aSIB1-NB, and set a TBS and an NPDSCH repetition number by reserved schedulingInfoSIB1-NB-r13 defined in Table 16.4.1.5.2-1 and Table 16.4.1.3-3 of TS 36.213. For example, if schedulingInfoSIB1-NB-13 is set to 12, 13, 14, and 15, the repetition number of the TBS may be designated to TBS 208, 328, 440, and 680, respectively. Considering an environment in which an aSIB1-NB is additionally retransmitted, the NPDSCH repetition number of the SIB1-NB may be assumed to be 8 or 16. Further, the transmission position of the aSIB1-NB may be defined in one of the proposed methods described in Table 10 to Table 15, instead of starting radio frames for an SIB1-NB, defined in Table 16.4.1.3-4 of TS 36.213. However, some configurations (for example, a radio frame without an aSIB1-NB among even-numbered/odd-numbered radio frames is reserved for another broadcast channel or the NSSS) may not follow the repetition number of 16 defined in Table 16.4.1.3-4 of TS 36.213. Further, if an aSIB1-NB is transmitted according to the proposed method described in Table 10, the position of the starting radio frame may follow the case for the repetition number 16, defined in Table 16.4.1.3-4 of TS 36.213. Further, the position of a subframe carrying the aSIB1 may be changed according to at least one of NcellID or the repetition numbers defined in Table 16.4.1.3-4 of TS 36.213.

4.7. Proposal 7: "Information Allocation for Fast-Anchor Carrier"

Besides the method of additionally transmitting both of an aMIB1-NB and an aSIB1-NB on an anchor carrier, system information may be transmitted on a specific carrier. For the convenience of description, the specific carrier carrying system information may be referred to as a fast-anchor carrier.

For example, the NB-IoT UE may detect up to an MIB-NB on the anchor carrier, switch to the fast-anchor carrier indicated by the MIB-NB, and then fast detect an SIB1-NB and other SIB information on the fast-anchor carrier. Therefore, the anchor carrier needs to provide information about the position of the fast-anchor carrier, and a method of indicating the position of the fast-anchor carrier may be defined differently according to an operation mode.

However, in the guard-band mode and the stand-alone mode, since a control region and a legacy CRS are absent, it may be assumed that the detection performance of an SIB1-NB is excellent enough to obviate the need for aSIB1-NB transmission. Further, it is assumed that one of carriers available for allocation as an anchor carrier is configured as a fast-anchor carrier. An MI-NB transmitted on the fast-anchor carrier may be based on scheduling information of schedulingInfoSIB1-r13 indicated by an MIB-NB of the anchor carrier. Further, if even the MIB-NB is transmitted on the fast-anchor carrier, SIB1-NB scheduling information delivered on the fast-anchor carrier may have priority over SIB1-NB scheduling information delivered on the anchor carrier.

1) In-band Same PCI Mode

Let a value indicated by eutra-CRS-SequenceInfo-r13 in TS 36.331 be A. According to A, the NB-IoT UE may then obtain information about a relative position and a raster offset (±7.5 kHz or ±2.5 kHz) of an anchor carrier from a center carrier of a base station including the anchor carrier, as illustrated in Table 22.

Referring to Table 22, for a raster offset of ±7.5 kHz, there are a set of 12 candidate values, except for the position B of the anchor carrier (the position of the anchor carrier corresponding to A indicated by eutra-CRS-SequenceInfo-r1) and an opposite position −B (e.g., a set of bit indexes except for bit indexes corresponding to B and −B among bit indexes 0 to 13 in Table 22). The 12 bit indexes may be sequentially indexed, and the fast-anchor carrier may be indicated by one of the 12 bit indexes by using 4 bits of the spare 11 bits of an MIB-NB.

Further, referring to Table 22, for a raster offset of ±2.5 kHz, there are a set of 16 candidate values, except for the position B of the anchor carrier corresponding to A and an opposite position −B-1 (e.g., a set of bit indexes except for bit indexes corresponding to B and −B-1 among bit indexes 14 to 31 in Table 22). The 16 bit indexes may be sequentially indexed, and the fast-anchor carrier may be indicated by one of the 16 bit indexes. Therefore, the position of the fast-anchor carrier may be indicated by using a combination of the value of eutra-CRS-SequenceInfo-r13 and a value based on 4 bits of the spare 11 bits of the MIB-NB in combination.

Further, the method of excluding one more value in addition to the position of an anchor carrier for each raster offset indicated by eutra-CRS-SequenceInfo-r13 may be defined in the form of a mathematical formula or a table, using the value of eutra-CRS-SequenceInfo-r13, as described before.

Further, the position of a PRB (may be any PRB that does not satisfy the requirement for the anchor carrier) around the anchor carrier indicated by eutra-CRS-SequenceInfo-r13 may be indicated. However, if the number of bits used to indicate the position of a PRB around the anchor carrier is not sufficient, the position of a PRB available for indicating a fast-anchor carrier per anchor carrier may be limited.

2) Inband-Different PCI Mode

Compared to the in-band-same PCI mode, only raster offset information about an anchor carrier may be obtained in the in-band-different PCI mode. However, 64 values may be represented by 2 spare bits of Inband-DifferentPCI-NB-r13 and 4 bits added in the in-band-same PCI mode, and PRB positions more than represented in Table 22 may be indicated as the positions of a fast-anchor carrier by using the 64 values.

To indicate the position of a fast-anchor carrier, the afore-described fast-anchor carrier indication method for the in-band-same PCI mode may be applied in the same manner, or the 2 spare bits of Inband-DifferentPCI-NB-r13 and 4 bits

TABLE 22

| Bit index | Raster 7.5 kHz case (odd case) | Bit index | Raster 7.5 kHz case (odd case) | Bit index | Raster 2.5 kHz case (even case) | Bit index | Raster 2.5 kHz case (even case) |
| --- | --- | --- | --- | --- | --- | --- | --- |
| 0 | −35 | 9 | 15 | 14 | −46 | 23 | 5 |
| 1 | −30 | 10 | 20 | 15 | −41 | 24 | 10 |
| 2 | −25 | 11 | 25 | 16 | −36 | 25 | 15 |
| 3 | −20 | 12 | 30 | 17 | −31 | 26 | 20 |
| 4 | −15 | 13 | 35 | 18 | −26 | 27 | 25 |
| 5 | −10 | | | 19 | −21 | 28 | 30 |
| 6 | −5 | | | 20 | −16 | 29 | 35 |
| 7 | 5 | | | 21 | −11 | 30 | 40 |
| 8 | 10 | | | 22 | −6 | 31 | 45 | added to an MIB-NB may be used in combination according to a specific mathematical formula or a table.

When an SIB1-NB is transmitted in a carrier other than a carrier carrying at least one of the NPSS/NSSS or an MIB-NB in a TDD system, the method of indicating the position of a fast-anchor carrier by an MIB-NB may be used to indicate the position of the carrier carrying the SIB1-NB. According to some embodiments, it is obvious that when a non-anchor carrier available for SIB1-NB transmission is limited in the TDD system, the foregoing information may be partially omitted.

Further, if the operation mode is the guard-band mode or the stand-alone mode, it may be assumed that an SIB1-NB is always transmitted on an anchor carrier, or a carrier carrying the SIB1-NB may be indicated by unused bits of eutra-CRS-SequenceInfo-r13 (3 bits in the guard-band mode, and 5 bits in the stand-alone mode). Further, besides schedulingInfoList used to schedule other SIBs by the SIB1-NB, additional information may be provided to indicate the position of a carrier carrying each SIB. Without separately distinguishing SIBs scheduled by the SIB1-NB, the other SIBs than the SIB1-NB may be transmitted on the same carrier or on the anchor carrier, and the position of the carrier that may deliver the other SIBs may be indicated directly.

4.8. Proposal 8: "Codeword and Resource Mapping for Additional NPDSCH Including BCCH"

An aSIB1-NB and an SIB1-NB may have different transmission periodicities. In general, the transmission period of the aSIB1-NB may be longer than or equal to that of the SIB1-NB.

Figure 11:
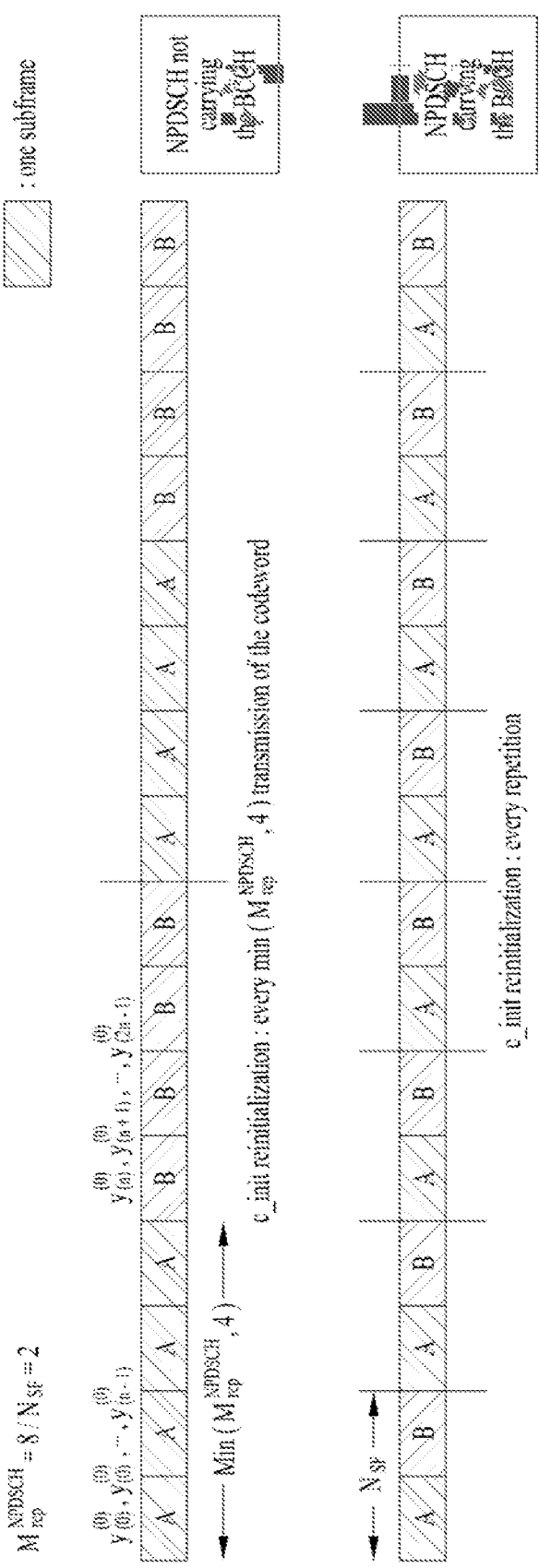
FIG. 11 is a diagram illustrating a method of transmitting NPDSCH including SIB1-NB according to an embodiment of the present disclosure.

FIG. 11 is a diagram illustrating a method of transmitting an NPDSCH including an SIB1-NB. Referring to FIG. 11, a method of transmitting an NPDSCH repeatedly may be applied differently depending on whether the NPDSCH includes a BCCH (for example, SIB1-NB and other SIB-NB). If an SIB1-NB is transmitted in a subframe order of A and B, an aSIB1-NB, which is additionally transmitted between SIB1-NB transmissions, may be transmitted in a different order of B and A from that of the SIB1-NB. That is, when the SIB1-NB and the aSIB1-NB are arranged in a subframe order within 40 msec, the subframe order may be A, (B), B, and (A). Therefore, an NB-IoT UE located within normal coverage (e.g., an NB-IoT UE which has a relatively high SNR and thus does not need a large number of repeated transmissions) may receive both of A and (B) within 20 msec, thereby reducing a time taken for obtaining the SIB1-NB. (A) and (B) are parts of a TBS transmitted in the aSIB1-NB, and identical to A and B in the SIB1-NB, respectively. However, to increase frequency diversity, A and (A), and B and (B) may differ in resource mapping in a corresponding subframe. For example, (A) may be mapped to resources through circular shifting by a predetermined value, that is, 6 REs within 180 kHz.

The foregoing proposed methods may be applied independently. For example, an aMIB-NB may be transmitted on an anchor carrier, while an aSIB1-NB may be transmitted on a fast-anchor carrier. Further, both of the aMIB-NB and the aSIB1-NB may be transmitted on the fast-anchor carrier, not the anchor carrier. If both of the aMIB-NB and the aSIB1-NB are transmitted on the fast-anchor carrier, the aMIB-NB and the aSIB1-NB may be transmitted in a different structure from the proposed structures of the present patent application. Further, persistent SIB1-NB scheduling information may also be applied to an SIB1-NB or an aSIB1-NB transmitted on the fast-anchor carrier as well as an SIB1-NB or an aSIB1-NB transmitted on the anchor carrier. The afore-described fast-anchor carrier indication method may be indicated by an SIB1-NB, other SIB-NBs, or RRC signaling.

The proposed methods may be applied in the same manner to a system using a part of the LTE system bandwidth, such as eMTC, as well as the NB-IoT system. For example, if a PBCH is additionally transmitted in a PRB at a position other than the positions of the center 6 RBs, the proposed concept of fast-anchor carrier may also be applied in order to reduce a delay during acquisition of system information in eMTC. Herein, the position of the PRB in which the PBCH is additionally transmitted may be indicated by 5 spare bits of an MIB. Unlike the NB-IoT system using one PRB pair, the position of a fast-anchor carrier in eMTC may indicate the specific position of 6 consecutive RBs. If a set of fast-anchor carrier bandwidths is configured such that the consecutive 6 RBs of each fast-anchor carrier bandwidth are not overlapped with other consecutive 6 RBs, the specific position of the 6 RBs may be represented sufficiently in 4 bits. An SIB1-BR additionally transmitted on the fast-anchor carrier may be based on scheduling information in SystemInformationBlockType1-BR. Further, if even the MIB-NB is transmitted on the fast-anchor carrier, the scheduling information for the SIB1-BR may be based on SIB1-BR information of the fast-anchor carrier with priority over MIB-NB information in the center 6 RBs.

Information related to SIB1-MB acquisition in the foregoing Proposal 4 to Proposal 7 may not be transmitted only in the MIB-NB but may also be indicated directly by the SIB1-NB. aSIB1-NB information indicated by the SIB1-NB may be information about an aSIB1-NB transmitted in a corresponding SIB1-NB-TTI or the next SIB1-NB-TTI.

Further, the aMIB-NB and the aSIB1-NB may be transmitted 1) in each radio frame (for example, every 10 msec), 2) in a unit of specific configurable time period, or 3) only within a specific time period configured by a base station, so that the NB-IoT UE may expect the aMIB-NB and the aSIB1-NB only in the specific time period. If the aMIB-NB and the aSIB1-NB are transmitted in every predetermined configurable time period, the aMIB-NB and the aSIB1-NB may have different configurable time periods. If the aMIB-NB and the aSIB1-NB are transmitted only within a specific time period configured by the base station, the aMIB-NB and the aSIB1-NB may be transmitted in different specific time periods.

Further, it is not a prerequisite that an aMIB-NB and an aSIB1-NB are always transmitted by a base station. When the NB-IoT UE detects system information by independent blind detection or combining of an aMIB-NB and an aSIB1-NB, the case of no aMIB-NB transmission needs to be considered for the blind detection.

An aMIB-NB and an aSIB1-NB are not necessarily transmitted by every base station. Information indicating that a base station additionally transmits an aMIB-NB or an aSIB1-NB besides an MIB-NB and an SIB1-NB may be indicated directly by an MIB-NB and/or an aMIB-NB, directly by an SIB1-NB and/or an aSIB1-NB, or indicated by any other SIBx-NB. Further, whether an aMIB-NB is transmitted may be indicated by an SIB1-NB and/or an aSIB1-NB, and whether an aSIB1-NB is transmitted may be indicated by an MIB-NB and/or an aMIB-NB.

Figure 12A:
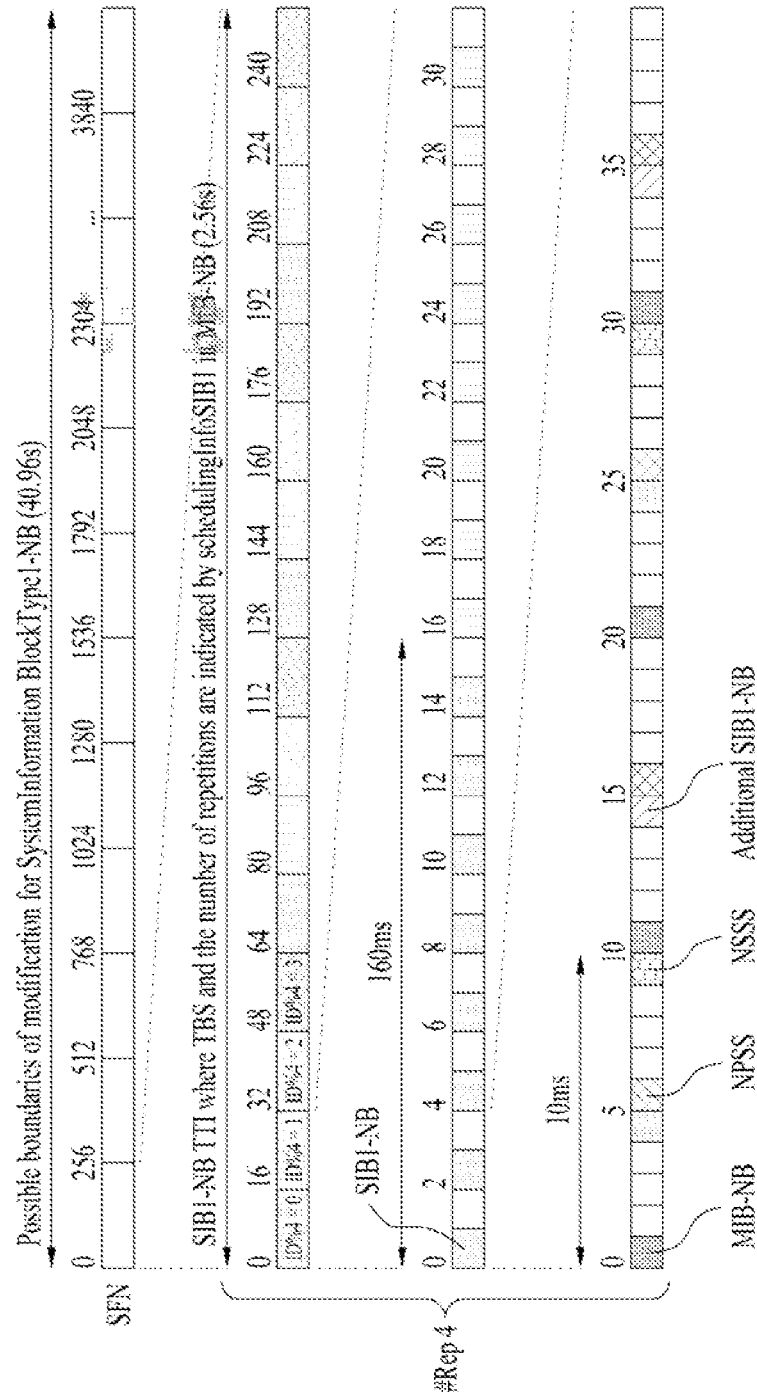
FIG. 12a to FIG. 12c are diagrams illustrating methods of transmitting additional SIB1-NB in subframe #4 where SIB1-NB is not transmitted according to an embodiment of the present disclosure.
Figure 12B:
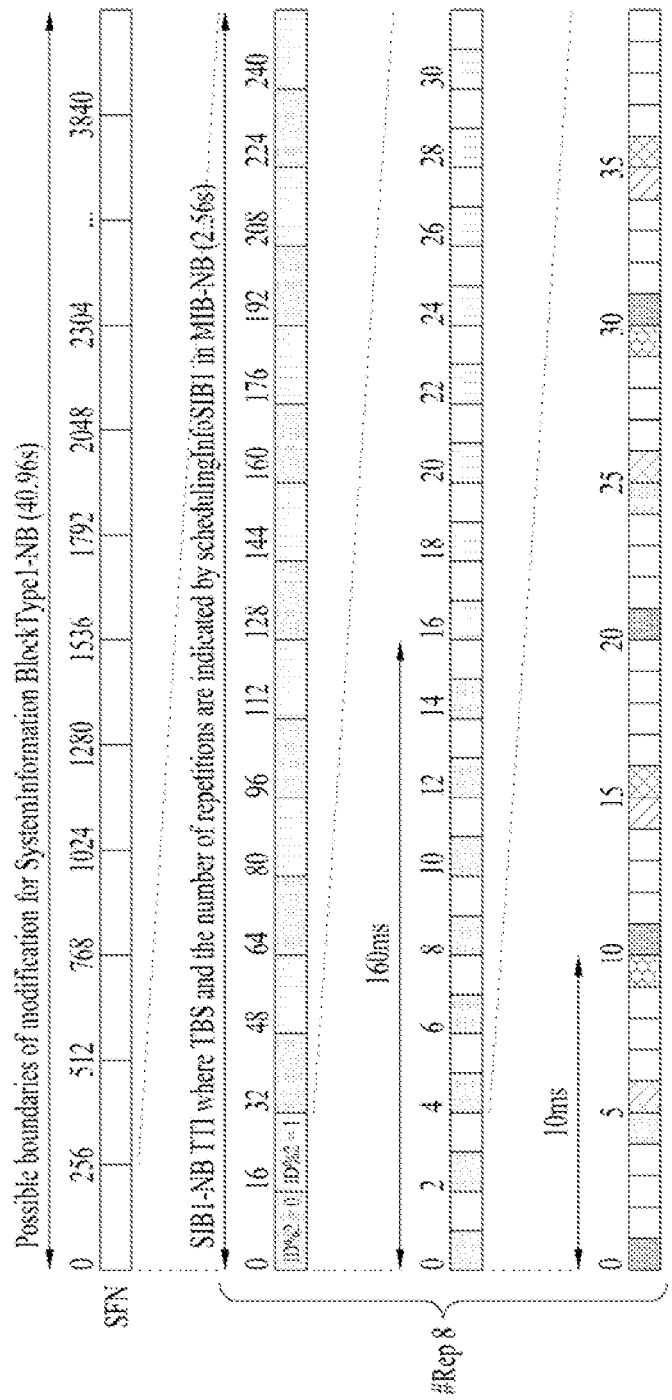
Figure 12C:
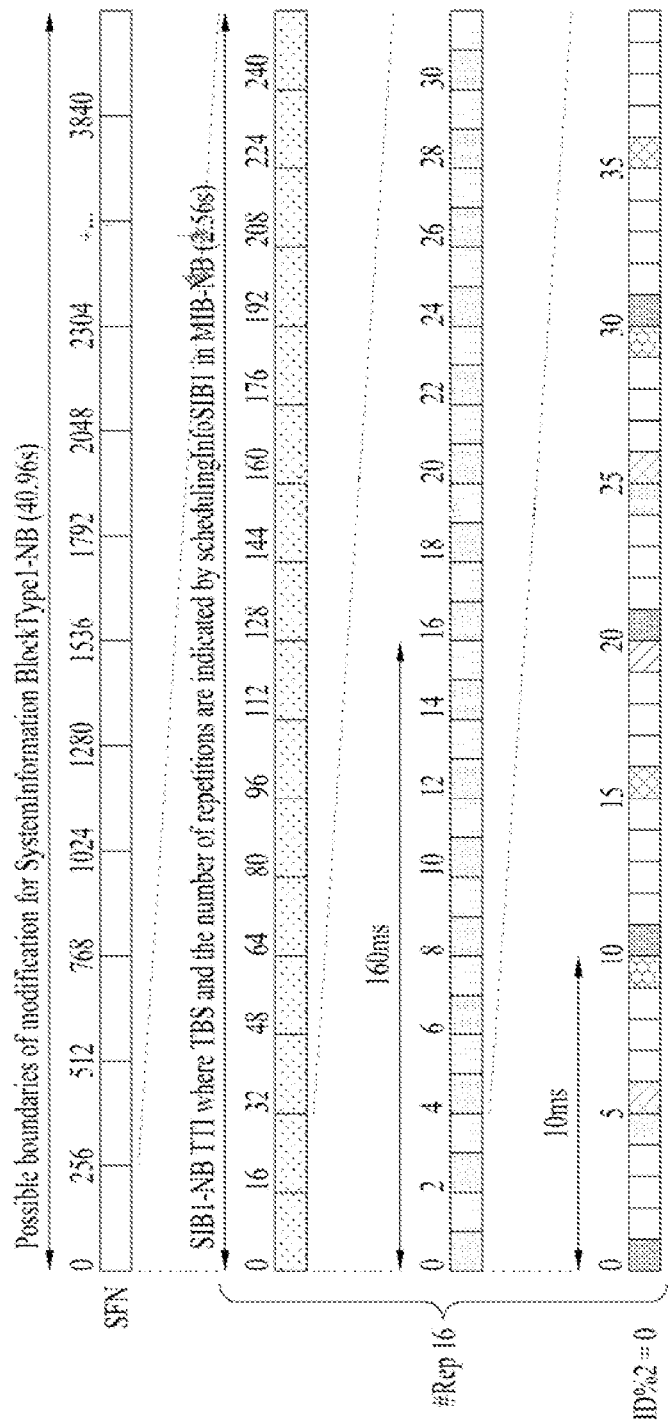

FIGS. 12a and 12b are diagrams illustrating the transmission positions of aSIB1-NBs according to an embodiment of the present disclosure.

When an SIB1-NB is additionally transmitted (for example, when an aSIB1-NB is transmitted), it is necessary to determine the positions of a radio frame and a subframe which carry the aSIB1-NB. Before the determination, the transmission frequency of the aSIB1-NB with respect to that of the SIB1-NB should be defined. For example, if the aSIB1-NB is additionally transmitted at the same frequency as that of the SIB1-NB, the repetition numbers of the legacy SIB1-NB {4, 8, 16} become {8, 16, 32} with the repetition numbers of the aSIB1-NB included. The repetition numbers of the legacy SIB1-NB {4, 8} are equivalent to {8, 16} as originally configured. Accordingly, when the repetition numbers of the SIB1-NB are {4, 8}, it is meaningless to transmit the aSIB1-NB with the same period/frequency as that of the SIB1-NB. However, the probability of SIB1-NB collision between cells increases. For example, when the repetition number of the SIB1-NB is 8, the probability of collision between cells is twice larger than when the repetition number of the SIB1-NB is 4.

Meanwhile, if the aSIB1-NB is transmitted every 40 msec (at a half of the transmission frequency of the SIB1-NB), the repetition numbers of the legacy SIB1-NB {4, 8} become {6, 12, 24}, respectively, with the repetition numbers of the aSIB1-NB included. Therefore, even when the repetition number of the MI-NB is 16, transmissions are possible without a collision of SIB1-NB and aSIB1-NB between cells. Therefore, the transmission period of the aSIB1-NB may be set to, but not limited to, 20 msec for the repetition numbers of the SIB1-NB {4, 8}, and 40 msec for the repetition number of the SIB1-NB, 16. That is, the transmission period of the aSIB1-NB may be determined between {20 msec, 40 msec} (configured by a higher layer, configured in the MIB-NB, or fixed by the standards).

When the transmission period of the aSIB1-NB is set to 20 msec, the aSIB1-NB may be transmitted in subframe #4 that does not carry the SIB1-NB as illustrated in FIG. 12a, or in subframe #9 that does not carry the NSSS as illustrated in FIG. 12b. In order to obtain a cross-subframe channel estimation gain, it is preferable to transmit the aSIB1-NB in subframe #9 adjacent to a subframe carrying the MIB-NB. However, if the transmission period of the aSIB1-NB is set to 20 msec, and the repetition number of the SIB1-NB is 16, a collision between an SIB1-NB and an aSIB1-NB transmitted with an odd cell ID and an even cell ID is inevitable. If the transmission period of the aSIB1-NB is set to 40 msec, the aSIB1-NB may be transmitted in subframe #9 that does not carry the NSSS. Compared to the 20-msec transmission period of the aSIB1-NB, the 40-msec transmission period of the aSIB1-NB may enable avoidance of a collision between aSIB1-NBs transmitted with an odd cell ID and an even cell ID, even though the repetition number of the SIB1-NB is 16. For example, when the aSIB1-NB is transmitted every 40 msec in subframe #9 that does not carry the NSSS, an aSIB1-NB with an even cell ID may be transmitted in radio frames with radio frame numbers {2, 6, 10, 14, . . . }, and an aSIB1-NB with an odd cell ID may be transmitted in radio frames with radio frame numbers {4, 8, 12, 16, . . . }. For example, it may be assumed that the radio frame numbers are infinitely increasing integers. In practice, this means that when radio frames that do not carry the NSSS are arranged in order, and are mapped to logical indexes that increase by 1 each time, starting from 0, an odd cell ID means a transmission in a radio frame corresponding to an odd-numbered logical index, and an even cell ID means a transmission in a radio frame corresponding to an even-numbered logical index.

When an aSIB1-MB is transmitted repeatedly, it is necessary to determine resource allocation for the aSIB1-MB transmitted between repeated transmissions of an SIB1-MB (e.g., a circular buffer output to be transmitted in the aSIB1-MB). If the aSIB1-MB carries the previously transmitted SIB1-MB in the same manner, a receiver may not sufficiently use a channel coding output stored in the circular buffer. Therefore, when SIB1-MBs and aSIB1-MBs are collected during the same time period, it is preferably designed that all bits stored in the circular buffer are collected as fast as possible according to a code rate determined based on at least one of the TBS of the SIB1-NB, the repetition number of the SIB1-MB, an operation mode, the number of CRS antenna ports, or the number of NRS antenna ports. Therefore, an NB-IoT UE positioned near a base station (for example, an NB-IoT UE having a sufficiently high SNR) is allowed to fast complete SIB1-MB decoding with a higher probability. To optimize this operation, an optimum "aSIB1-MB-circular buffer output" relationship may be defined based on at least one of the above-enumerated TBS of the SIB-NB, repetition number of the SIB1-MB, operation mode, number of CRS antenna ports, or number of NRS antenna ports. Further, to define the "aSIB1-MB-circular buffer output" relationship more simply, an "aSIB1-MB-circular buffer output" pattern may be defined based on a highest code rate, so that performance improvement is expected without significant effects from the afore-enumerated parameters.

Figure 13A:
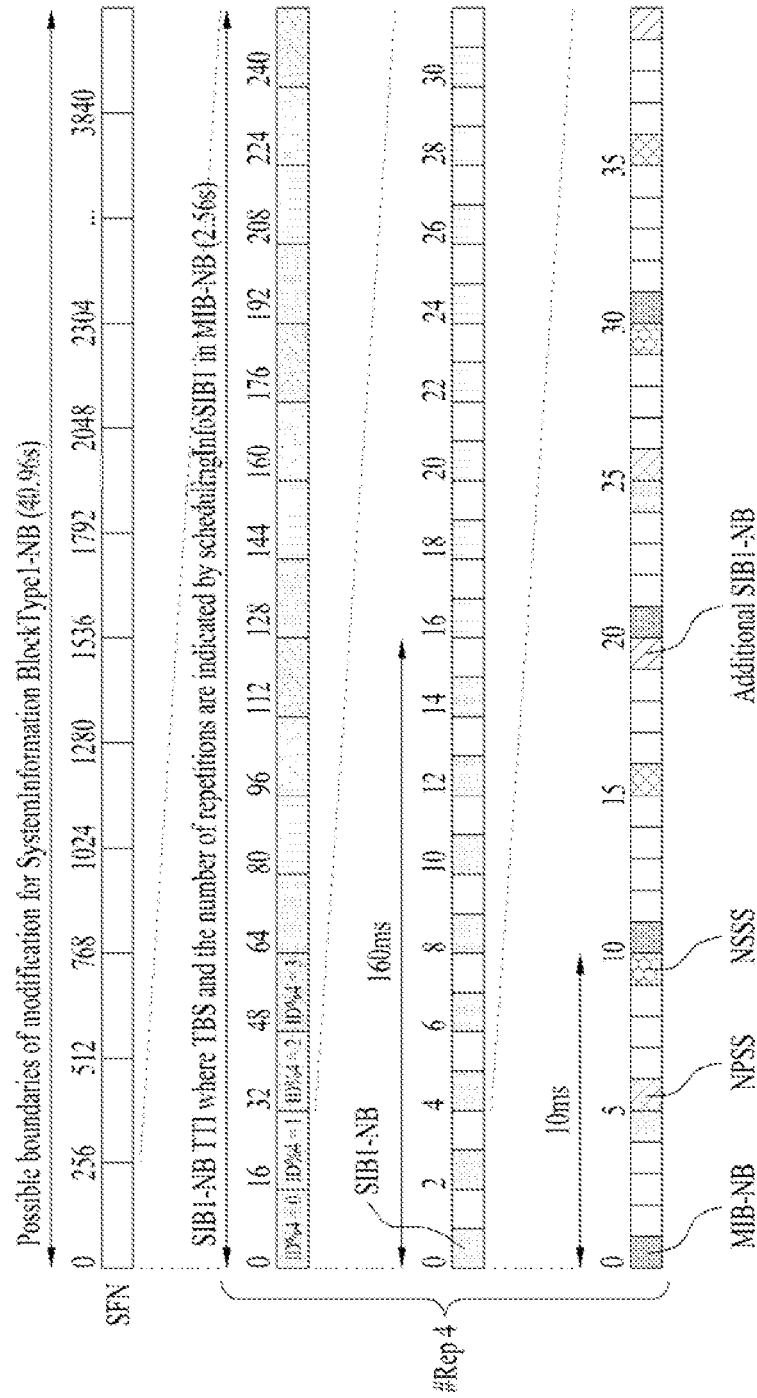
FIG. 13a to FIG. 13c are diagrams illustrating methods of transmitting additional SIB1-NB in subframe #4 where NSSS is not transmitted according to an embodiment of the present disclosure.
Figure 13B:
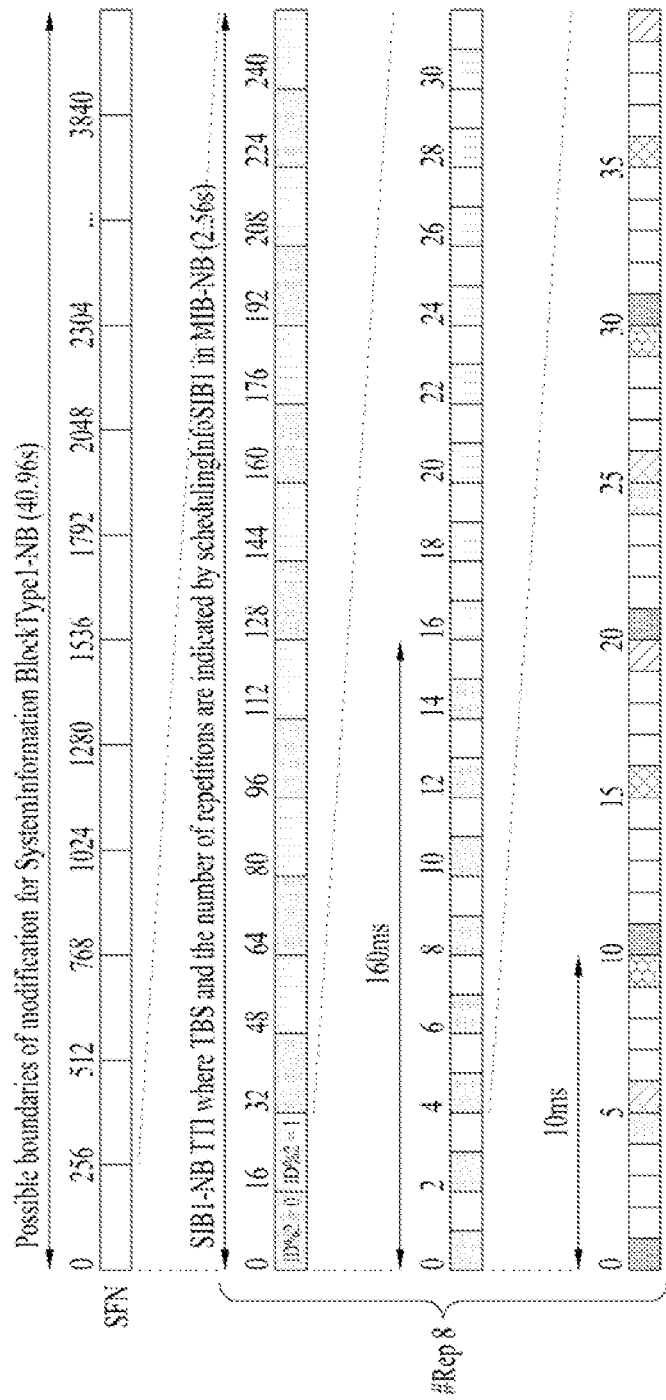
Figure 13C:
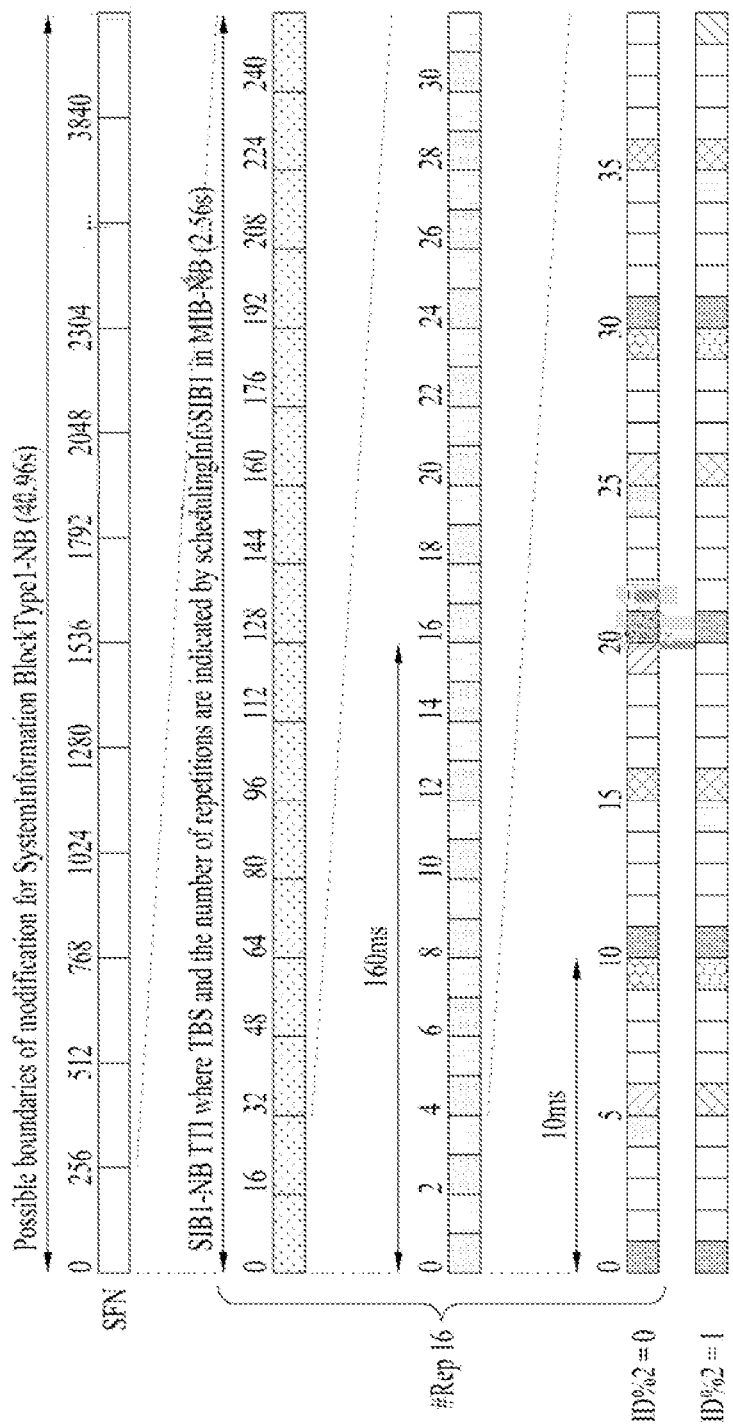

FIG. 13 is a diagram illustrating examples of a circular buffer output, when one codeword is transmitted in 8 subframes according to the TBS and repetition number of an SIB1-MB, an operation mode, the number of CRS antenna ports, and the number of NRS antenna ports.

Referring to FIG. 13, A to H are units that distinguish 8 subframes carrying SIB1-NB from each other, and it is assumed that bits 0 to 9 are in a circular buffer. Further, referring to FIG. 13, it may be noted that if all of the periods A to H are transmitted, only 70% to 80% of the circular buffer is transmitted. Accordingly, the remaining 20% to 30% of the circular buffer needs to be transmitted in an aSIB1-NB. To this end, an offset (may be represented by RV) for the circular buffer may be set differently from the SIB1-NB. For example, coded bits transmitted in the aSIB1-NB may be a value output from the circular buffer in which coded bits to be transmitted in the SIB1-NB are stored by sequentially generating addresses after the last address used to transmit the SIB1-NB. Therefore, the coded bits included in the SIB1-NB and the aSIB1-NB transmitted in the same radio frame may not be values output consecutively from the circular buffer. Or, if the transmission order of the SIB1-NB is {A, B, C, D, E, F, G, H}, the transmission order of the aSIB1-NB may be set to {I, J, K, L, M, N, O, P}. Herein, I to P may represent virtual indexes produced to additionally transmit the non-transmitted 20% to 30% of the circular buffer.

Further, to minimize a circular buffer manipulation operation of the base station, the transmission order of the aSIB1-NB may be defined only as A to H. For example, the transmission order of the aSIB1-NB may be set to be different from that of the SIB1-NB, such as {E, F, G, H}, {E, F, A, B}, {C, E, G, A}, or {D, F, H, B}. Further, when the transmission period of the aSIB1-NB is 20 msec, the transmission order of the aSIB1-NB may be set to {E, F, G, H, A, B, C, D}. However, the transmission order of the aSIB1-NB is not limited to the above examples, and may be defined as any of various orders that enable fast transmission of a whole channel coding output for a codeword of the SIB1-NB, stored in the circular buffer. Further, an optimum transmission pattern for the aSIB1-NB (a relationship between circular buffer and aSIB1-NB) may be predefined based on the TBS and repetition number of the SIB1-NB, an operation mode, the number of CRS antenna ports, and the number of NRS antenna ports. The base station may transmit the aSIB-NB according to the predefined aSIB1-NB transmission pattern, and the NB-IoT UE may determine the aSIB1-NB transmission pattern based on SIB1-NB scheduling information of the MIB-NB.

Figure 15A:
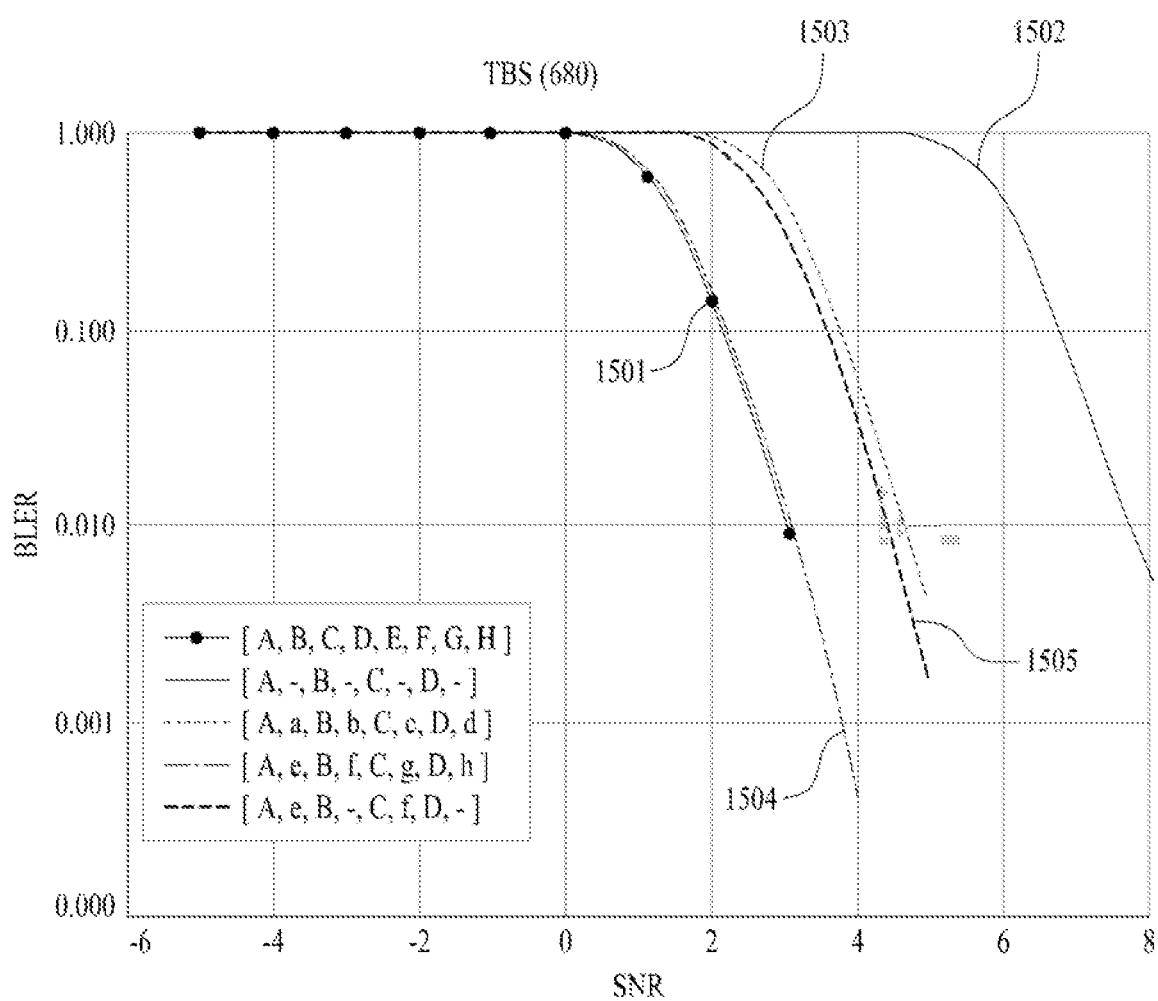
FIG. 15a and FIG. 15b are diagrams illustrating BLER performance in accordance with additional SIB1-NB transmission patterns according to an embodiment of the present disclosure.
Figure 15B:
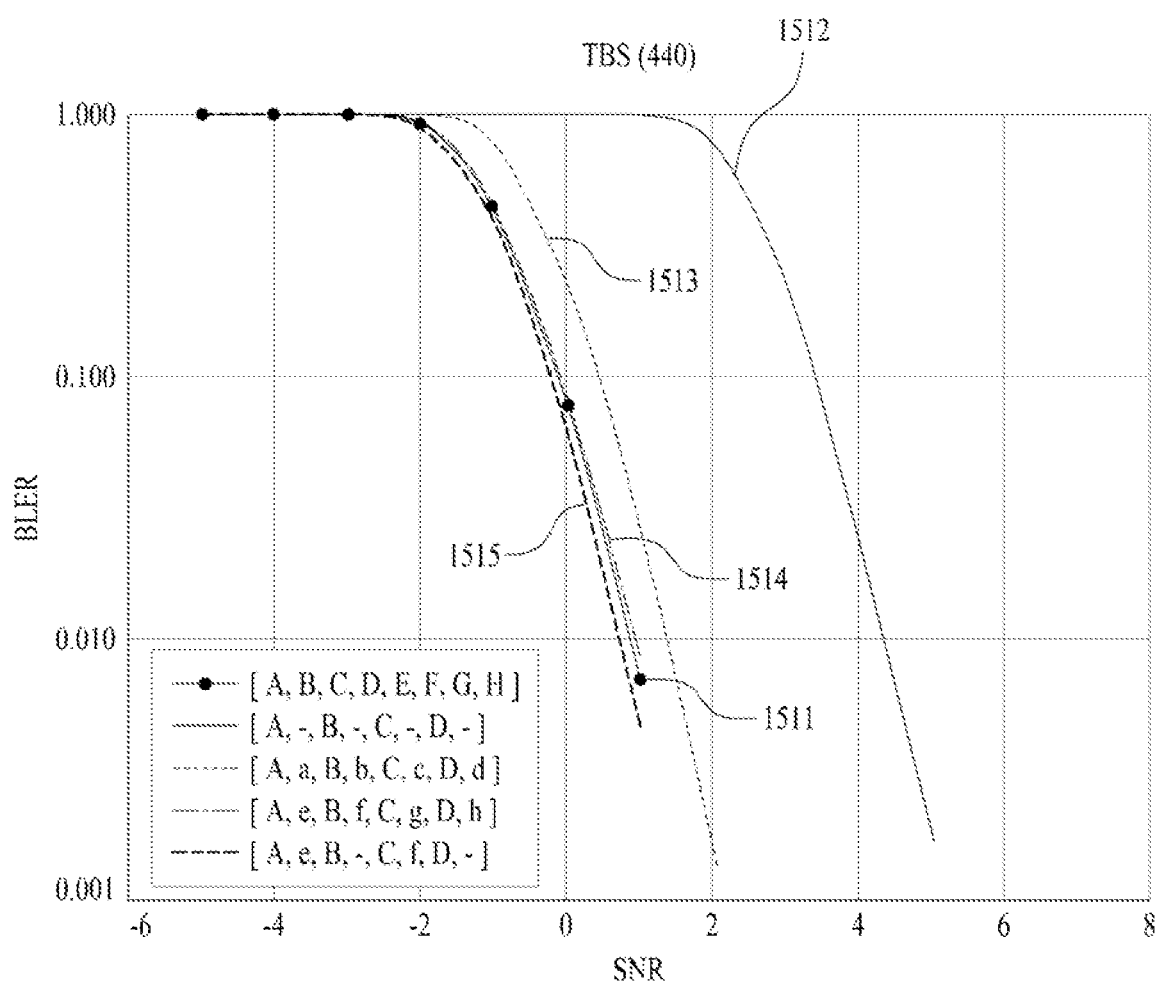

FIGS. 15a and 15b are diagrams illustrating Block Error Rate (BER) performance according to aSIB1-NB transmission patterns.

Referring to FIGS. 15a and 15b, [A, B, C, D, E, F, G, H] represents a case of receiving only the legacy SIB1-NB for 160 msec, and [A,-,B,-,C,-,D,-] represents a case of receiving only the legacy SIB1-NB for 80 msec. In addition, [A, a, B, b, C, c, D, d] represents a case of receiving an SIB1-NB and an aSIB1-NB for 80 msec, when the aSIB1-NB is transmitted in the same pattern as the SIB1-NB. [A, e, B, f, C, g, D, h] represents a case of receiving an SIB1-NB and an aSIB1-NB, when the aSIB1-NB is transmitted in a pattern obtained by changing the output order of the circular buffer so that the aSIB1-NB has an offset of 80 msec from the SIB1-NB. It is assumed in both cases that the aSIB1-NB is transmitted every 20 msec. [A, e, B, C, f, D, -] represents a case of receiving an SIB1-NB and an aSIB1-NB for 80 msec, when the transmission period of the aSIB1-NB is 40 msec, and the aSIB1-NB is transmitted in a pattern obtained by changing the output order of the circular buffer, like [A, e, B, f, C, g, D, h].

FIG. 15a illustrates BLER performance for a TBS of 680, and FIG. 15b illustrates BLER performance for a TBS of 440. It may be noted that when an offset is set for the output of the circular buffer, performance is always improved in both cases of the TBSs of 680 and 440.

When an aSIB1-NB is transmitted, a legacy NB-IoT UE (for example, an NB-IoT UE in LTE Release 13, 14) does not know that the aSIB1-NB is transmitted in a specific frame, and thus may perform a wrong operation in interpreting resource allocation for the NPDCCH and the NPDSCH. Therefore, downlinkBitmap corresponding to the position of a subframe carrying the aSIB1-NB needs to be indicated as '0' (invalid). Meanwhile, when transmission of an aSIB1-NB from a cell is indicated to an NB-IoT UE in LTE Release 15, the NB-IoT UE may expect that the aSIB1-NB exists in a specific subframe irrespective of downlinkBitmap. As described before, the specific subframe may be subframe #4 or subframe #9, and may be associated with a cell ID and the repetition number of an SIB1-NB.

According to some embodiments, an aSIB1-NB is not always transmitted at a specific position (for example, in a specific subframe). Instead, only when a specific condition is satisfied, the aSIB1-NB may be transmitted additionally. For example, if the code rate of an SIB1-NB is higher than a specific value, it may be configured or defined that an additional transmission of the SIB1-NB is expected. The specific value may be fixed by a specification, or configured and indicated to an NB-IoT UE by a base station, which should not be construed as limiting the present disclosure.

As is the case with a code rate, a condition for additional SIM-NB transmission may be set based on the TBS of an SIB1-NB, the repetition number of the SIB1-NB, an NB-IoT operation mode, the number of NRS antenna ports, the number of CRS antenna ports, and so on. Further, a aSIB1-NB transmission pattern (encoded bits-to-subframe mapping and transmission reordering) may be defined differently based on at least one of the TBS of an SIB1-NB, the repetition number of the SIB1-NB, an operation mode of NB-IoT, the number of NRS antenna ports, or the number of CRS antenna ports. This is possible because the NB-IoT UE has already obtained related parameters before SIB1-NB detection. This method may be defined differently to optimize the performance of an SIB1-NB.

Besides, the proposed SIB1-NB transmission pattern (encoded bits-to-subframe mapping and transmission reordering) is also applicable to additional transmission of repeatedly transmitted data, not limited to an SIB1-NB.

4.9. Proposal 9: "Method of Indicating aSIB1-NB Transmission and Method of Configuring Valid DL Bitmap"

The present patent application proposes a method of indicating aSIB1-NB transmission to an NB-IoT UE by a base station, separately from the afore-proposed aSIB1-NB configuration method. Further, the present patent application proposes a method of configuring a valid DL bitmap for the transmission positions of aSIB1-NBs, for the purpose of DL resource management and scheduling for a legacy NB-IoT UE (for example, a UE having no knowledge of the presence of an aSIB1-NB).

A valid DL bitmap may be a bitmap indicating the position of a subframe in which an NB-IoT UE may expect a DL NRS or reception of an NPDCCH and an NPDSCH. The valid DL bitmap may be configured in 10 bits or 40 bits in the in-band mode, and in 10 bits in the guard-band mode and the stand-alone mode. The valid DL bitmap is defined as downlinkBitmap in TS 36.331.

An NB-IoT UE may receive an MIB-NB and an SIB1-NB from a base station, and the MIB-NB or the SIB1-NB may indicate whether an aSIB1-NB is transmitted or not. The NB-IoT UE may obtain information indicating whether an aSIB1-NB is transmitted from the received MIB-NB or SIB1-NB.

When an aSIB1-NB is transmitted in a specific subframe, the base station may indicate the specific subframe as invalid by a valid DL bitmap. A legacy NB-IoT UE may not know whether the aSIB1-NB is transmitted. Therefore, by indicating the subframe carrying the aSIB1-NB as invalid, the base station may enable the legacy NB-IoT UE not to expect an NPDCCH and/or an NPDSCH in the specific subframe. On the other hand, the NB-IoT UE capable of determining whether the aSIB1-NB is transmitted (for example, the NB-IoT UE conforming to LTE Release 15) may receive the aSIB1-NB in the subframe indicated as invalid by the base station.

However, even though the aSIB1-NB transmission is indicated by the MIB-NB or the SIB1-NB, the aSIB1-NB may not be transmitted in the specific subframe according to a cell ID, the repetition number of the SIB1-NB, or the like. Then, even though the specific subframe is indicated as invalid, the NB-IoT UE may determine the specific subframe as valid. The NB-IoT UE may expect at least one of an NRS, an NPDCCH, or an NPDSCH in the specific subframe. For example, the NB-IoT UE may expect that at least one of the NRS, the NPDCCH, or the NPDSCH is transmitted in the specific subframe, and may perform decoding.

1) Method of Indicating aSIB1-NB Transmission by Using Reserved (or Unused) Bits of MIB-NB The base station may indicate aSIB1-NB transmission by one bit of an MIB-NB.

In the case where aSIB1-NB transmission is indicated by an MIB-NB, upon acquisition of information indicating aSIB1-NB transmission, the NB-IoT UE may be aware that an aSIB1-NB is transmitted within an SIB1-NB modification period including the MIB-NB. However, when the NB-IoT UE completes decoding the MIB-NB, much of the SIB1-NB modification period may not remain, and thus a gain achieved from the aSIB1-NB transmission may be limited. Accordingly, aSIB1-NB transmission may be signaled by 2 bits of the MIB-NB. If the 2 bits indicate a value '0', this may mean no transmission of an SIB1-NB, and if the 2 bits indicates a non-zero value, this may mean the difference between a corresponding SIB1-NB modification period and an SIB1-NB modification period in which the aSIB1-NB is transmitted. A change of a bit value used to indicate whether an aSIB1-NB is transmitted does not correspond to a system information update condition. For example, even though a change occurs to EarthQuake Tsunami Warning System (ETWS) information, Commercial Mobile Alert Service (CMAS) information, time information (for example, SystemInformationBlockType8, SystemInformationBlockType16, and HyperSFN-MSB of SystemInformationBlockType1-NB), Extended Access Barring (EAB), an AB parameter, or information indicating whether an aSIB1-NB is transmitted, the NB-IoT UE does not update the value of SystemInfoValueTag. Accordingly, information indicating whether an aSIB1-NB is transmitted in an MIB-NB is not included in a system information modification notification condition. Therefore, a change in the information indicating whether an aSIB1-NB is transmitted does not directly induce paging for system information update. According to the proposed method, an NB-IoT UE may advantageously use aSIB1-NB transmission from the moment the NB-IoT UE initially accesses a cell.

2) Method of Indicating aSIB1-NB Transmission by SIB1-NB

As stated before, information indicating whether an aSIB1-NB is transmitted may be delivered in an MIB-NB or an SIB1-NB. For example, in the case where the information indicating whether an aSIB1-NB is transmitted is delivered in the SIB1-NB, when the SIB1-NB is changed, it may be directly indicated by the changed SIB1-NB whether an aSIB1-NB is transmitted. A time for applying the information indicating whether aSIB1-NB is transmitted, which is delivered in the SIB1-NB, may be defined as follows in the case where an ongoing aSIB1-NB transmission is discontinued, and vice versa.

(2-1) The Case of Indicating that an aSIB1-NB has not been Transmitted and then aSIB1-NB is Transmitted.

An SIB1-NB changed at a modification boundary of the SIB1-NB may indicate aSIB1-NB transmission. For example, the modification boundary of the SIB-NB may be a boundary between SIB1-NB modification periods or between modification time periods. Since the NB-IoT does not know that an aSIB1-NB is transmitted, the NB-IoT UE may not use the aSIB1-NB within a corresponding SIB1-NB modification period. Therefore, the base station does not need to transmit the aSIB1-NB within the SIB1-NB modification period, and may transmit the aSIB1-NB after a predetermined time. The predetermined time may be predefined between the base station and the NB-IoT UE. For example, the predetermined time may be defined as, but not limited to, a time corresponding to one SIB1-NB modification period. If the NB-IoT UE fails in decoding an SIB1-NB during the SIB1-NB modification period, the NB-IoT UE may continue attempting to decode the MI-NB, assuming that an aSIB1-NB is not transmitted. Then, the base station may indicate the index of a subframe to carry the aSIB1-NB as '0' in a valid DL bitmap in the SIB1-NB modification period. If a legacy NB-IoT UE succeeds in decoding the SIB1-NB within the SIB1-NB modification period, the legacy NB-IoT UE will interpret the position of a specific subframe (the position of a subframe to carry the aSIB1-NB) as invalid in the valid DL bitmap. Accordingly, the base station may perform scheduling, assuming that the subframe to carry the aSIB1-NB is an invalid DL subframe, from the corresponding SIB-NB modification period.

(2-2) The Case of Indicating that On-Going aSIB1-NB Transmission is No More Transmitted.

An SIB1-NB modified at an SIB1-NB modification boundary may indicate that on-going aSIB1-NB transmission will be discontinued. Since the NB-IoT UE assumes that an aSIB1-NB is still being transmitted, the aSIB1-NB needs to be transmitted within a corresponding SIB1-NB modification period, and the aSIB1-NB transmission may stop after a predetermined time. The predetermined time may be predefined between the base station and the NB-IoT UE in order to avoid confusion. For example, the predetermined time may be defined as a time corresponding to one SIB1-NB modification period.

If the NB-IoT UE fails in decoding an SIB1-NB during the SIB1-NB modification period, the NB-IoT UE may continue attempting to decode an SIB1-NB, assuming that an aSIB1-NB is not transmitted. Then, the base station may indicate the index of a subframe that will not carry an aSIB1-NB as '1' in a valid DL bitmap in the SIB1-NB modification period. If a legacy NB-IoT UE succeeds in decoding the SIB1-NB within the SIB1-NB modification period, the decoding performance of the NPDCCH and the NPDSCH may be degraded because the aSIB1-NB is still being transmitted during the SIB1-NB modification period at the position of a specific subframe indicated by the valid DL bitmap.

3) Method of Indicating aSIB1-NB Transmission by Paging DCI (DCI Format N2)

When system information is updated, a DCI format N2 CRC is scrambled by a P-RNTI, and Flag for paging/direct indication differentiation is indicated as '0'. Further, direct indication information comprising 8 bits may indicate whether system information has been changed (or updated) according to each bit value. The direct indication information has 3 unused bits, and DCI format N2 has 6 unused bits. Therefore, the base station may determine preliminarily whether the changed SIB1-NB is transmitted together with an aSIB1-NB by using a part of the 3 unused bits of the direct indication information and/or the 6 unused bits of DCI format N2. Further, the base station may preliminarily indicate SIB1-NB scheduling information included in an MIB-NB to the NB-IoT UE by the unused bits. Therefore, the base station may help the NB-IoT UE to skip MIB-NB decoding for obtaining scheduling information for the changed SIB1-NB.

Further, specific unused bits may deliver information indicating that the NB-IoT UE may attempt to decode the changed SIB1-NB by using previously obtained MIB-NB information. Further, when the NB-IoT UE needs to read access barring information in the MIB-NB or decodes the changed SIB1-NB, or before the NB-IoT UE decodes the changed SIB-NB, the specific unused bits may indicate that that MIB-NB is to be decoded again.

4) Method of Deriving aSIB1-NB Transmission Based on Code Rate

The base station may indicate whether it has the capability of transmitting an aSIB1-NB to the NB-IoT UE by high-layer signaling. Further, the base station may notify the NB-IoT UE of a condition that an aSIB1-NB is not transmitted always but transmitted only when the code rate of an SIB1-NB (or an indicator equivalent to the code rate or an indicator representing the decoding performance of an SIB1-NB in an AWGN environment) is larger than a predetermined value. The code rate may be determined based on at least one of the repetition number of an SIB1-NB, an operation mode, the number of CRS antenna ports, the number of NRS antenna ports, or the TBS of the SIB1-NB. In the in-band mode, it may be assumed that a CFI is always 3 and thus the first 3 OFDM symbols of a subframe are REs not used for SIB1-NB transmission. If the code rate is 1 (or a sufficiently large value), this may imply that an aSIB1-NB is not transmitted at all, and if the code rate is 0 (or a sufficiently small value), this may imply that an aSIB1-NB is always transmitted. In addition, code rate information may be defined through quantization in the form of a table.

The base station may update information indicating whether an aSIB1-NB is transmitted and/or a transmission condition in every SIB1-NB modification period, using the indicator of code rate, and deliver the information indicating whether an aSIB1-NB is transmitted and/or the transmission condition by an MIB-NB, an SIB1-NB, other system information, or RRC signaling.

4.10. Proposal 10: "Method of Interpreting Index of Subframe Carrying aSIB1-NB Indicated as Invalid Downlink Subframe"

If an aSIB1-NB is transmitted in a specific DL subframe (for example, subframe #3 of a radio frame carrying the legacy SIB1-NB), the position of the DL subframe may be indicated in a DL-Bitmap-NB. This may be intended to allow the legacy NB-IoT UE not to expect the NPDCCH and/or the NPDSCH at the position of the subframe.

When the base station has indicated that an aSIB1-NB is transmitted in an MIB-NB and/or another channel, a specific DL subframe available for aSIB1-NB transmission may not actually carry the aSIB1-NB according to a cell ID and the repetition number of an SIB1-NB, but may be indicated as invalid by the DL-Bitmap-NB. A set of such subframes may be referred to as B-type subframes. An NB-IoT UE conforming to LTE Release 15 (or an NB-IoT UE capable of expecting aSIB1-NB reception) may interpret the B-type subframes as valid, differently from the indication of the DL-Bitmap-NB. From the perspective of the NRS and the NPDCCH/NPDSCH, the following specific conditions may be applied differently.

1) NRS

A. The NB-IoT UE may always expect to receive the NRS in a B-type subframe.

B. If the NB-IoT UE may not expect the NPDCCH included in at least type-2 and/or type-2A common search space (CSS) in a T-type subframe, the NB-IoT UE may expect the NRS only in a B-type subframe in which a user-specific search space (USS) may be expected.

2) NPDCCH

A. The NB-IoT UE may expect, in a B-type subframe, only reception of "an NPDCCH including DCI format N0/N1 scrambled by a C-RNTI in a UE-specific search space" and "an NPDSCH scheduled by DCI format N1 scrambled by a C-RNTI in a UE-specific search space (an NPDSCH for which a DL grant is received)".

B. For example, the NB-IoT UE may not expect, in a B-type subframe, an NPDCCH included in a common search space and receivable in RRC IDLE mode, and an NPDSCH scheduled by DCI format N0 or N2 in the common search space.

C. Further, a common search space in which a random access response (RAR) for an NPDCCH order-based NPRACH is received may also be interpreted as an invalid subframe in RRC CONNECTED mode.

D. It may be defined that as far as the NB-IoT UE is capable of expecting type-1 and/or type-1A CSS in a B-type subframe, the repetition number of DCI is interpreted only based on a CSS belonging to an NB-IoT DL subframe in the same manner as defined in LTE Releases 13 and 14 (e.g., only a subframe indicated as a valid DL subframe by a DL-Bitmap-NB is interpreted as an NB-IoT DL subframe, and an NPDCCH is expected only in the NB-IoT DL subframe. Herein, a subframe carrying system information may be excluded from NB-IoT DL subframes).

Further, even when the base station announces that an aSIB1-NB will be transmitted, an NB-IoT UE conforming to LTE Release 15 (a UE capable of determining whether an aSIB1-NB is transmitted in a corresponding cell) may recognize the position of a subframe that does not actually carry an aSIB1-NB (the position of a subframe which has the same subframe index as available for transmission of an aSIB1-NB, but which does not actually carry the aSIB1-NB according to the cell ID of the cell and the repetition number of an SIB1-NB) as an invalid DL subframe. To this end, the base station may indicate to a UE conforming to LTE Release 15 or beyond by one or N additional bits of an SIB1-NB (or another SIB) that subframe #3 actually carrying no aSIB1-NB is to be recognized as an invalid DL subframe, even though aSIB1-NB transmission is scheduled. However, the corresponding information may exist only when the base station schedules aSIB1-NB transmission, and it may be defined that subframe #3 is identified as a valid or invalid subframe irrespective of the legacy downlinkBitmap (DL-Bitmap-NB). Or, only when the legacy downlinkBitmap (DL-Bitmap-NB) indicates subframe #3 (a subframe index available for aSIB1-NB transmission) as an invalid subframe, the NB-IoT UE may determine by using the newly added 1 or N bits whether subframe #3 is to be interpreted actually as invalid.

Further, the NB-IoT UE may not expect that "the position of a subframe that actually carries an aSIB1-NB" (a set of subframes that actually carry an aSIB1-NB are referred to as A-type subframes) is indicated as valid by downlinkbitmap. For example, the NB-IoT UE may expect that an A-type subframe is not indicated as valid by downlinkBitmap. Further, if some A-type subframes are indicated as valid by downlinkBitmap, the NB-IoT UE may prioritize downlinkBitmap to determine whether all or some of the A-type subframes are valid/invalid. Interpretation priority may be given such that interpretation of an A-type subframe matches a legacy NB-IoT UE (for example, a UE that does not know the presence of an aSIB1-NB). If an A-type subframe is present (for example, when the base station indicate aSIB1-NB transmission), the base station needs to necessarily transmit downlinkBitmap information.

4.11. Proposal 11: "Method of Skipping Attempt to Decode MIB-NB and SIB1-NB"

Based on the foregoing Proposal 9, a method of skipping an attempt to decode an MIB-NB and an SIB1-NB by an NB-IoT UE will be proposed. The proposed method is applicable without distinguishing duplex modes or operation modes, and is designed not to affect legacy NB-IoT UEs (for example, UEs conforming to Release 13 and Release 14). The present proposal is a method applicable when a change in system information is indicated by direct indication information. First, a configuration of the corresponding information, and a related NB-IoT UE procedure in the current NB-IoT FDD system may be summarized in FIG. 23.

In the present proposal, a method of skipping an attempt to decode an MIB-NB and/or an SIB1-NB by using all or a part of 6 unused bits of direct indication information (in the above table, bits 3, 4, 5, 6, 7, and 8 of the direct indication information) and/or 6 unused bits of DCI format N2 (flag=0)

(in FIG. 23, 6 bits filled according to "Reserved information 6 bits are added until the size is equal to that of format N2 with Flag=1") is proposed.

For example, when system information is changed, the base station needs to indicate the NB-IoT UE to read an MIB-NB first. This may be referred to as a fallback mode. For example, an operation mode may be changed or access class barring may take place. If only access class barring occurs, the base station may indicate access class barring information directly by DCI format N2, and the NB-IoT UE may directly attempt SIB14-NB decoding based on the information. However, the NB-IoT UE needs to obtain SIB14-NB scheduling information to decode an SIB14-NB, and needs to decode an SIB1-NB to obtain the SIB14-NB scheduling information. Since SIB1-NB scheduling information is included in an MIB-NB, the NB-IoT UE needs to decode the MIB-NB in order to obtain the SIB1-NB scheduling information and decode the SIB1-NB.

To skip the above decoding processes, DCI format N2 may include even SIB1-NB scheduling information. For example, if the NB-IoT UE receives SIB1-NB scheduling information directly from DCI format N2, the NB-IoT UE may skip MIB-NB decoding. Herein, the SIB1-NB scheduling information may be configured in 4 bits, and only part of the 4-bit information may be included in DCI format N2. For example, it may be indicated to the UE whether the SIB1-NB scheduling information is the same as previous SIB1-NB scheduling information by 1-bit information. In another example, only information indicating whether SIB1-NB scheduling is the same as previous SIB1-NB scheduling, or only offset information between changed SIB1-NB scheduling information and previous SIB1-NB scheduling information may be included and delivered in information of more than one bit.

Further, although MIB-NB decoding may be skipped, if the NB-IoT UE is to receive an SIB1-NB again, information indicating whether an aSIB1-NB can be expected again may be included additionally in DCI format N2.

Whether an aSIB1-NB is transmitted may be indicated by using one bit added to MIB-NB. However, if MIB-NB decoding is skipped by using DCI format N2 but SIB1-NB decoding is to be performed, the base station may also indicate whether an aSIB1-NB is transmitted at a time. Further, a part (for example, some lower bits) of information of systemInfoValueTag included in the MIB-NB may also be included in DCI format N2. Considering that the NB-IoT UE may lose SFN information synchronization, a part (for example, some lower bits) of SFN information may also be delivered in DCI format 2.

Further, by using unused bits of direct indication information of DCI format N2, the base station may also indicate that the NB-IoT UE is to skip SIB1-NB decoding. For example, the base station may indicate that specific SIBx-NB information has been changed and notify the NB-IoT UE of no change in SIB1-NB information by using additional information of the DCI format N2 direct indication information. Herein, the NB-IoT UE may immediately attempt SIBx-NB decoding, assuming that SIBx-NB scheduling obtained from SIB1-NB is the same.

In summary of the above description, the following information may further be included in DCI format N2 and direct indication information.

1) Fallback

This indicates decoding from an MIB-NB, and the other information added to DCI format N2 and the direct indication information may be ignored.

2) Access Class Barring

The access class barring information indicates whether access class is barred, and MIB-NB decoding may be skipped according to the other information added to DCI format N2 and the direct indication information. For example, if SIB1-NB scheduling information may be induced from information added to DCI format N2 and the direct indication information, the NB-IoT UE may skip MIB-NB decoding, and attempt SIB1-NB decoding based on SIB1-NB scheduling information indicating an SIB1-NB. Herein, if the information added to DCI format N2 and the direct indication information also indicates whether the NB-IoT UE may expect aSIB1-NB transmission, the NB-IoT UE may attempt to decode an SIB1-NB, including an aSIB-NB.

3) SIB1-NB Scheduling

The SIB1-NB scheduling information may be configured in 4 bits, and is identical to SIB1-NB scheduling and size information included in the MIB-NB. Further, only part of the SIB1-NB scheduling and size information may be represented by using fewer than 4 bits, and it may be indicated only whether SIB1-NB scheduling and size are identical to previous SIB1-NB scheduling and size by using fewer than 4 bits.

4) Presence of aSIB1-NB

If the base station is capable of transmitting an aSIB1-NB, and an SIB1-NB is additionally transmitted in a period during which system information is changed, the base station may indicate the presence of an aSIB1-NB in additional information of DCI format N2 and the direct indication information.

5) systemInfoValueTag and SFN systemInfoValueTag may not directly indicate a change of a specific SIBx-NB. However, systemInfoValueTag added to DCI format N2 and the direct indication information may be used to directly indicate whether a specific SIBx-NB has been changed, or whether any system information has been changed in the conventional meaning. However, in this case, systemInfoValueTag included additionally in DCI format N2 and the direct indication information may have a different bit size from that of systemInfoValueTag in the MIB-NB. In addition, to make up for SFN synchronization failure caused by a timing shift or drift of the NB-IoT UE, a part of lower information of an SFN may be transmitted additionally in DCI format N2 and the direct indication information.

The above information may be included in a bitmap by mapping the information to unused bits of DCI format N2 and direct indication information, or defined in the form of a table. For example, the fallback, access class barring, SIB1-NB scheduling, and aSIB1-NB information may be delivered in the unused bits of DCI format N2 and the direct indication information as follows.

(1) $1^{st}$ bit—fallback
(2) $2^{nd}$ bit—access class barring
(3) $3^{rd}$ to $6^{th}$ bits—SIB1-NB scheduling and size
(4) $7^{th}$ bit—aSIB1-NB The $1^{st}$ or $7^{th}$ bit of the 7 bits may be omitted, and then all of the above information may be delivered in 6 unused bits of the DCI format N2 direct indication information. If all of the information corresponding to the 7 bits is transmitted, the $1^{st}$ to $6^{th}$ bits may be included in the 6 unused bits of the DCI format N2 direct indication information, while the $7^{th}$ bit may be included in the 6 unused bits (flag=0) of DCI format N2. Or, if the base station is not capable of transmitting an aSIB1-NB, the $7^{th}$ bit may be omitted. Further, the information may be transmitted in the form of a table. Or, the fallback information may be included in the SIB1-NB scheduling and size information. For example, fallback may be indicated implicitly by indicating Value of scheduling-InfoSIB1 and ITBS as an unused state in Table 16.4.1.3-3 and Table 16.4.1.5.2-1 of TS 36.213. In this case, information may be arranged as follows, by way of example.

(1) 1$^{st}$ bit—access class barring
(2) 2nd to 5$^{th}$ bits—"SIB1-NB scheduling and size", and "fallback" (a value of 12 to 15 indicates fallback)
(3) 6$^{th}$ bit—aSIB1-NB To achieve a similar purpose as the foregoing proposal in a TDD system, information about the position of a non-anchor carrier carrying an SIB1-NB and additional information (e.g., SIB1-NB scheduling-related information that is not included in an MIB-NB in an NB-IoT FDD system) need to be included in DCI format N2. The information about the position of the non-anchor carrier carrying an SIB1-NB and the additional information may be delivered by changing a part of the 6 unused bits of DCI format N2 direct indication information. Or, if the flag field is 0 and 1 in DCI format N2, 6 unused bits which are used to match sizes or DCI formats may additionally be used. The method of delivering by additionally using the 6 unused bits corresponds to the case where a total of 12 bits are used more actively, when DCI format N2 delivers direct indication information.

When the above example is applied to (eF)eMTC, a part of the information configuration of unused bits in direct indication information of DCI format 6-2 may be changed. For example, access class barring information is not be included in an MIB(-BR), 18 states of the states represented in 5 bits are used for SIB1-BR scheduling information included in the MIB, and only 3 unused bits remain in the direct indication information of DCI format 6-2. Therefore, the afore-described access class barring information may be omitted, and only some states of SIB1-BR scheduling information may be delivered in 3 unused bits. Herein, one state may be used to indicate the fallback mode.

The above-described MIB decoding skipping method may be applied more effectively to an environment in which MIB decoding takes much time. Therefore, in the case where only part of SIB1-NB scheduling information is included in direct indication information, limited SIB1-BR scheduling information may be included in the direct indication information by relatively limiting a large TBS or repetition number.

To simplify the above-enumerated information, a method of indicating only whether an MIB-NB value has been changed may be considered. For example, unchanged information may include at least one of access class barring, SIB1-NB scheduling and size, or aSIB1-NB. In this case, however, there may be ambiguity in interpreting that corresponding information is identical to previous information. For example, if a UE fails in detecting a system information modification notification indicated by DCI format N2, the UE may not know whether DCI format N2 has not been transmitted, or the UE fails in detecting the system information modification notification. Therefore, when DCI format N2 is transmitted at a specific time point, the NB-IoT UE may not know a previous MIB-NB accurately. To mitigate this effect, the meaning of a "previous MIB-NB" may be extended to include an MIB-NB included in previous N or N times MIB-NB TTIs, a previous N SIB1-NB TTI, or a previous N SIB1-NB modification period, as well as an MIB-NB before DCI format N2 is received.

The base station may need to indicate to NB-IoT UEs based on another method whether the NB-IoT UE may skip attempting to decode MIB-NB decoding and/or SIB1-NB decoding by using DCI format N2. For example, the another method may include, but not limited to, a method of indicating whether DCI format N2 received from a base station may be used for skipping an attempt to decode an MIB-NB, by allocating an additional field to information (for example, PCCH-Config-NB) that configures a paging DCI-related search space in an SIBx-NB or high-layer signaling such as base station capabilities. For example, without considering the method of the present proposal, a legacy base station may allocate any values to 6 unused bits of the direct indication information and reserved 6 bits of DCI format N2, for use. Therefore, to match an operation and interpretation between the base station and the NB-IoT UE, a separate signal or procedure as described before may be needed. Or, when 5 bits (referred to B-bits) of systemInfoValueTag in the indirect indication information and 1 bit (referred to as A-bit) indicating whether any information except for systemInfoValueTag in an MIB-NB have been changed are used, if the A-bit is '0', the NB-IoT UE may be configured to always read the MIB-NB. For example, if the A-bit is '0', the NB-IoT UE may always attempt to decode the MIB-NB irrespective of the value of systemInfoValueTag of the direct indication information, and a value indicated by the MIB-NB may be used or stored as the value of systemInfoValueTag. This is because, if the base station does not use the direct indication information for the purpose of skipping an attempt to decode the MIB-NB, the NB-IoT UE may wrongly interpret the 6 unused bits of the direct indication information. If the A-bit is '1', the NB-IoT UE may check the B-bits. If the checked B-bits are identical to an already known value of systemInfoValueTag, the NB-IoT UE skips an MIB-NB decoding attempt, whereas if the checked B-bits are different from the already known value of systemInfoValueTag, the NB-IoT UE performs MIB-NB decoding. The NB-IoT UE uses values obtained by decoding the MIB-NB, for all information except for systemInfoValueTag, irrespective of the original meaning of the A-bit.

As described above, if information known from DCI format N2 is used to skip an attempt to decode an MIB-NB, the NB-IoT UE may assume that MIB-NB information which is not included in DCI format N2 is identical to previous MIB-NB information. For example, regarding an MIB-NB in NB-IoT conforming to Release 14, SFN information and a hyper frame number are predictable. Thus, without ambiguity in timing information at a time for detecting DCI format N2, the NB-IoT UE may directly calculate the timing information.

Further, it may be assumed that the value of a system value tag has been changed to be larger than a previous value obtained by the UE by 1. If access class barring information is directly indicated by DCI format N2, it may be assumed that the corresponding value is a value obtained from DCI format N2. Further, if access class barring information may not be known directly from DCI format N2, and DCI format N2 does not indicate the fallback operation of decoding an MIB-NB again, it may be assumed that access class barring has not been performed. It may be assumed that a value related to an operation mode is equal to a value that the NB-IoT UE has obtained. If more than information added to skip an attempt to decode an MIB-NB in DCI format N2 is added to a subsequent MIB-NB, the NB-IoT UE may assume the corresponding information to be identical to a previous value, even though the MIB-NB is indicated by DCI format N2. That is, if DCI format N2 indicates fallback and thus the NB-IoT UE is to decode an MIB-NB, this may be caused by a change of the above-described new field added to the MIB-NB.

Further, although DCI format N2 indicates information that may be skipped during an MIB-NB decoding attempt, if a relative change of some field of an MIB-NB with respect to a previous value should be indicated by or interpreted from DCI format N2 in interpreting the indicated information, and if the NB-IoT UE fails in detecting DCI format N2 at a time when DCI format N2 is transmittable (one or more specific times), the NB-IoT UE may have to always attempt to decode the MIB-NB. Especially this is the case, when the NB-IoT is not capable of determining whether it has failed in detecting DCI format N2, or whether there was no system information modification notification in DCI format N2.

In the proposed method, the unused bits of DCI format N2 and direct indication information have been described in the context of an FDD system (LTE Releases 13 and 14), for the convenience of description. Even though the number of the unused bits is changed in a TDD system or a release beyond Releases 13 and 14, the afore-described method may be performed in the same manner or a similar manner to allow skipping of MIB-NB decoding and/or SIB1-NB decoding. Further, the proposed methods may enable the NB-IoT UE to skip unnecessary operations by actively using DCI for indicating a system information modification in an eMTC system or other systems as well as NB-IoT.

In the proposed methods of skipping an attempt to decode an MIB-NB by using unused bits in a channel (e.g., DCI format N2 or DCI format 6-2) indicating a system information modification in NB-IoT and eMTC, "information allocation in the form of a table" other than "information allocation per bit" may also be possible. For example, if unused bit(s) or state(s) of the channel indicating a system information modification are always set to '0', the fallback mode (indicating master information block decoding) may be allocated as a case in which all or part of the unused bit(s) or state(s) are 0. Therefore, there may not be a possibility of different meanings and interpretations of "unused bit(s) or state(s) of a channel indicating a system information modification" among a UE that does not know the use of unused bit(s) or state(s) of a channel indicating a system information modification in the proposed methods, a base station that does not support the proposed methods, and a UE that supports the proposed methods. The same thing may be applied to the "information allocation per bit" method.

4.12. Proposal 12: "Repetition Number of aSIB1-NB"

An aSIB1-NB and an SIB1-NB may have different transmission periodicities. In general, the transmission period of the aSIB1-NB may be equal to or longer than that of the SIB1-NB. Further, when the aSIB1-NB is transmitted in subframe #3 of a radio frame carrying the legacy SIB1-NB (in subframe #4), the repletion number of the aSIB1-NB may be derived from the repetition number of an SIB1-NB derived from schedulingInfoSIB1 in an MIB-NB. The repetition number of the SIB1-NB may be set in the following two methods.

1) The repetition number of the aSIB1-NB is based on the repetition number of the legacy SIB1-NB.

A. Characteristically, if the repetition numbers of the legacy SIB1-NB are 4 and 8, transmission of the aSIB1-NB may not be allowed.

Figure 16A:
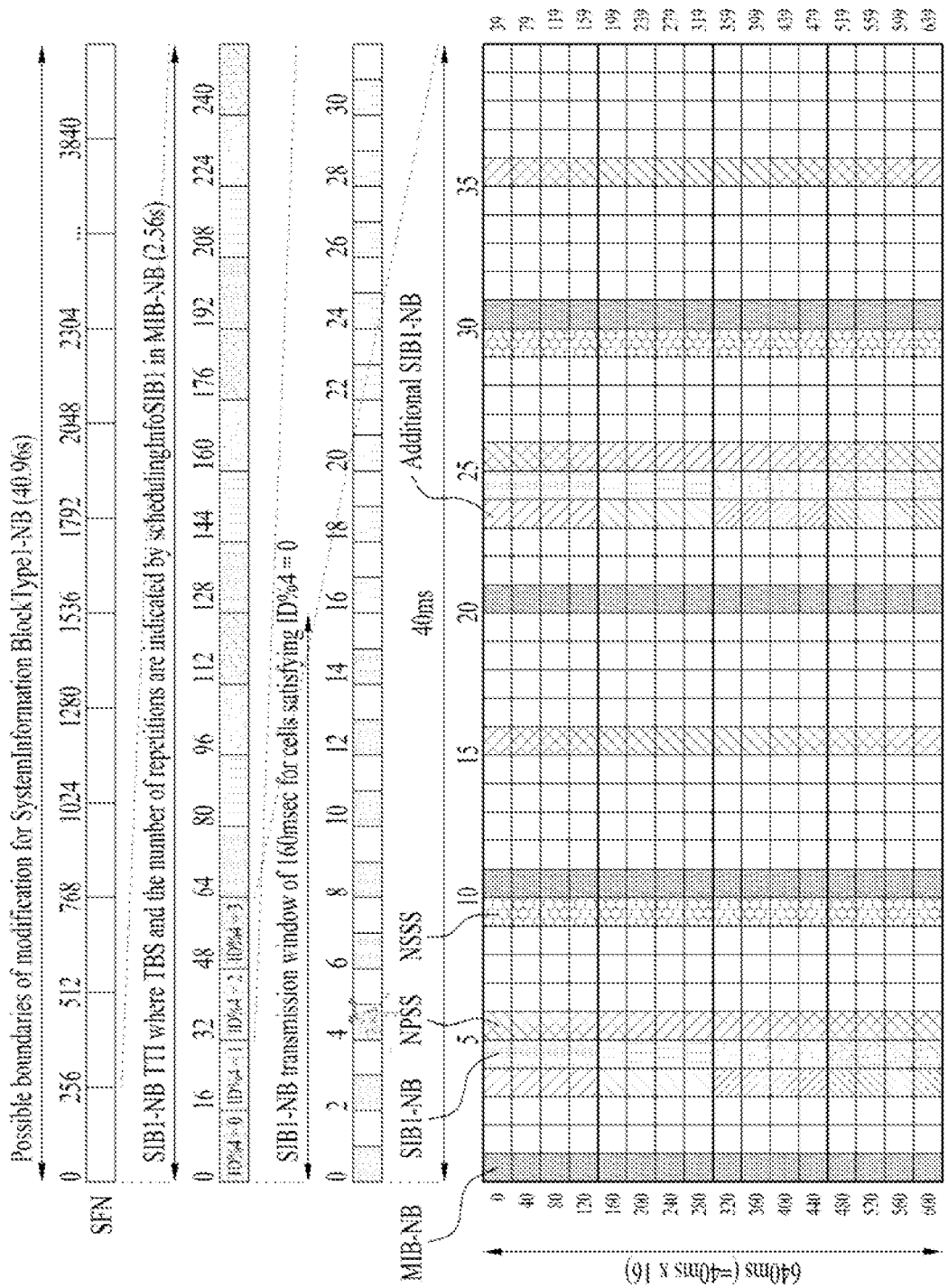
FIG. 16a to FIG. 19c are diagrams illustrating positions where additional SIB1-NB is transmitted according to an embodiment of the present disclosure.
Figure 16B:
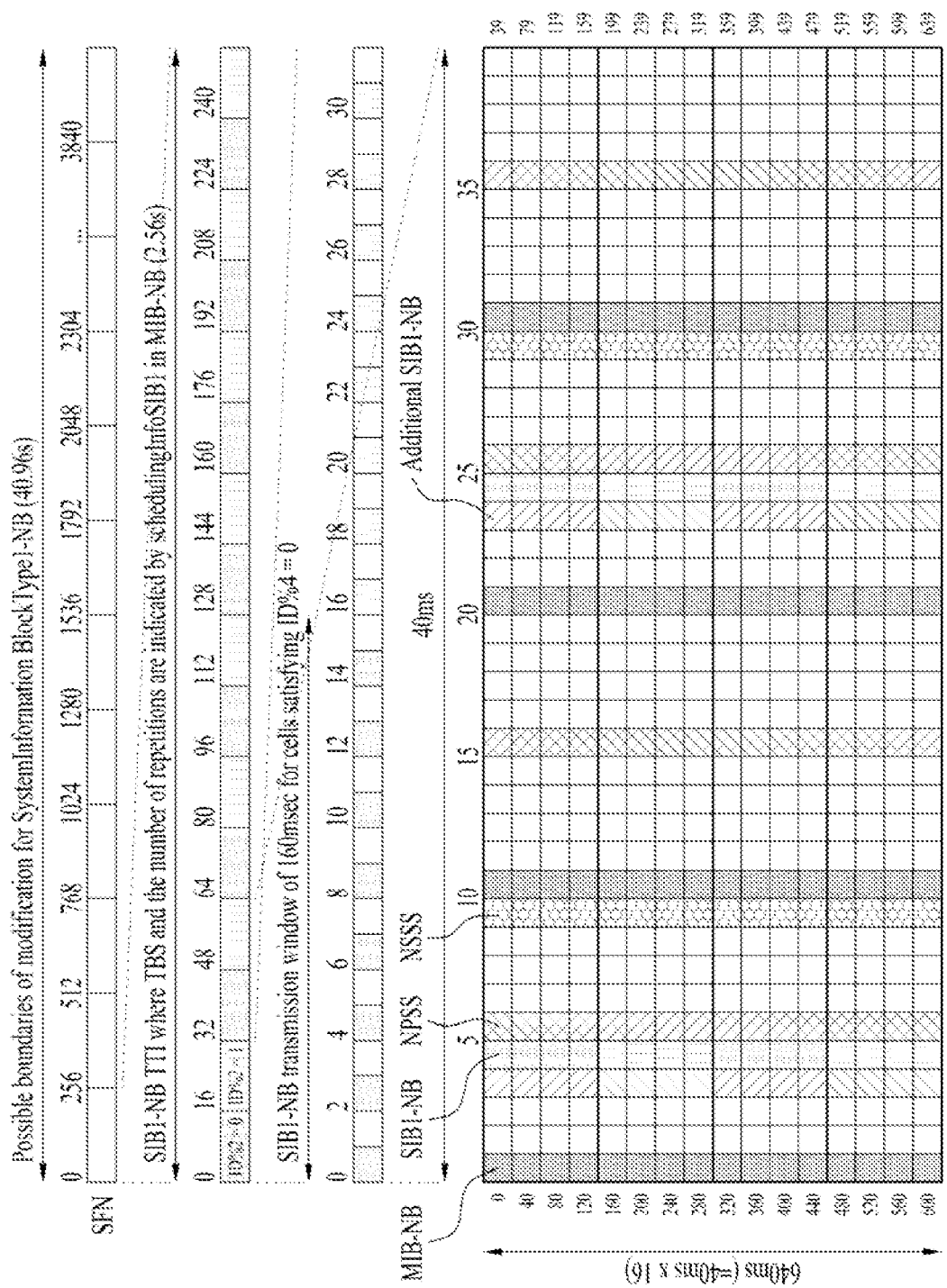
Figure 16C:
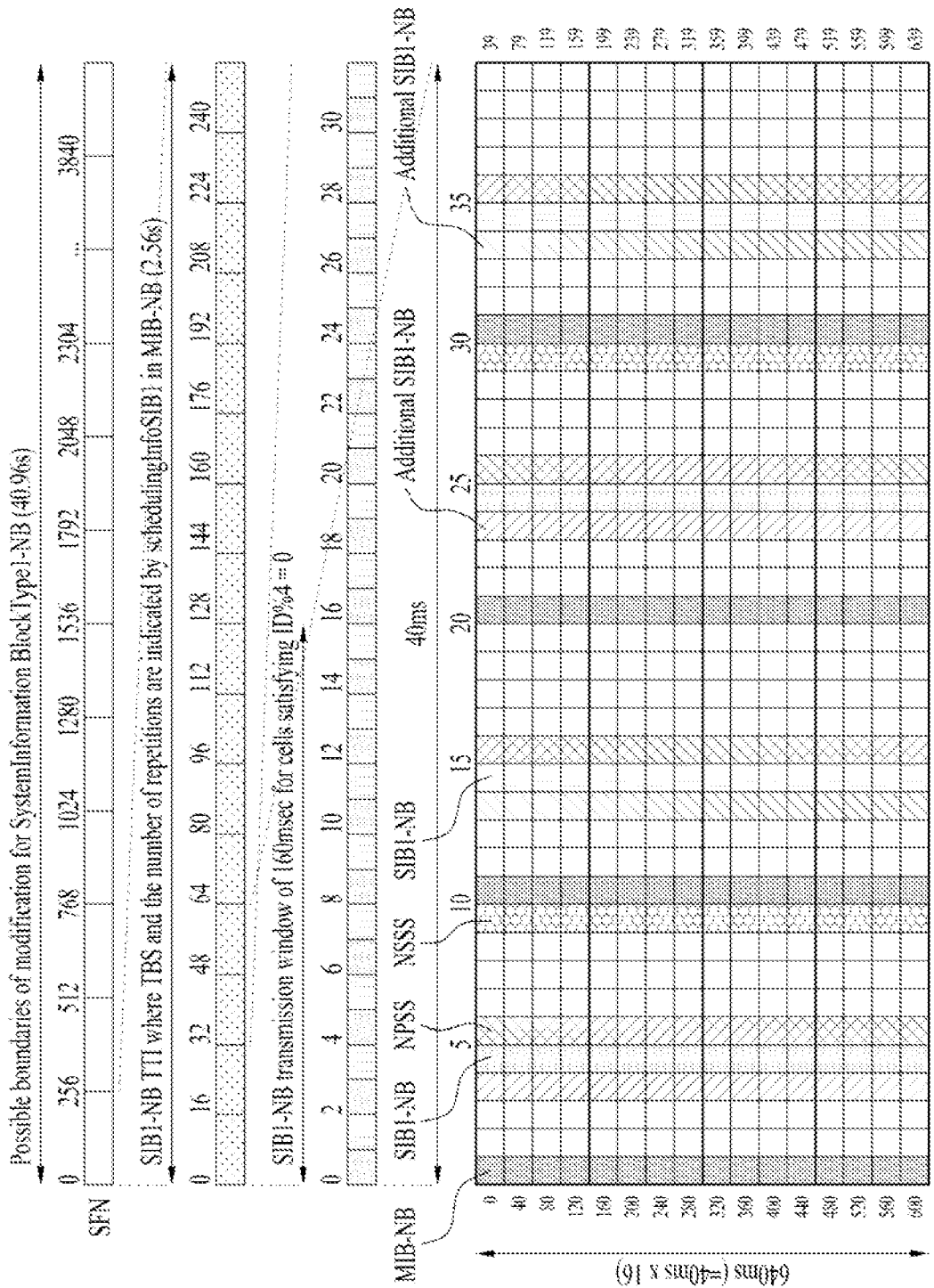

B. FIGS. 16a to 16c are diagrams illustrating the transmission positions of an aSIB1-NB, when the aSIB1-NB is transmitted with the same period and repetition number as those of the legacy SIB1-NB. Transmissions of the aSIB1-NB, which is repeatedly transmitted as many times as the repetition number of the SIB1-NB, are given as illustrated in FIGS. 16a to 16c according to each repetition number. FIGS. 16a to 16c illustrate transmission of the aSIb1-NB with the same period and repetition number as those of the legacy SIB1-NB, when the repetition numbers of the legacy SIB1-NB are 4, 8, and 16.

2) The number of subframes in which the aSIB1-NB is repeatedly transmitted within an SIB1-NB modification period may be a half of the number of subframes in which the legacy SIB1-NB is repeatedly transmitted within the same period, or may be less than the number of subframes in which the legacy SIB1-NB is repeatedly transmitted within the same period (e.g., the SIB1-NB modification period, 40.96 sec). For example, the number of subframes in which the aSIB1-NB is repeatedly transmitted may be, but not limited to, ½ or ¼ of the number of subframes in which the legacy SIB1-NB is repeatedly transmitted within the same period. Further, the number of subframes in which the aSIB1-NB is repeatedly transmitted may be fixed, or determined to be one or more values according to code rates. Herein, a code rate may be determined based on at least one of the number of REs available for transmission of an SIB1-NB in a subframe/slot or the TBS of the SIB1-NB. Further, the number of REs may be determined based on an operation mode and the number of CRS/NRS antenna ports. Further, the number of subframes in which the aSIB1-NB is repeatedly transmitted may be determined based on the result of comparing a code rate with a predetermined value. For example, depending on whether the code rate is less or larger than a specific value, the number of subframes in which the aSIB1-NB is repeatedly transmitted may be equal to or less than the number of subframes in which legacy SIB1-NB is repeatedly transmitted by a predetermined value (e.g., ½ or 4/1).

A. Exceptionally, this may correspond only to a case in which the repetition numbers of the SIB1-NB are 4 and 8. If the repetition number of the SIB1-NB is larger than 16, the case in which the repetition number of the SIB1-NB is less than the largest repetition number may be processed as an exception, like the case in which the repetition numbers of the SIB1-NB are 4 and 8.

B. Methods of skipping a half of aSIB1-NB transmissions in some subframes may be given as follows.

a. Method of skipping aSIB1-NB transmissions in some SIB1-NB TTI (2.56 sec) within a SIB1-NB modification period (40.96 s)

Figure 17A:
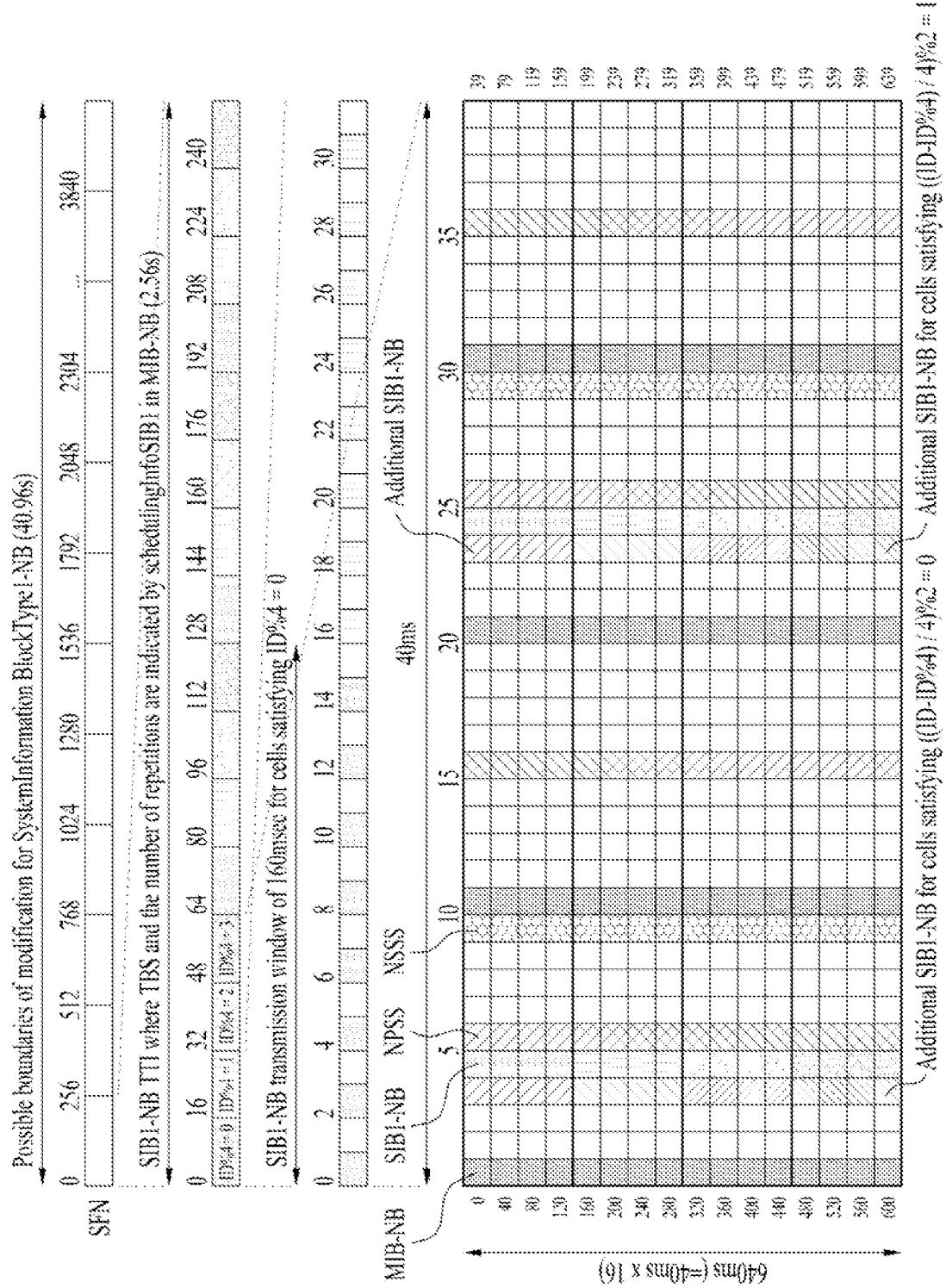
Figure 17B:
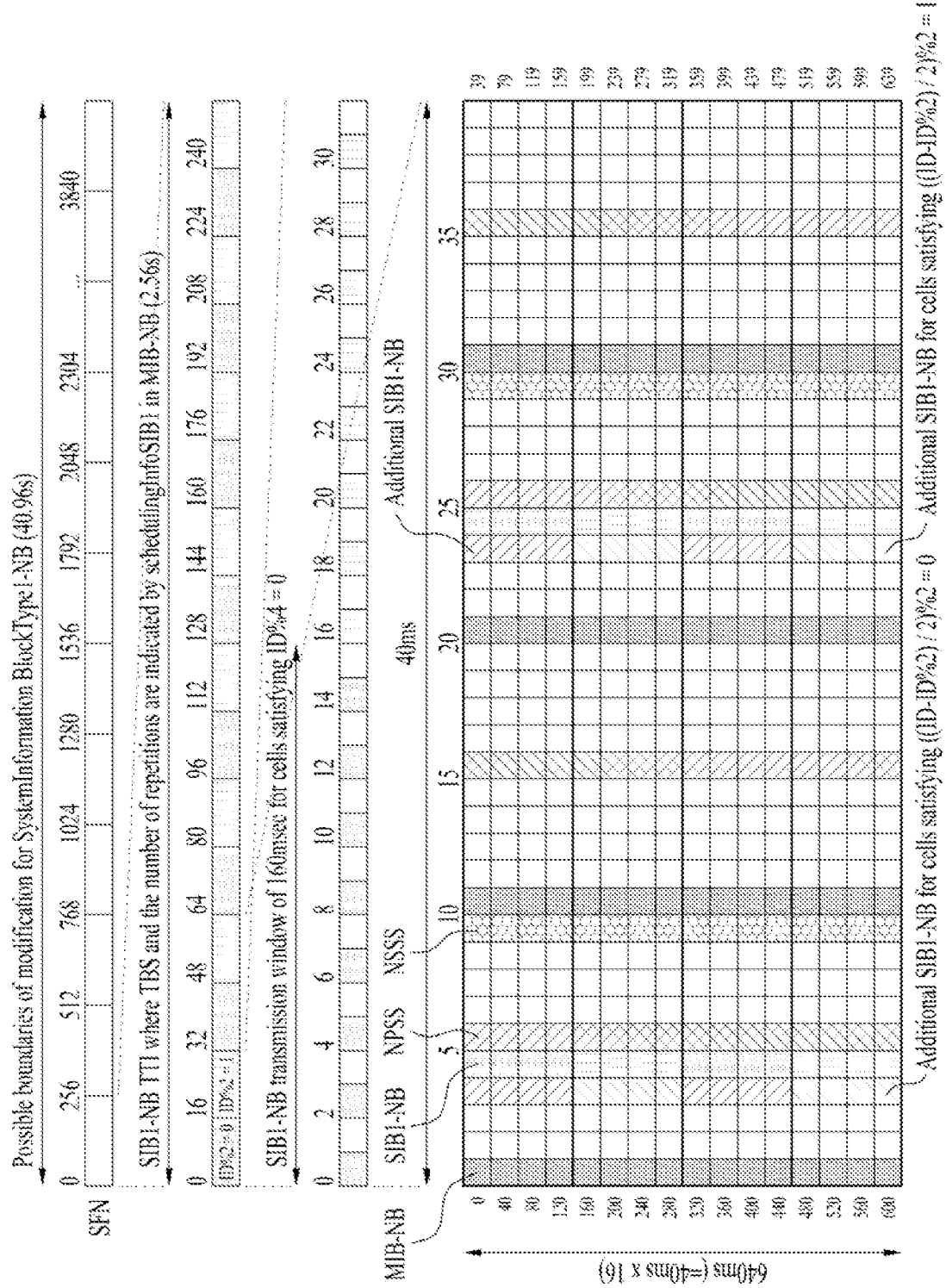
Figure 17C:
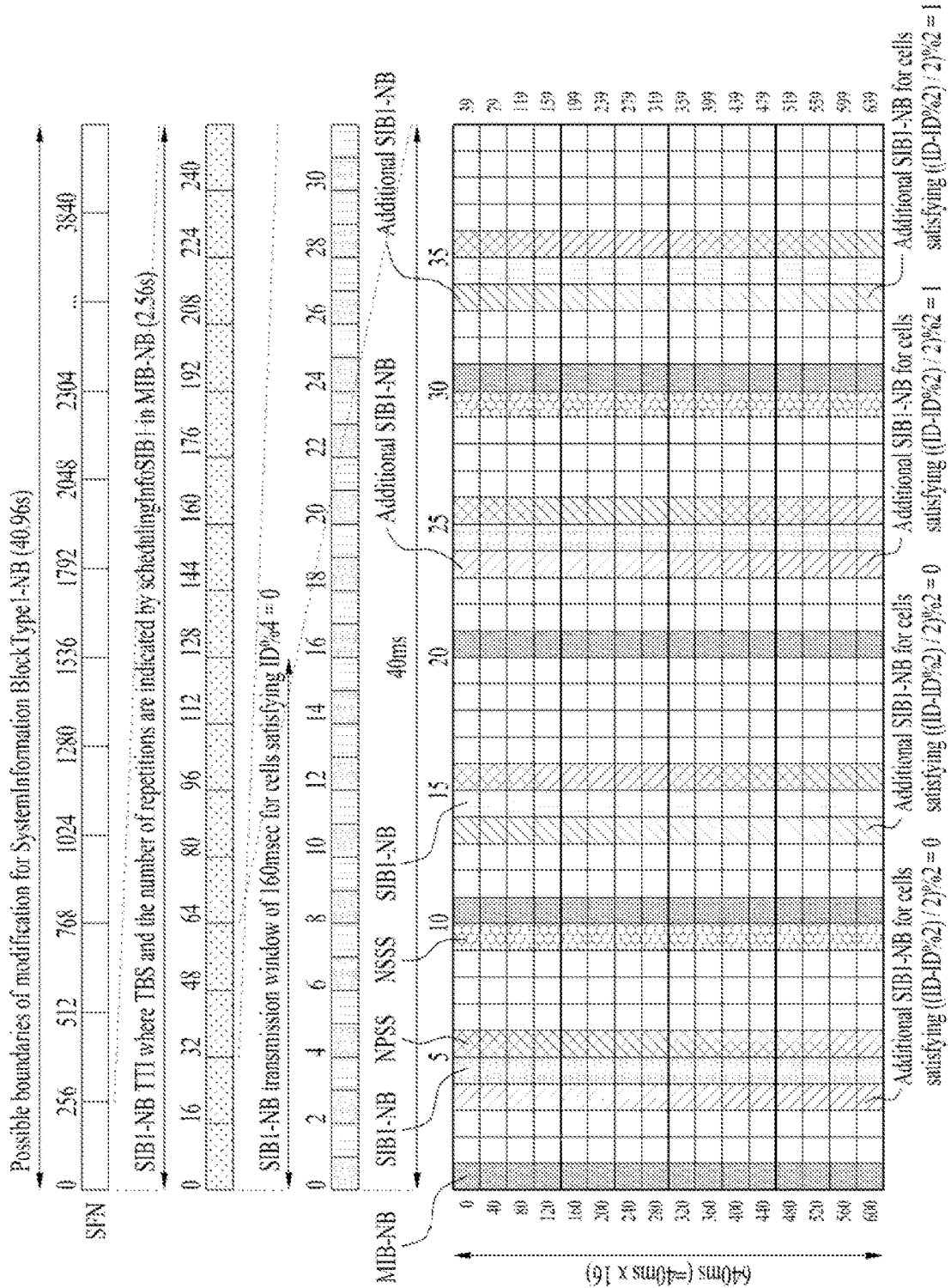

An SIB1-NB TTI in which aSIB1-NB transmissions are skipped may be derived from a cell ID. For example, the SIB1-NB TTI in which aSIB1-NB transmissions are skipped may be determined according to whether "((cell_ID−(cell_ID % NRep))/NRep) %2" is 0 or 1. For example, if ((cell_ID−(cell_ID % NRep))/NRep) %2" is 0, only even-numbered SIB1-NB TTIs may selectively be used for aSIB1-NB transmissions, whereas if ((cell_ID−(cell_ID % NRep))/NRep) %2" is 1, only odd-numbered SIB1-NB TTIs may selectively be used for aSIB1-NB transmissions. Herein, NRep may represent the repetition number of the SIB1-NB derived from schedulingInfoSIB1.

b. Method of skipping aSIB1-NB transmissions in some SIB1-NB transmission window 160 msec of a corresponding cell within an SIB1-NB TTI An SIB1-NB transmission window in which aSIB1-NB transmission are skipped may be derived from a cell ID. For example, the SIB1-NB transmission window in which aSIB1-NB transmission are skipped may be determined according to whether "((cell_ID−(cell_ID % NRep))/NRep) %2" is 0 or 1. For example, if ((cell_ID−(cell_ID % NRep))/NRep) %2" is 0, only even-numbered SIB1-NB transmission windows may selectively be used for aSIB1-NB transmissions, whereas if ((cell_ID−(cell_ID % NRep))/NRep) %2" is 1, only odd-numbered SIB1-NB transmission windows may selectively be used for aSIB1-NB transmissions, among MIB1-NB transmission windows used for SIB1-NB transmissions in a corresponding cell. Herein, NRep may represent the repetition number of an SIB1-NB, derived from schedulingInfoSIB1.

c. Method of skipping aSIB1-NB transmissions in some radio frame of a corresponding cell within an SIB1-NB transmission window FIGS. 17a to 17c are diagrams illustrating the transmission positions of an aSIB1-5 NB, when the repetition number of an aSIB1-NB is a half of the repetition number of the legacy SIB1-NB. For example, FIGS. 17a to 17c illustrate the transmission positions of an aSIB1-NB, when the repetition numbers of the legacy SIB1-NB are 4, 8, and 16, and the repetition numbers of the aSIB1-NB are 2, 4, and 8.

Figure 18A:
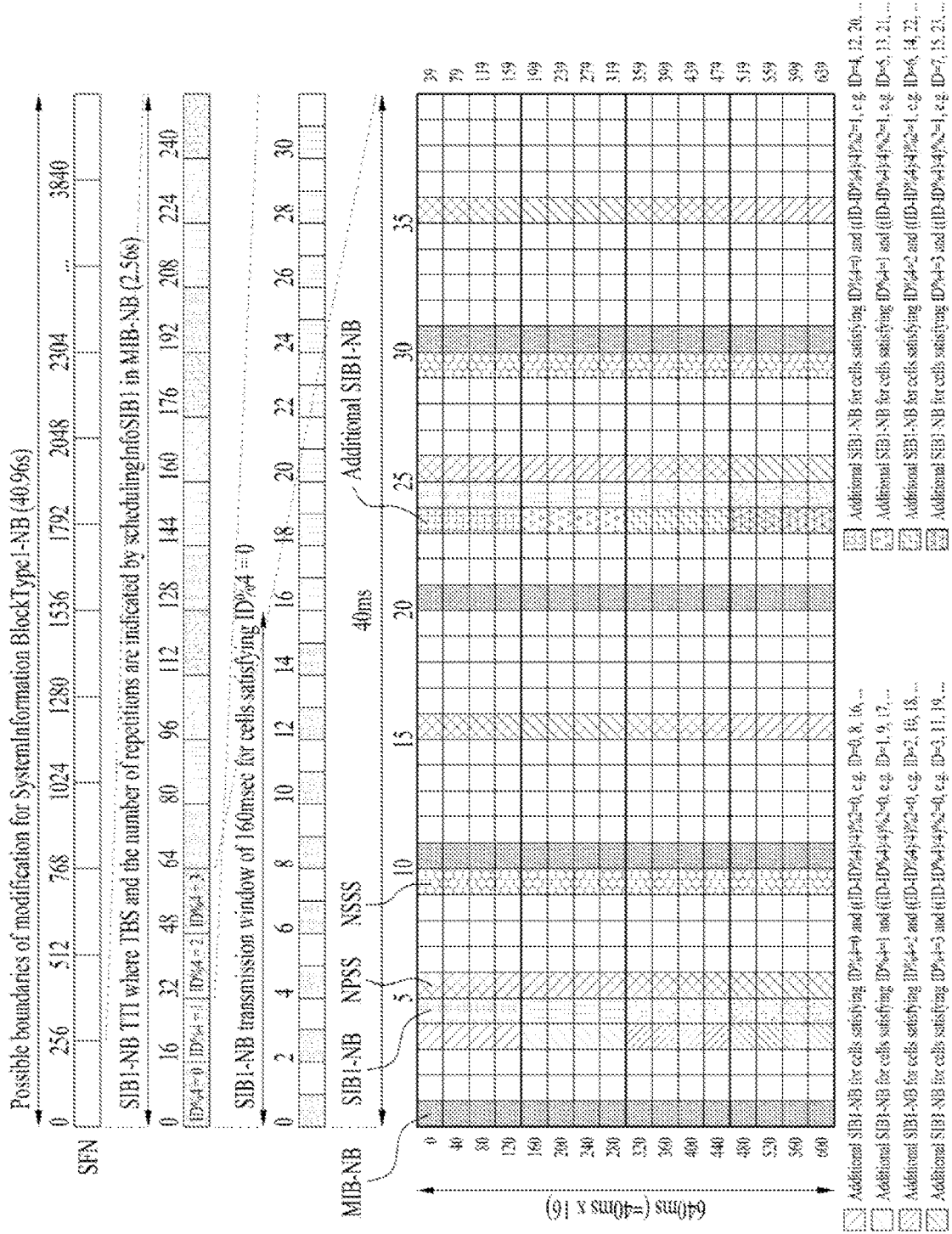
Figure 18B:
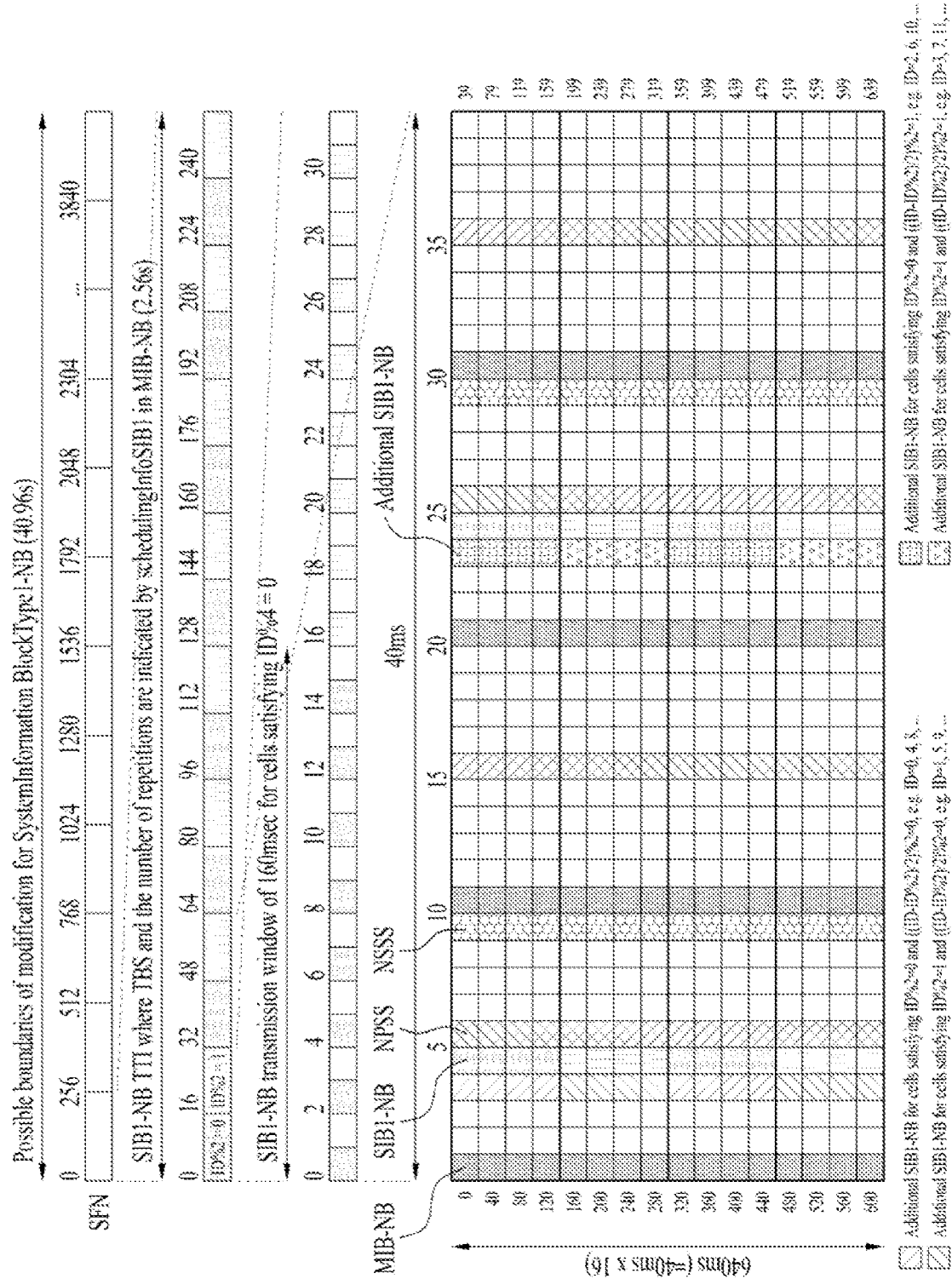
Figure 18C:
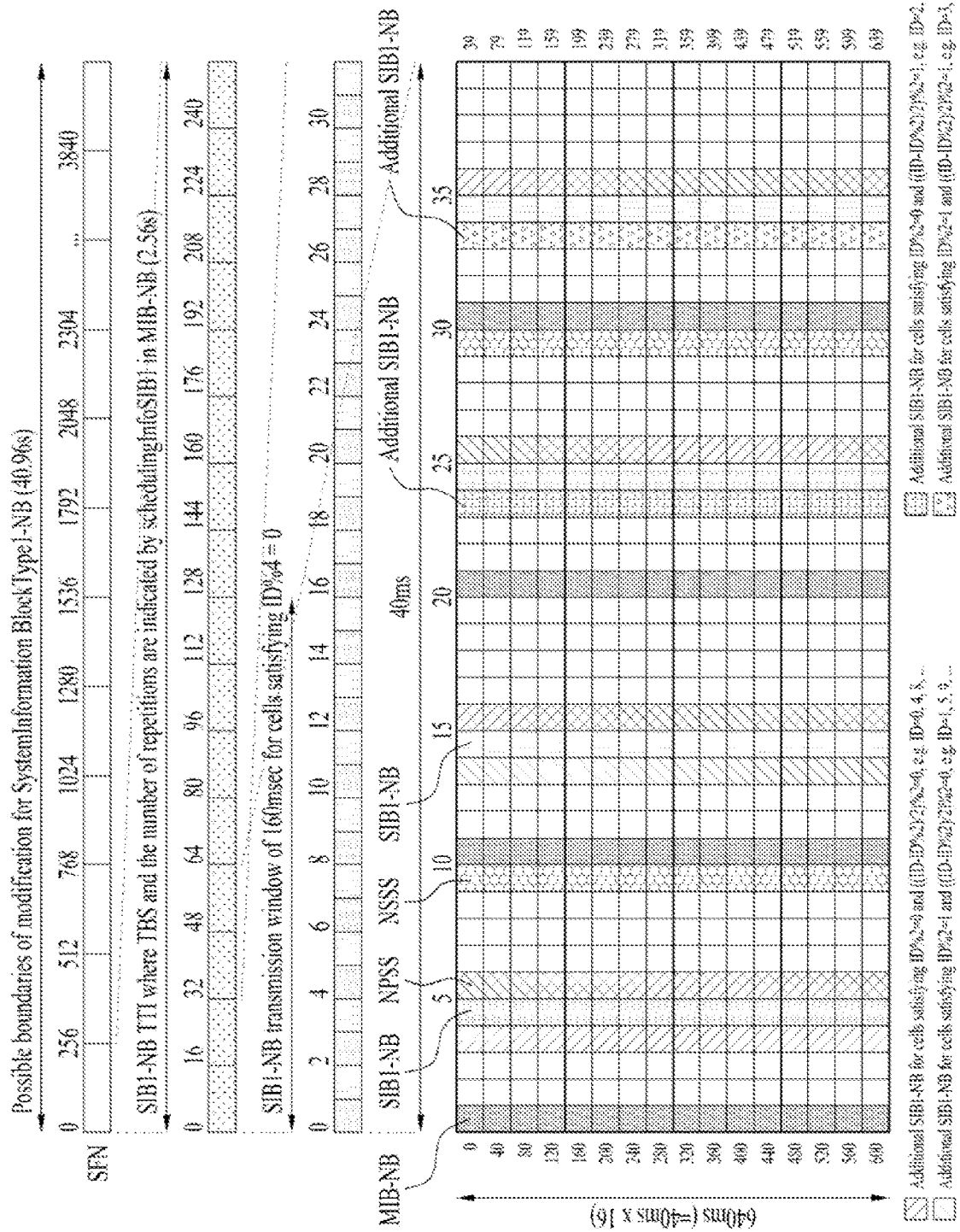

Further, FIGS. 18a to 18c are diagrams illustrating the transmission positions of an aSIB1-NB, when the repetition number of the aSIB1-NB is a half of the repetition number of the legacy SIB1-NB.

A radio frame in which aSIB1-NB transmissions are skipped may be derived from a cell ID. For example, the radio frame in which aSIB1-NB transmissions are skipped may be derived according to whether "((cell_ID−(cell_ID % NRep))/NRep) %2" is 0 or 1. The radio frame in which aSIB1-NB transmissions are skipped may be a radio frame used for SIB1-NB transmission. For example, if ((cell_ID−(cell_ID % NRep))/NRep) %2" is 0, only subframe #3 of an even-numbered radio frame among radio frames used for SIB1-NB transmission in a corresponding cell may selectively be used for aSIB1-NB transmission, whereas if ((cell_ID−(cell_ID % NRep))/NRep) %2" is 1, only subframe #3 of an odd-numbered radio frame among the radio frames used for SIB1-NB transmission in the corresponding cell may selectively be used for aSIB1-NB transmission. Herein, NRep may represent the repetition number of an SIB1-NB, derived from schedulingInfoSIB1.

Figure 19A:
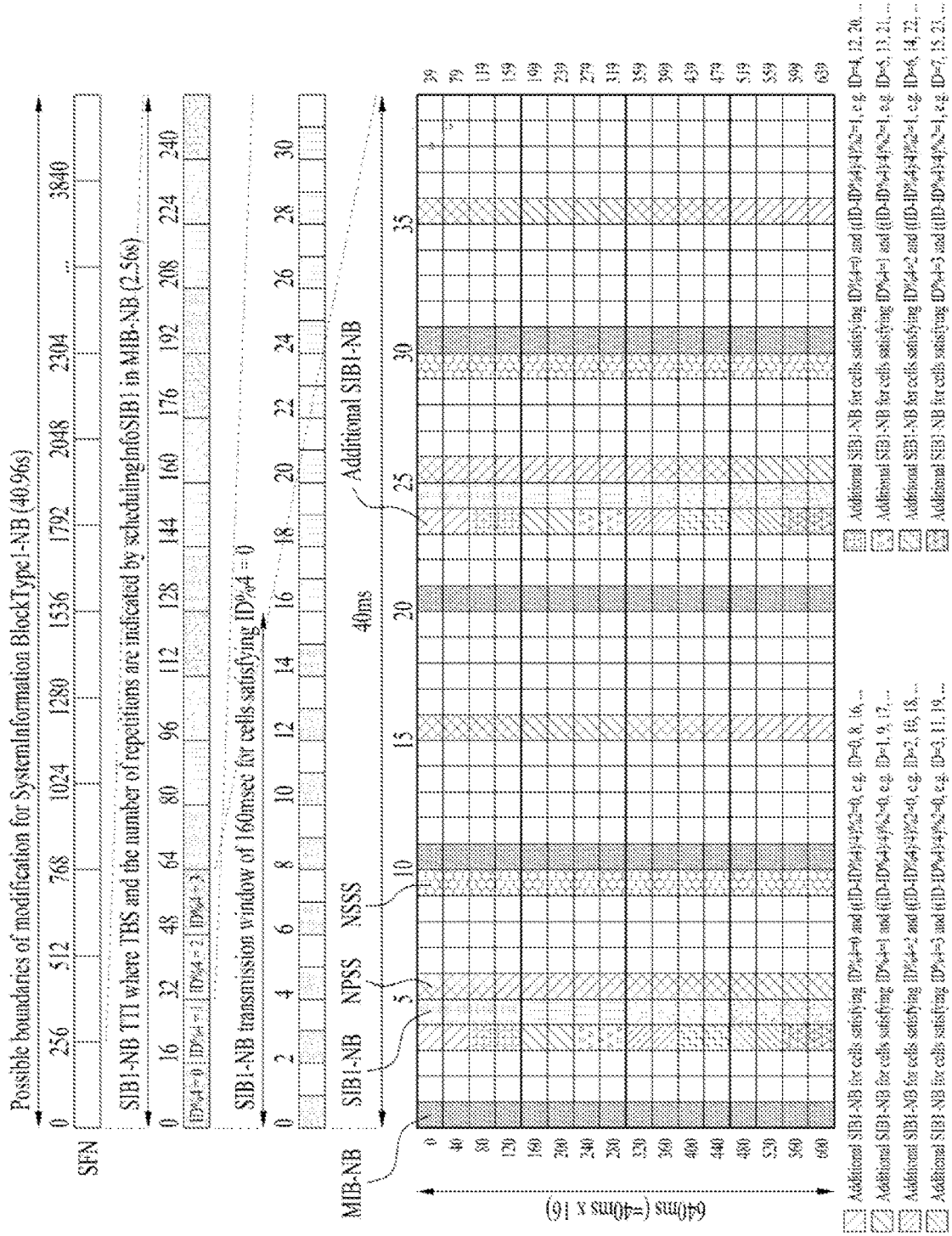
Figure 19B:
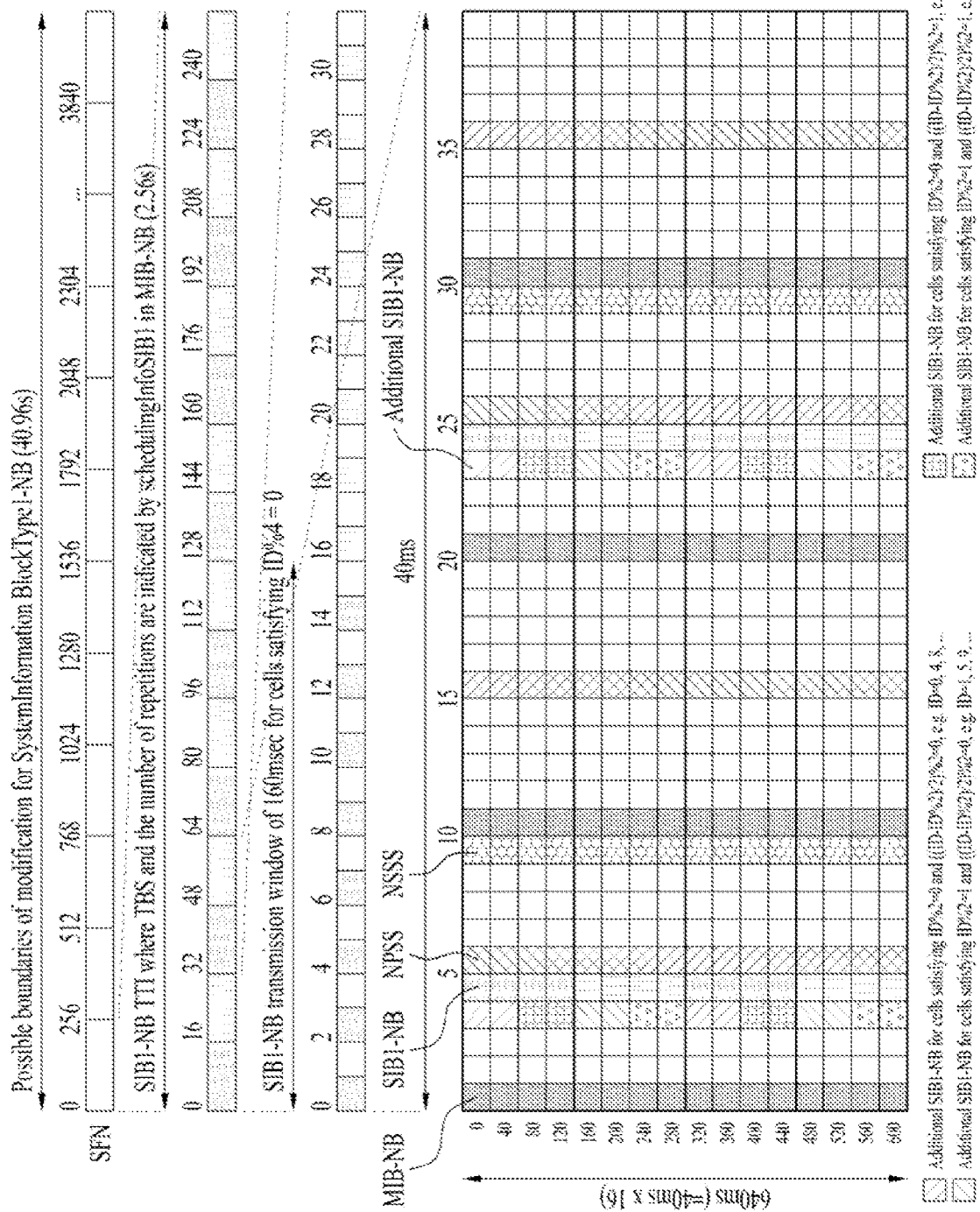
Figure 19C:
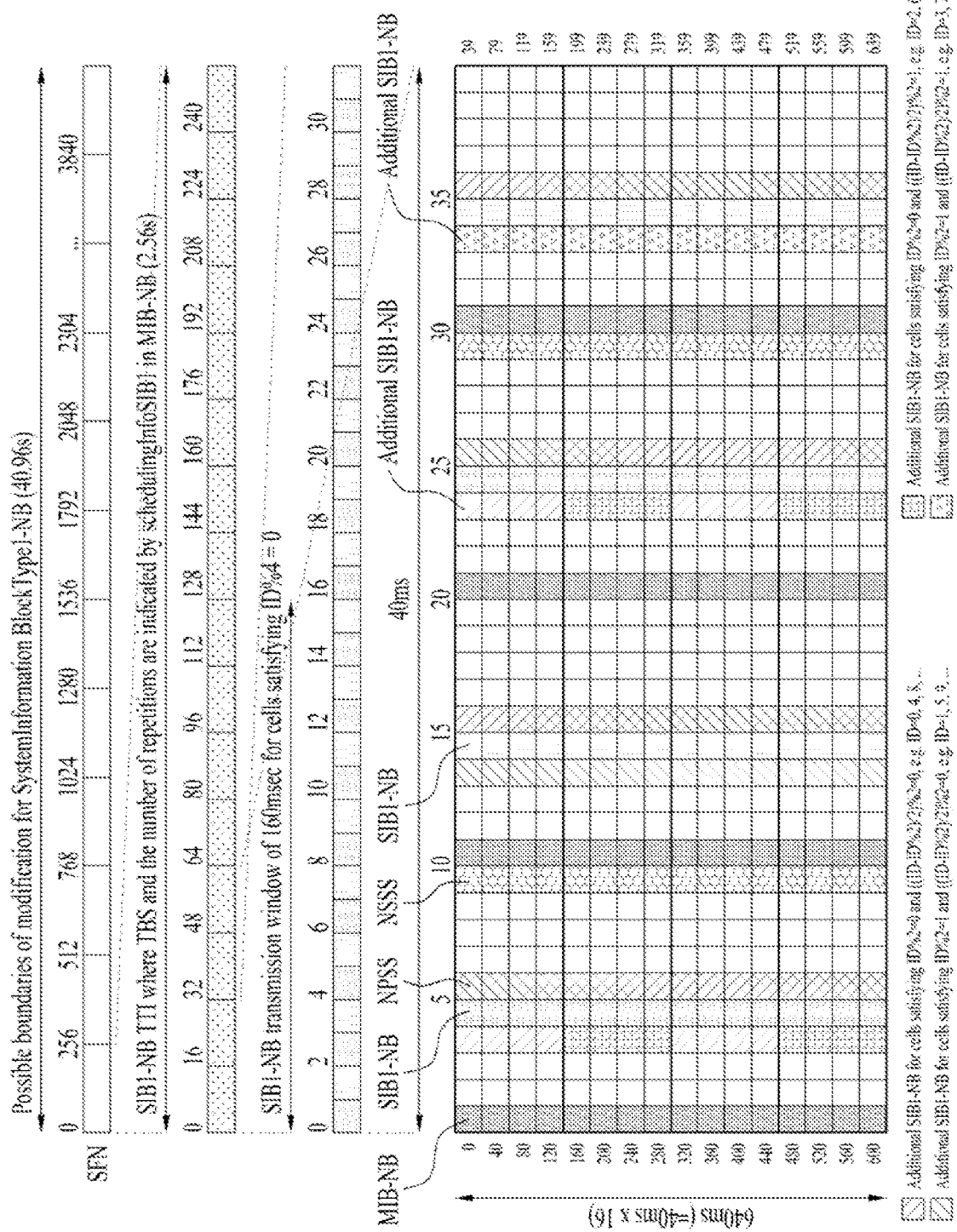

The method (e.g., "allocation method A") illustrated in FIGS. 18a to 18c may be modified to a method (e.g., "allocation method B") illustrated in FIGS. 19a to 19c. In allocation method B, an aSIB1-NB is transmitted every 20 msec in four subframes #3 before or after an SINB1-N transmission window according to a cell ID in a radio frame within a 160-msec SIB1-NB transmission window in which the legacy SIB1-NB is transmitted. For example, the four subframes #3 before the SINB1-N transmission window and the four subframes #3 after the SINB1-N transmission window may be distinguished based on "((cell_ID−(cell_ID % NRep))/NRep) %2".

The method of selecting the position of a subframe for aSIB1-NB transmission by using a cell ID in "allocation method A" and "allocation method B" may be applied to a method of selecting or omitting an SIB1-NB-TTI and an SIB1-NB transmission window in the afore described "method of skipping aSIB1-NB transmissions in some SIB1-NB TTI (2.56 sec) of a corresponding cell within an SIB1-NB modification period (40.96 sec)" and "method of skipping aSIB1-NB transmissions in some SIB1-NB transmission window of a corresponding cell within an SIB1-NB TTI".

The afore-described method 1) or method 2) may be applied to the repetition frequency of an aSIB1-NB according to the repetition number of the legacy SIB1-NB. Or, a value corresponding to the repetition number or repetition frequency of the aSIB1-NB may be indicated directly by an MIB-NB.

4.13. Proposal 13: "Codeword and Resource Mapping of aSIB1-NB"

The present section proposes a codeword and resource mapping of an aSIB1-NB with continuation to "codeword and resource mapping of additional NPDSCH including BCCH" in Proposal 8. The codeword and resource mapping of the aSIB1-NB may be defined separately in "Case-1" in which the repetition number of an aSIB1-NB transmitted in subframe #3 is equal to that of the legacy SIB1-NB (e.g., the number of subframes used for repeated transmissions of the aSIB1-NB within a specific period is equal to the number of subframes used for repeated transmissions of the legacy SIB1-NB) and "Case-2" in which the repetition number of an aSIB1-NB transmitted in subframe #3 is a half of that of the legacy SIB1-NB.

Figure 20:
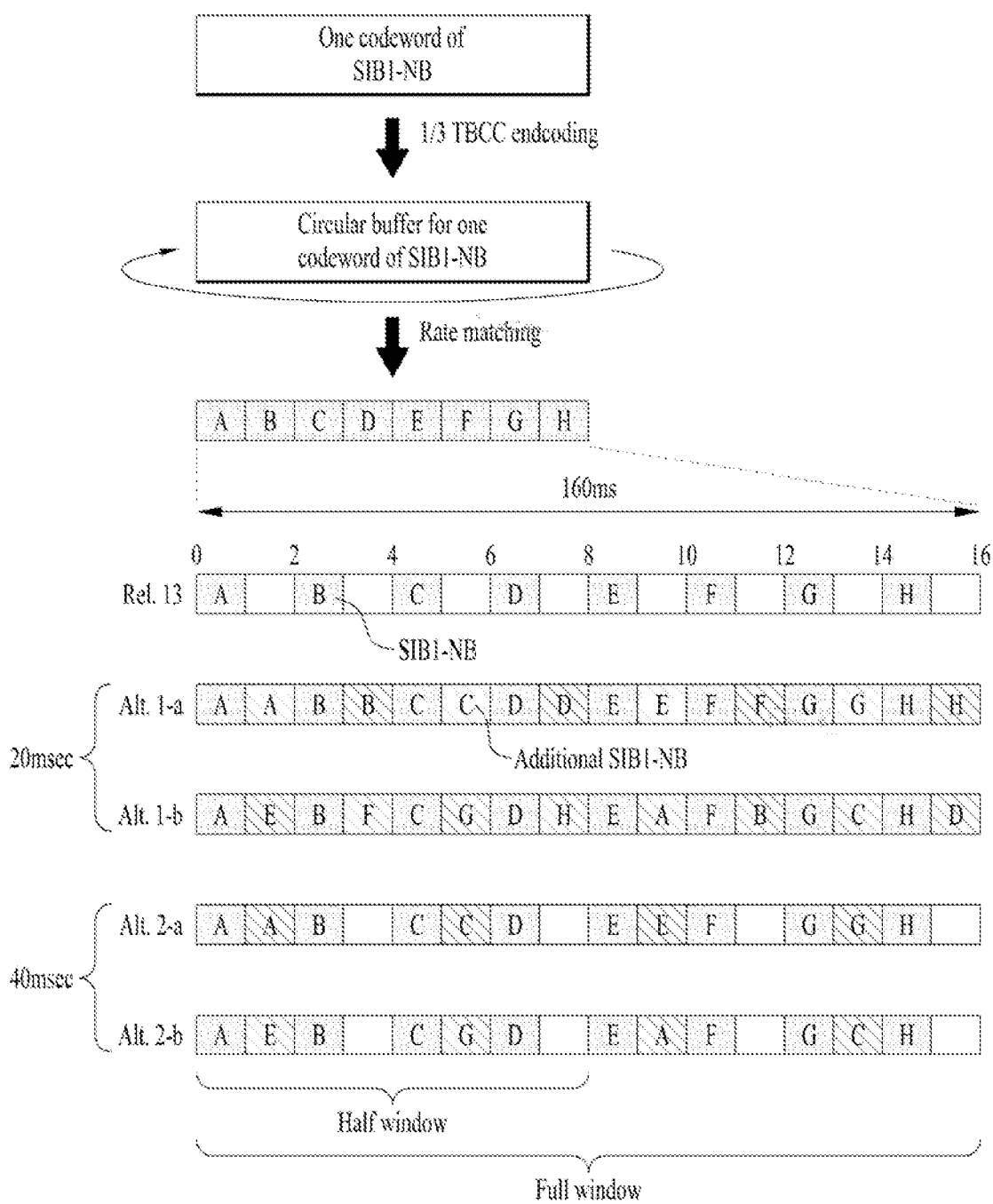
FIG. 20 is a diagram illustrating a codeword and a codeword and resource mapping method for additional SIB1-NB according to an embodiment of the present disclosure.

FIG. 20 is a diagram illustrating a codeword and resource mapping of an aSIB1-NB according to an embodiment. Referring to FIG. 20, A to H sequentially represent soft-buffer outputs of an SIB1-NB transmitted in 8 subframes within an SIB1-NB transmission window.

1) "Case-1"

A. An aSIB1-NB may be transmitted sequentially in the order of {E, F, G, H, A, B, C, D} within an SIB1-NB transmission window. For example, to enable good-coverage NB-IoT UEs to fast achieve a channel coding gain, the aSIB1-NB may be transmitted in the circularly shifted form such that there is an offset of 8 subframes or 8 radio frames between an aSIB1-NB transmission and an SIB1-NB transmission. Further, the aSIB1-NB may be transmitted sequentially in an order other than {E, F, G, H, A, B, C, D} or {A, B, C, D, E, F, G, H}. This transmission order is intended to enable the NB-IoT UEs to fast achieve a channel coding gain. The above-described transmission order of an aSIB1-NB may be determined based on at least one parameter of data REs, a TBS, a repetition number, or a code rate in a subframe used to transmit the aSIB1-NB or the SIB1-NB. As such, if the SIB1-NB and the aSIB1-NB transmitted successively in subframes #3 and #4 are not identical, scrambling used for the transmissions of the SIB1-NB and the aSIB1-NB in subframes #3 and #4 may be determined according to the same mathematic formula and parameters. For example, even though the scrambling mathematical formula $C_{int}=n_{RNTI}\cdot2^{15}+(N_{ID}^{Ncell}+1)((n_f \bmod 61)+1)$ used for transmission of a current SIB1-NB is applied to an aSIB1-NB, inter-cell interference may not be severe. Obviously, to make sure suppression of inter-cell interference, different scrambling may be applied to transmissions of the SIB1-NB and the aSIB1-NB in subframes #3 and #4 in spite of the same radio frame number, $n_{RNTI}$, $N_{ID}^{NCELL}$ and $n_f$. For example, subframe #3 may be defined based on another $c_{init}$ having a specific offset as compared to subframe #4. For example, $n_f$ of subframe #3 may be, but not limited to, smaller than $n_f$ of subframe #4 by 1.

B. In contrast to method A, an aSIB1-NB transmitted in subframe #3 of a radio frame may be identical to an SIB1-NB transmitted in subframe #4 of the same radio frame. To effectively achieve a combining gain or an average gain of the same signals successively transmitted in subframes #3 and #4 at an I/Q level or symbol level, the aSIB1-NB may be transmitted in the order of {A, B, C, D, E, F, G, H}. To mitigate inter-cell interference, different scrambling from scrambling for transmission of the SIB1-NB may be applied to the aSIB1-NB. Different scrambling may be applied to the aSIB1-NB in the afore-described method or by scrambling the SIB1-NB transmitted in subframe #4 through I/Q-level phase rotation per RE in subframe #3. This may be identical or similar to a method of applying I/Q-level phase rotation to an NPBCH (the first mathematical formula in Section 10.2.4.4 of TS 36.311).

Figure 14:
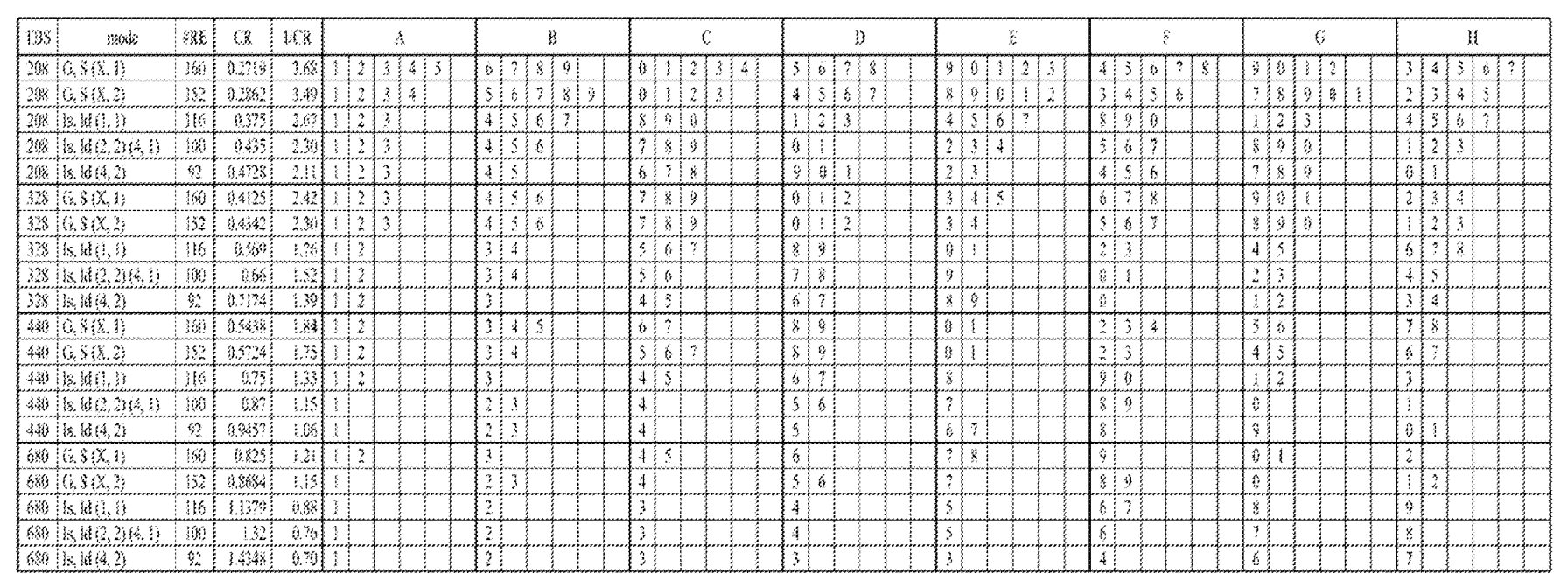

C. Similarly to method A, an aSIB1-NB may be transmitted by increasing a code rate. For example, as illustrated in FIG. 14, if all of circular-buffer data is not transmitted in {A, B, C, D, E, F, G, H} carrying an SIB1-NB according to an operation mode, the number of CRS/NRS antenna ports, and the TBS of the SIB1-NB in FIG. 20, this method may be implemented in a similar manner to an IR-retransmission method (the same thing may apply to the case where all of the circular-buffer data is transmitted in {A, B, C, D, E, F, G, H} carrying the SIB1-NB). That is, when the data transmitted in {A, B, C, D, E, F, G, H} is data obtained from consecutive addresses of the circular buffer, an aSIB1-NB may be filled with values transmitted in succession to the last address of H. For example, if the last address of H is almost equal to the last address of the circular buffer in FIG. 20 (e.g., the difference between the last address of H and the last address of the circular buffer in FIG. 20 is less than a specific value), an offset as large as the specific value may be added to the circular buffer addresses from which data is read out in order to avoid transmission of the same data in subframes #3 and #4. For example, an offset as large as a half of the size of the circular buffer or an offset corresponding to E may be allocated, which should not be construed as limiting the present disclosure.

D. As in method B, if an aSIB1-NB is filled in the order of {A, B, C, D, E, F, G, H} (e.g., SIB1-NB data is identical in subframes #3 and #4), an aSIB1-NB transmitted in subframe #3 may be different from an SIB1-NB transmitted in subframe #4 in terms of RE mapping order. Therefore, frequency diversity may further be increased between an aSIB1-NB and an SIB1-NB transmitted repeatedly in an adjacent subframe. Different RE mapping orders may be set for the aSIB1-NB and the SIB1-NB by cyclically shifting REs by X REs (e.g., 6 REs), or different RE mapping orders may be set in each symbol or each subframe according to an order derived from a specific PN sequence, which should not be construed as limiting the present disclosure.

"Case-2"

A. To enable good-coverage NB-IoT UEs to fast achieve a channel coding gain, an aSIB1-NB may be transmitted sequentially in the order of {E, G, A, C} or {F, H, B, D} within an SIB1-NB transmission window. Further, to enable NB-IoT UEs to fast achieve a channel coding gain, the aSIB1-NB may be transmitted sequentially in an order other than any of {E, G, A, C}, {F, H, B, D}, {A, C, E, G}, and {B, D, F, H}. The aSIB1-NB transmission order may be determined based on at least one parameter of the number of data REs, a TBS, a repetition number, or a code rate, used for SIB1-NB or aSIB1-NB transmission in a subframe, or a radio frame number in which aSIB1-NB transmissions are skipped.

If an aSIB1-NB and an SIB1-NB transmitted successively in subframes #3 and #4 are not identical, scrambling may be applied to transmissions of the aSIB1-NB and the SIB1-NB in subframes #3 and #4 according to the same mathematical formula and parameters. For example, even though the scrambling mathematical formula $C_{int}+n_{RNTI} \cdot 2^{15}+(N_{ID}^{Ncell}+1)((n_f \bmod 61)+1)$ used for transmission of a current SIB1-NB is applied to an aSIB1-NB, inter-cell interference may not be severe. Obviously, to make sure suppression of inter-cell interference, different scrambling may be applied to transmissions of the SIB1-NB and the aSIB1NB in subframes 3 and 4 in spite of the same radio frame number, $n_{RNTI}$, $N_{ID}^{Ncell}$, and $n_f$. For example, subframe #3 may be defined based on another $c_{init}$ having a specific offset as compared to subframe #4. For example, $n_f$ of subframe #3 may be, but not limited to, smaller than $n_f$ of subframe #4 by 1.

B. In contrast to method A, an aSIB1-NB transmitted in subframe #3 of a radio frame may be identical to an SIB1-NB transmitted in subframe #4 of the same radio frame. To effectively achieve a combining gain or an average gain of the same signals successively transmitted in subframes #3 and #4 at an I/Q level or symbol level, the aSIB1-NB may be transmitted in the order of {A, C, E, G} or {B, D, F, H}. To mitigate inter-cell interference, different scrambling from that for transmission of the SIB1-NB may be applied to the aSIB1-NB. Different scrambling may be applied to the aSIB1-NB in the afore-described method, or by scrambling the SIB1-NB transmitted in subframe #4 through I/Q-level phase rotation per RE in subframe #3. This may be identical or similar to the method of applying I/Q-level phase rotation to an NPBCH (the first mathematical formula in Section 10.2.4.4 of TS 36.311).

C. Similarly to method A, an aSIB1-NB may be transmitted by increasing a code rate. For example, as illustrated in FIG. 14, if all of circular-buffer data is not transmitted in {A, B, C, D, E, F, G, H} carrying an SIB1-NB according to an operation mode, the number of CRS/NRS antenna ports, and the TBS of the SIB1-NB in FIG. 20, this method may be implemented in a similar manner to an IR-retransmission method (the same thing may apply to the case where all of the circular-buffer data is transmitted in {A, B, C, D, E, F, G, H} carrying the SIB1-NB). That is, when the data transmitted in {A, B, C, D, E, F, G, H} is data obtained from consecutive addresses of the circular buffer, an aSIB1-NB may be filled with values transmitted in succession to the last address of H. For example, if the last address of H is almost equal to the last address of the circular buffer in FIG. 20 (e.g., the difference between the last address of H and the last address of the circular buffer in FIG. 20 is less than a specific value), an offset as large as the specific value may be added to the circular buffer addresses from which data is read out in order to avoid transmission of the same data in subframes #3 and #4. For example, an offset as large as a half of the size of the circular buffer or an offset corresponding to E may be allocated, which should not be construed as limiting the present disclosure.

D. As in method B, if an aSIB1-NB is filled in the order of {A, C, E, G} or {B, D, F, H} (e.g., SIB1-NB data is identical in subframes #3 and #4), an aSIB1-NB transmitted in subframe #3 may be different from an SIB1-NB transmitted in subframe #4 in terms of RE mapping order. Therefore, frequency diversity may further be increased between an aSIB1-NB and an SIB1-NB transmitted repeatedly in an adjacent subframe. Different RE mapping orders may be set for the aSIB1-NB and the SIB1-NB by cyclically shifting REs by X REs (e.g., 6 REs), or different RE mapping orders may be set in each symbol or each subframe according to an order derived from a specific PN sequence, which should not be construed as limiting the present disclosure.

All the methods related to aSIB1-NB transmission may be applied in a similar manner to the case where an SIB1-NB is transmitted on a non-anchor carrier in the NB-IoT TDD system and the case where SIB1-NB is transmitted in more subframes on a non-anchor carrier than on an anchor carrier. Further, even when an SIB1-NB is transmitted in both of the anchor carrier and the non-anchor carrier, all the methods related to aSIB1-NB transmission may be applied in a similar manner to an SIB1-NB transmitted on the anchor carrier and an SIB1-NB transmitted on the non-anchor carrier. For example, if the number of subframes carrying an SIB1-NB in the TDD system is larger than the number of subframes carrying the legacy SIB1-NB, the proposals of the present patent application may be applied by interpreting a specific subframe as carrying the legacy SIB1-NB and the other subframes as carrying the proposed aSIB1-NB.

5. Device Configuration

Figure 21:
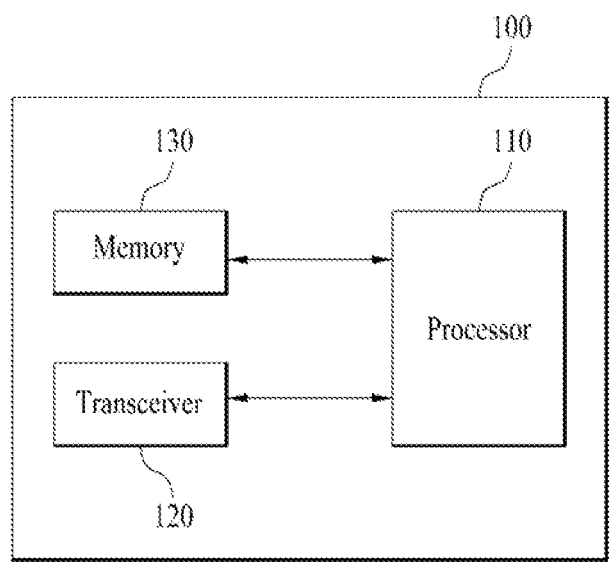
FIG. 21 is a diagram illustrating a configuration of a user equipment according to an embodiment of the present disclosure.

FIG. 21 illustrates a configuration of a user equipment in accordance with an embodiment of the present disclosure.

The user equipment (100) illustrated in FIG. 21 may perform operations of receiving a signal by a user equipment as illustrated in FIG. 1 to FIG. 20.

The user equipment (100) in accordance with an embodiment of the present disclosure may operate as a transmission end in uplink and may operate as a reception end in downlink.

The user equipment (100) in accordance with an embodiment of the present disclosure may comprise a processor (110) and a receiver. However, the user equipment (100) may be implemented with more elements than illustrated, or may be implemented with one element by combining two or more elements. For example, the user equipment (100) may comprise processor (110), a transceiver (120) including a receiver and a transmitter, and a memory (130), and may further include an antenna. A combination of the transmitter and a receiver may be implemented as one transceiver, or the transmitter and the receiver may be implemented separately. Hereinafter, each element is described.

The processor (110) controls overall operations of the user equipment (100).

The processor (110) in accordance with an embodiment of the present disclosure may control the receiver to receive a MIB-NB (Master Information Block-Narrow Band) and a SIB1-NB (System Information Block1-Narrow Band) from the base station, obtain, from the MIB-NB or the SIB1-NB, information indicating whether an additional SIB1-NB is transmitted, and determine, based on the obtained information, a subframe indicated as an invalid downlink subframe by the base station to be a valid subframe or an invalid subframe.

The processor (110) in accordance with an embodiment of the present disclosure may, when the subframe indicated as the invalid downlink subframe is determined to be the valid subframe, receive at least one of a NRS, a NPDCCH, and a NPDSCH in the subframe indicated as the invalid downlink subframe.

Further, the processor (110) in accordance with an embodiment of the present disclosure may control the receiver (110) to, when the subframe indicated as the invalid downlink subframe is determined to be the invalid subframe, receive the additional SIB1-NB in the subframe indicated as the invalid downlink subframe.

In this case, in accordance with an embodiment of the present disclosure, the additional SIB1-NB may be transmitted in subframe #3 adjacent to a subframe transmitting the SIB1-NB within a radio frame transmitting the SIB1-NB. Further, the additional SIB1-NB may be transmitted in a subframe different from the subframe transmitting the SIB1-NB on an anchor carrier, to which the present disclosure is not limited.

In accordance with an embodiment of the present disclosure, whether the additional SIB1-NB is transmitted may be determined based on at least one of a code rate of the SIB1-NB, a transport block size (TBS) of the SIB1-NB, a repeated transmission number of the SIB1-NB, an operation mode of NB-IoT, a number of NRS antenna ports, or a number of CRS antenna ports. Further, the information indicating whether the additional SIB1-NB is transmitted may be indicated by an unused bit of the MIB-NB, and a repeated transmission number of the additional SIB1-NB may be determined based on a repeated transmission number of the SIB1-NB.

Moreover, the processor (110) in accordance with an embodiment of the present disclosure may obtain position information about the non-anchor carrier transmitting the SIB1-NB from the MIB-NB, and control the receiver to receive the SIB1-NB based on the obtained position information.

The transceiver (120) in accordance with an embodiment of the present disclosure may control transmissions and receptions of information, data, and/or messages.

The memory (130) in accordance with an embodiment of the present disclosure may store programs for processing and controlling by the processor (110), and data processed by the processor (110). The memory (130) may be positioned inside or outside of the processor (110), and communicate data with the processor (110) by already known various means.

Figure 22:
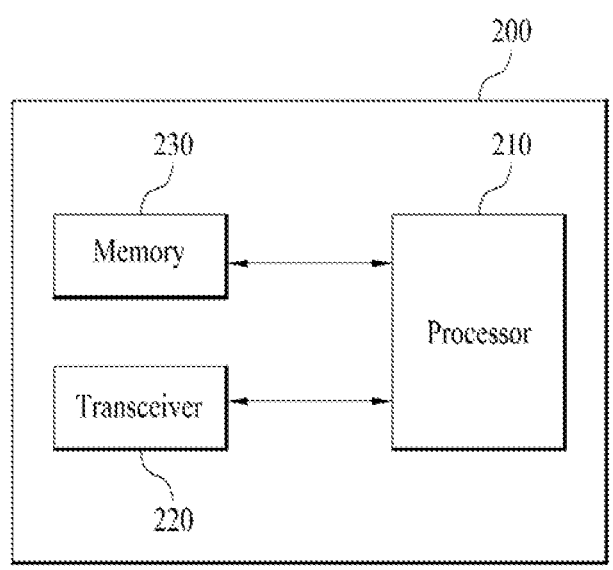
FIG. 22 is a diagram illustrating a configuration of a base station according to an embodiment of the present disclosure.

FIG. 22 illustrates a configuration of a base station in accordance with an embodiment of the present disclosure.

The base station (200) illustrated in FIG. 22 may perform operations of transmitting a signal by the base station as illustrated in FIG. 1 to FIG. 20.

The base station (200) in accordance with an embodiment of the present disclosure may operate as a reception end in uplink and may operate as a transmission end in downlink.

The base station (200) in accordance with an embodiment of the present disclosure may comprise a processor (210) and a transmitter. However, the base station (200) may be implemented with more elements than illustrated, or may be implemented with one element by combining two or more elements. For example, the base station (200) may comprise processor (210), a transceiver (220) including a receiver and a transmitter, and a memory (230), and may further include an antenna. As described above, a combination of the transmitter and a receiver may be implemented as one transceiver, or the transmitter and the receiver may be implemented separately in an embodiment.

The processor (210) in accordance with an embodiment of the present disclosure may control the transmitter to transmit a MIB-NB and a SIB1-NB to a user equipment, and the MIB-NB or the SIB1-NB may include information indicating whether an additional SIB1-NB is transmitted. Further, a subframe available for transmission of the additional SIB1-NB may be indicated as an invalid downlink subframe, and the subframe indicated as the invalid downlink subframe may be determined to be a valid subframe or an invalid subframe based on the information indicating whether an additional SIB1-NB is transmitted.

The transmitter (220) in accordance with an embodiment of the present disclosure may control transmissions of information, data, and/or messages.

The receiver (120) of the user equipment (100) and the transmitter (220) of the base station (100) in accordance with an embodiment of the present disclosure may perform at least one of a packet modulation and demodulation function, a high-speed packet channel coding function, a OFDMA (Orthogonal Frequency Division Multiple Access) packet scheduling, TDD (Time Division Duplex) packet scheduling and/or channel multiplexing functions, to which the present disclosure is not limited. Further, in an embodiment of the present disclosure, the user equipment (100) and the base station (200) may further include low-power RF (Radio Frequency)/IF (Intermediate Frequency) modules.

Meanwhile, the user equipment (100) in accordance with the present disclosure may include a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc, to which the present disclosure is not limited. For example, the smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA (Code Division Multiple Access) 2000 system, WCDMA (Wideband CDMA) system, etc.).

Embodiments of the present disclosure may be implemented by various means, for example, hardware, firmware, software, or a combination thereof.

In a hardware implementation, the present disclosure may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc, to which the present disclosure is not limited.

In a firmware or software implementation, the present disclosure may be implemented in the form of a module, a procedure, a function, etc. for performing the above-described functions or operations. A program including the module, the procedure, the function, etc. for performing the above-described functions or operations may be stored in the memory (130, 230) and executed by the processor (110, 210).

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present invention is applicable to various wireless access systems. For example, the wireless access systems may include the 3GPP system, 3GPP2 system and the like, to which the present disclosure is not limited. The embodiments of the present disclosure are not only to the above-described wireless access systems but also applicable to all technical fields to which the wireless access systems are applied. Moreover, the present disclosure may also be applied to the mmWave communication system using ultra-high frequency band.

The invention claimed is:

1. A method of receiving a signal from a base station by a user equipment in a wireless communication system, the method comprising:
   receiving a Master Information Block-Narrow Band (MIB-NB) from the base station; and
   receiving a System Information Block1-Narrow Band (SIB1-NB) in a frame based on the MIB-NB from the base station,
   wherein the MIB-NB includes information for a presence of an additional transmission of the SIB1-NB,
   wherein, based on a repetition number of the SIB1-NB being 16 among 4, 8 and 16, the additional transmission of the SIB1-NB is present in the frame, and
   wherein, based on the repetition number of the SIB1-NB being 16 and the additional transmission of the SIB1-NB being present according to the information of the MIB-NB, the detection of the additional transmission of the SIB1-NB is performed in the frame.

2. The method according to claim 1, wherein the SIB1-NB is received in a first subframe of the frame, and the detection of the additional transmission of the SIB1-NB is performed in a second subframe adjacent to the first subframe within the frame.

3. The method according to claim 2, wherein the first subframe is a subframe having subframe index 3, and the second subframe is a subframe having subframe index 4.

4. The method according to claim 1, wherein the repetition number of the SIB1-NB is determined based on the MIB-NB.

5. The method according to claim 1, wherein the additional transmission of the SIB1-NB occurs with the same repetition number as the SIB1-NB.

6. A method of transmitting a signal to a user equipment by a base station in a wireless communication system, the method comprising:
   transmitting a Master Information Block-Narrow Band (MIB-NB) to the user equipment; and
   transmitting a System Information Block1-Narrow Band (SIB1-NB) in a frame based on the MIB-NB to the user equipment,
   wherein the MIB-NB includes information for a presence of an additional transmission of the SIB1-NB,
   wherein, based on a repetition number of the SIB1-NB being 16 among 4, 8 and 16, the additional transmission of the SIB1-NB is present in the frame, and
   wherein, based on the repetition number of the SIB1-NB being 16 and the additional transmission of the SIB1-NB being present according to the information of the MIB-NB, the additional transmission of the SIB1-NB is performed in the frame.

7. The method according to claim 6, wherein the SIB1-NB is transmitted in a first subframe of the frame, and the additional transmission of the SIB1-NB is performed in a second subframe adjacent to the first subframe within the frame.

8. The method according to claim 7, wherein the first subframe is a subframe having subframe index 3, and the second subframe is a subframe having subframe index 4.

9. The method according to claim 6, wherein the repetition number of the SIB1-NB is configured based on the MIB-NB.

10. The method according to claim 6, wherein the additional transmission of the SIB1-NB occurs with the same repetition number as the SIB1-NB.

11. A user equipment configured to receive a signal from a base station in a wireless communication system, the user equipment comprising:
a receiver; and
a processor operatively connected to the receiver,
wherein the processor is configured to control the receiver to receive a Master Information Block-Narrow Band (MIB-NB) from the base station and receive a System Information Block1-Narrow Band (SIB1-NB) in a frame based on the MIB-NB from the base station,
wherein the MIB-NB includes information for a presence of an additional transmission of the SIB1-NB,
wherein, based on a repetition number of the SIB1-NB being 16 among 4, 8 and 16, a detection of the additional transmission of the SIB1-NB is present in the frame, and
wherein, based on the repetition number of the SIB1-NB being 16, the detection of the additional transmission of the SIB1-NB is performed in the frame.

12. The user equipment according to claim 11, wherein the SIB1-NB is received in a first subframe of the frame, and the detection of the additional transmission of the SIB1-NB is performed in a second subframe adjacent to the first subframe within the frame.

13. The user equipment according to claim 12, wherein the first subframe is a subframe having subframe index 3, and the second subframe is a subframe having subframe index 4.

14. The user equipment according to claim 11, wherein the repetition number of the SIB1-NB is determined based on the MIB-NB.

15. The user equipment according to claim 11, wherein the additional transmission of the SIB1-NB occurs with the same repetition number as the SIB1-NB.

16. A base station configured to transmit a signal to a user equipment in a wireless communication system, the base station comprising:
a transmitter; and
a processor operatively connected to the transmitter,
wherein the processor is configured to control the transmitter to transmit a Master Information Block-Narrow Band (MIB-NB) to the user equipment and transmit a System Information Block1-Narrow Band (SIB1-NB) in a frame based on the MIB-NB to the user equipment,
wherein the MIB-NB includes information for a presence of an additional transmission of the SIB1-NB,
wherein, based on a repetition number of the SIB1-NB being 16 among 4, 8 and 16, the additional transmission of the SIB1-NB is present in the frame, and
wherein, based on the repetition number of the SIB1-NB being 16 and the additional transmission of the SIB1-NB being present according to the information of the MIB-NB, the additional transmission of the SIB1-NB is performed in the frame.

17. The base station according to claim 16, wherein the SIB1-NB is transmitted in a first subframe of the frame, and the additional transmission of the SIB1-NB is performed in a second subframe adjacent to the first subframe within the frame.

18. The base station according to claim 17, wherein the first subframe is a subframe having subframe index 3, and the second subframe is a subframe having subframe index 4.

19. The base station according to claim 16, wherein the repetition number of the SIB1-NB is configured based on the MIB-NB.

20. The base station according to claim 16, wherein the additional transmission of the SIB1-NB occurs with the same repetition number as the SIB1-NB.

* * * * *